United States Patent
Kikuchi et al.

[11] Patent Number: 5,984,783
[45] Date of Patent: Nov. 16, 1999

[54] GAME MACHINE HAVING A COMMUNICATION TERMINAL FOR PLAYING GAMES OVER A NETWORK SERVICE SYSTEM

[75] Inventors: Misao Kikuchi; Kunimasa Imasono; Yasushi Kitagawa; Kenji Noma; Tadayuki Tahara, all of Kawasaki; Yoshinori Saito, Sendai; Hisayoshi Hayasaka, Sendai; Kiyotaka Yago, Sendai; Kenji Kawasaki, Oyama, all of Japan

[73] Assignee: Fujitsu Limited, Kawasaki, Japan

[21] Appl. No.: 08/575,162

[22] Filed: Dec. 19, 1995

Related U.S. Application Data

[62] Division of application No. 08/355,032, Dec. 13, 1994, Pat. No. 5,668,950.

[30] Foreign Application Priority Data

| Apr. 1, 1994 | [JP] | Japan | 6-65339 |
| Jul. 25, 1994 | [JP] | Japan | 6-172964 |

[51] Int. Cl.⁶ .................................................. H04H 1/02
[52] U.S. Cl. .................... 463/25; 348/3; 348/10; 348/12; 348/13; 455/4.2; 455/6.3; 463/29; 463/40; 463/41
[58] Field of Search .................... 463/25, 29, 41; 379/95; 235/380; 395/200.06; 370/409; 348/6

[56] References Cited

U.S. PATENT DOCUMENTS

| 4,518,823 | 5/1985 | Kessler . | |
| 4,764,666 | 8/1988 | Bergeron . | |
| 5,048,831 | 9/1991 | Sides . | |
| 5,051,822 | 9/1991 | Rhoades | 463/25 |
| 5,119,188 | 6/1992 | McCalley et al. | 348/6 |

(List continued on next page.)

FOREIGN PATENT DOCUMENTS

| 0 292 827 A1 | 5/1987 | European Pat. Off. . |
| 62274378 | 11/1987 | European Pat. Off. . |
| 0 402067A3 | 12/1990 | European Pat. Off. . |
| 04061649 | 2/1992 | European Pat. Off. . |
| 0 581 349 A2 | 2/1994 | European Pat. Off. . |

(List continued on next page.)

OTHER PUBLICATIONS

French Patent Office Action issued Dec. 28, 1998 (Appln. No. 9712965000).
French Patent Office Action issued Dec. 28, 1998 (Appln. No. 9712966000).
Korean Office Action issued Nov. 26, 1997.
British Patent Office Action issued Oct. 9, 1998 (Appln. No. GB 9819157.0).
British Patent Office Action issued Oct. 8, 1998 (Appln. No. GB 9819156.2).
British Patent Office Action issued Oct. 5, 1998 (Appln. No. GB 9819151.3).
British Patent Office Action issued Oct. 7, 1998 (Appln. No. GB 9819153.9).
Japanese Laid Open Application No. 59–198550 Abstract.

*Primary Examiner*—John W. Cabeca
*Assistant Examiner*—Fred F. Tzeng
*Attorney, Agent, or Firm*—Staas & Halsey LLP

[57] ABSTRACT

A network service system capable of providing economical services comprises a plurality of host computers connected to a network for providing services through the network and an information processing terminal connected to the network. The information processing terminal identifies a service identifier, provided in a storage medium for network service, for identifying a type of a network service when the storage medium is attached, connects the line to the host computer which corresponds to the identified service identifier and receives the network service from the line-connected host computer.

2 Claims, 49 Drawing Sheets

U.S. PATENT DOCUMENTS

| | | | |
|---|---|---|---|
| 5,131,025 | 7/1992 | Hamasaki | 379/95 |
| 5,149,945 | 9/1992 | Johnson et al. | 235/380 |
| 5,191,410 | 3/1993 | McCalley et al. . | |
| 5,249,269 | 9/1993 | Nako et al. | 395/200.06 |
| 5,251,909 | 10/1993 | Reed et al. . | |
| 5,273,288 | 12/1993 | Teshima et al. | 463/41 |
| 5,280,625 | 1/1994 | Howarter et al. . | |
| 5,489,103 | 2/1996 | Okamoto | 463/29 |
| 5,537,401 | 7/1996 | Tadamura et al. | 370/409 |

FOREIGN PATENT DOCUMENTS

| | | |
|---|---|---|
| 06031060 | 2/1994 | European Pat. Off. . |
| 06246063 | 9/1994 | European Pat. Off. . |
| 04061541 | 2/1992 | Japan . |
| 04101552 | 4/1992 | Japan . |
| 04127762 | 4/1992 | Japan . |
| 2120507 | 11/1983 | United Kingdom . |
| 2193868 | 2/1988 | United Kingdom . |
| 2236602 | 4/1991 | United Kingdom . |
| 2268670 | 1/1994 | United Kingdom . |
| WO 87/05129 | 8/1987 | WIPO . |
| 91/06160 | 5/1991 | WIPO . |
| WO 91/06160 | 5/1991 | WIPO . |
| WO 93/23125 | 11/1993 | WIPO . |

FIG. 53

| USE CONDITION OF GAME SOFTWARE | DECODING SIGNAL | | | LINE CONNECTION | CONTENTS |
| --- | --- | --- | --- | --- | --- |
| | ROM-A | ROM-B | ROM-C | | |
| 1) NOT ATTACHED | ON | OFF | OFF | LINE CONNECTED | ON-LINE |
| 2) FOR NETWORK | ON | ON | OFF | LINE CONNECTED | NETWORK GAME |
| 3) FOR STAND-ALONE | OFF | OFF | ON | NOT CONNECTED | STAND-ALONE GAME |

GAME MACHINE HAVING A COMMUNICATION TERMINAL FOR PLAYING GAMES OVER A NETWORK SERVICE SYSTEM

This application is a division of application Ser. No. 08/355,032, filed Dec. 13, 1994, now U.S. Pat. No. 5,668,950.

BACKGROUND OF THE INVENTION

1. Field of the Invention

The present invention relates to a network service system in which a host computer provides services to an information processing terminal (e.g., a computer, personal computer, game machine) via a network line (e.g., a telephone line, CATV (cable TV) line) as well as a communication unit for game machine and a game machine which allow to play a game utilizing the network service system.

2. Description of the Related Art

A conventional network service system is composed of, for example, a host computer which provides services, a VAN (Value Added Network) network for connecting the host computer and an information processing terminal connected to the VAN network via a public line or the like. Incidentally, a second host computer (hereinafter referred to also as a "gateway-connected host computer") connected to the host computer through a gateway by a dedicated line may be provided.

Now, two typical methods for utilizing the network service system will be explained.

The first utilization is to exchange data between the information processing terminal and the host computer to receive a necessary service. For example, the host computer transmits data of goods to the information processing terminal to let a customer order a desirable item through on-line.

The second utilization is to provide a service to the information processing terminal from the gateway-connected host computer via the host computer when the gateway-connected host computer can provide the service which the host computer does not have. For example, it allows to access to EasyNet which is an on-line database of Telebase Systems in the U.S. after connecting NIFTY-Serve, a personal computer communication service.

With regard to the above-mentioned first utilization of the network service, it is apprehended that the service is not provided from an economical reason depending on the type of service provided. It is because an amount of information to be communicated becomes enormous in services related to on-line shopping and game accompanying motions for example since image information has to be transferred.

Further, with regard to the above-mentioned second utilization of the network service, it is apprehended that the burden of the host computer becomes great, that a communication line having a large capacity becomes necessary or that a communication cost increases.

Accordingly, it is a first object of the present invention to solve the aforementioned problems by providing a network service system which can provide services economically through the network.

It is a second object of the present invention to provide a network service system which allows to reduce an operation burden of a main host computer.

It is a third object of the present invention to provide a communication unit for game machine which allows to play a game utilizing the network service system of the first and second objects.

It is a fourth object of the present invention to provide a game machine which allows to play a game utilizing the network service system of the first and second objects.

SUMMARY OF THE INVENTION

<First Network Service System of the Present Invention>

In order to achieve the first object of the present invention described above, a first network service system of the present invention comprises a plurality of host computers connected to a network for providing services through the network and an information processing terminal connected to the network.

When a storage medium for network service provided with a service identifier for identifying a type of the network service is attached to the information processing terminal, the terminal identifies the service identifier which the storage medium has. Then, it connects the line to the host computer which corresponds to the identified service identifier and receives the network service from the connected host computer (corresponds to claim 1).

Here, for the storage medium for network service, a ROM cassette (a cassette having a read only memory), IC card (a card having an integrated circuit), CD-ROM, floppy magnetic disk or the like may be used.

In operation, according to the first network service system of the present invention, the information processing terminal identifies the main service identifier which the storage medium has when the medium is attached to the terminal. It then connects the line to the host computer which corresponds to the identified main service identifier and receives the network service from the connected host computer.

The above and other related objects and features of the present invention will be apparent from a reading of the following description of the disclosure found in the accompanying drawings and the novelty thereof pointed out in the appended claims.

BRIEF DESCRIPTION OF THE DRAWINGS

FIG. 53 is a table of decoding signals in a decoding section in the embodiments.

DETAILED DESCRIPTION OF PREFERRED EMBODIMENT

Before explaining preferred embodiments of the present invention, an outline of structures of the present invention will be explained along means for achieving the objects of the present invention with reference to the diagrams.

<First Network Service System of the Present Invention>

Figure 1:
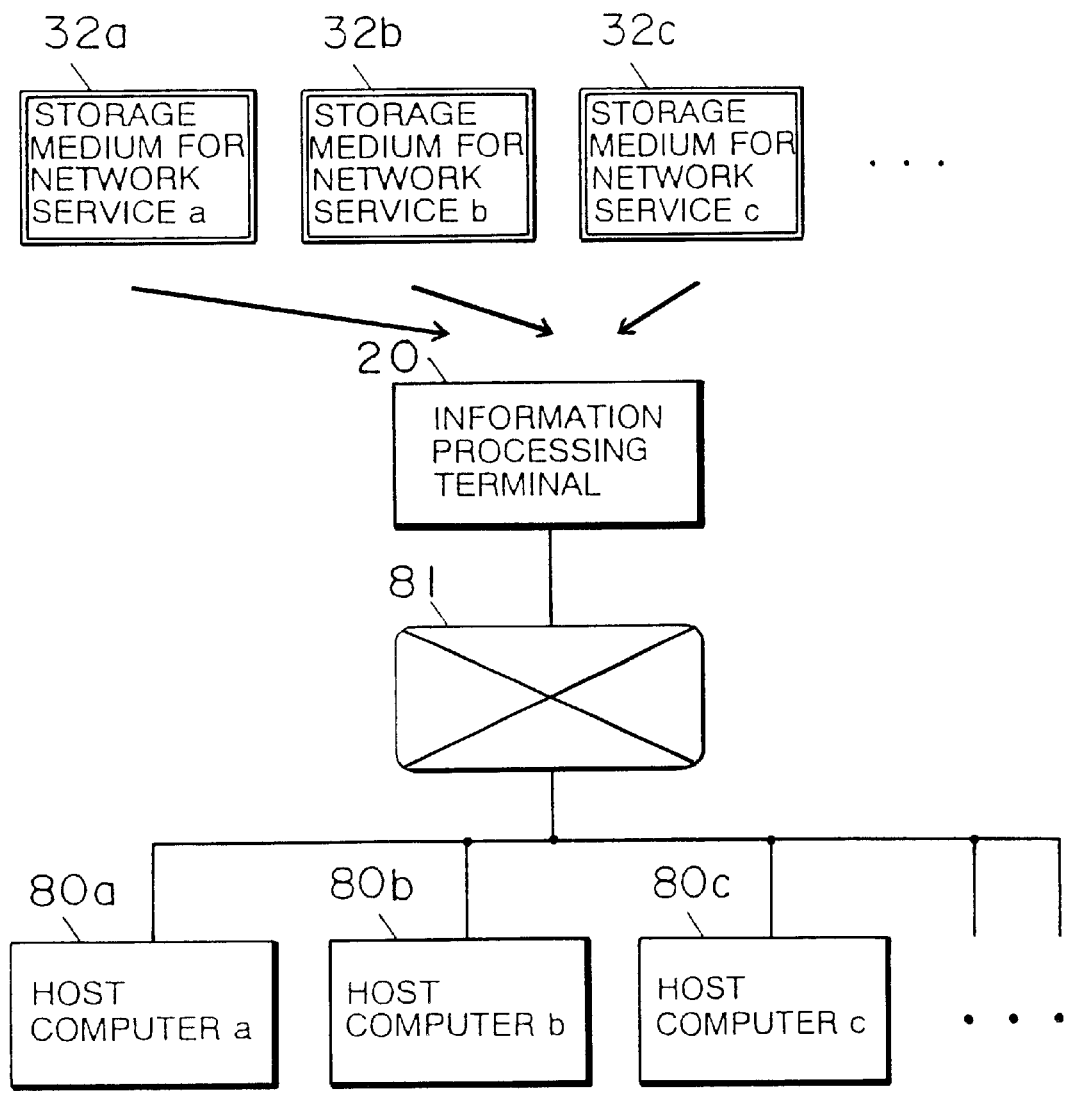
FIG. 1 is a diagram showing a first principle of a network service system of the present invention.

In order to achieve the first object of the present invention described above, a first network service system of the present invention is constructed as follows. FIG. 1 is a diagram showing a principle of the first network service system of the present invention.

That is, the system comprises a plurality of host computers 80a, 80b and 80c connected to a network 81 for providing services through the network 81 and an information processing terminal 20 connected to the network 81.

When a storage medium for network service 32a, 32b or 32c provided with a service identifier for identifying a type of the network service is attached to the information processing terminal 20, the terminal 20 identifies the service identifier which the storage medium 32a, 32b or 32c has. Then, it connects the line to the host computer 80a, 80b or 80c which corresponds to the identified service identifier and receives the network service from the connected host computer 80a, 80b or 80c (corresponds to claim 1).

Here, for the storage media for network service 32a, 32b and 32c, a ROM cassette (a cassette having a read only memory), IC card (a card having an integrated circuit), CD-ROM, floppy magnetic disk or the like may be used.

In operation, according to the first network service system of the present invention, the information processing terminal 20 identifies the main service identifier which the storage medium 32a, 32b or 32c has when the medium is attached to the terminal 20. It then connects the line to the host computer 80a, 80b or 80c which corresponds to the identified main service identifier and receives the network service from the connected host computer 80a, 80b or 80c.

<Second Network Service System of the Present Invention>

Figure 2:
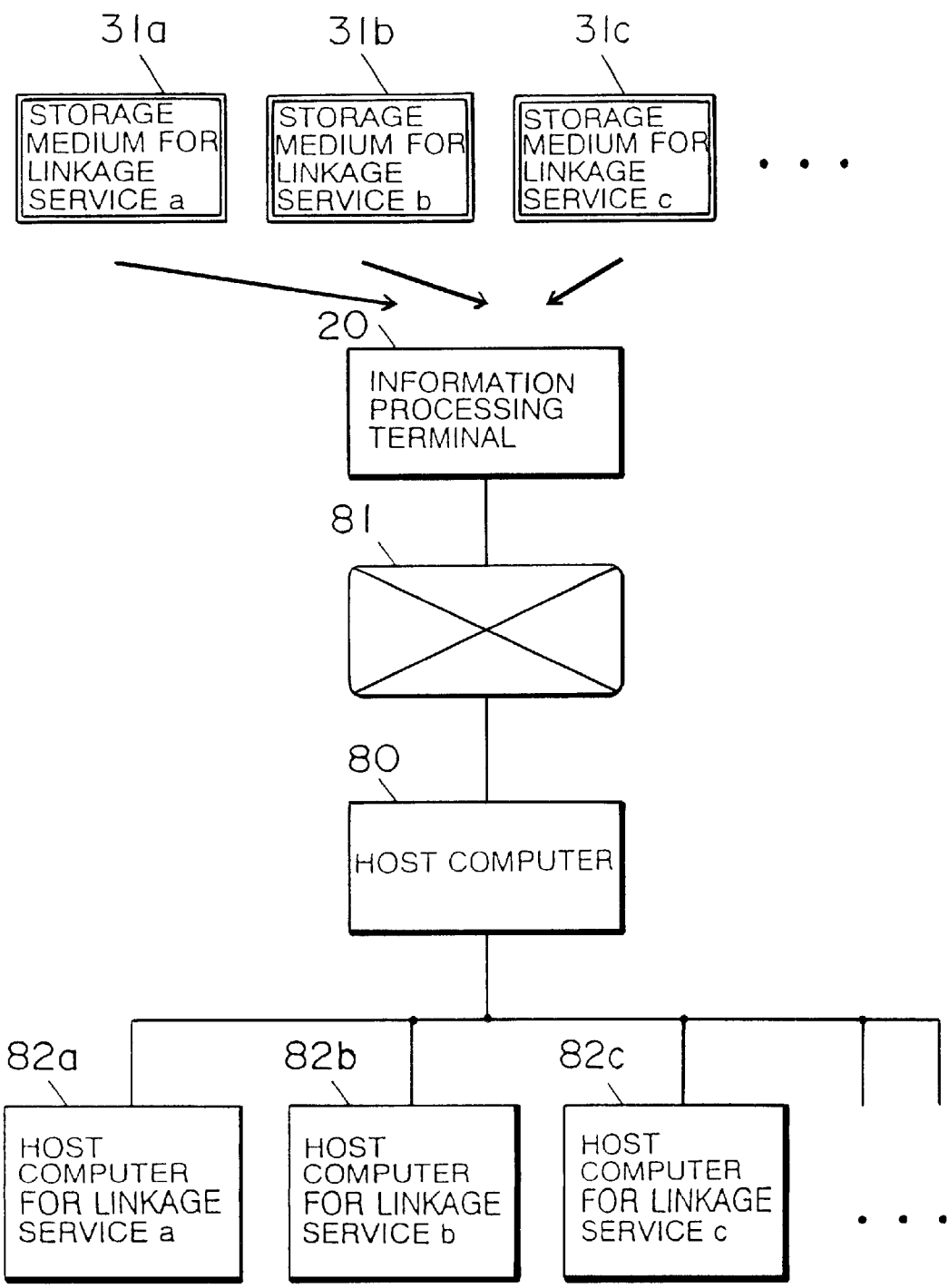
FIG. 2 is a diagram showing a second principle of the network service system of the present invention.

In order to achieve the first object of the present invention described above, a second network service system of the present invention is constructed as follows. FIG. 2 is a diagram showing a principle of the second network service system of the present invention.

That is, the system comprises the host computer 80 connected to the network 81 for providing services, a plurality of host computers for linkage service 82a, 82b and 82c connected to the host computer 80 for providing services linked to the services provided by the host computer 80 through the network 81 and the information processing terminal 20 connected to the network 81.

When a storage medium for linkage service 31a, 31b or 31c provided with a linkage service identifier for identifying a type of the linkage service is attached to the information processing terminal 20, the terminal 20 identifies the linkage service identifier which the storage medium 31a, 31b or 31c has. Then, it connects the line to the host computer for linkage service 82a, 82b or 82c which corresponds to the identified linkage service identifier via the host computer 80 and receives the network service from the connected host computer for linkage service 82a, 82b or 82c (corresponds to claim 2).

Here, for the storage media for linkage service 31a, 31b and 31c, a ROM cassette, IC card, CD-ROM, floppy magnetic disk or the like may be used.

In operation, according to the second network service system of the present invention, the information processing terminal 20 identifies the linkage service identifier which the storage medium 31a, 31b or 31c has when the medium is attached to the terminal 20. It then connects the line to the host computer for linkage service 82a, 82b or 82c which corresponds to the identified linkage service identifier via the host computer 80 and receives the network service from the connected host computer for linkage service 82a, 82b or 82c.

<Third Network Service System of the Present Invention>

Figure 3:
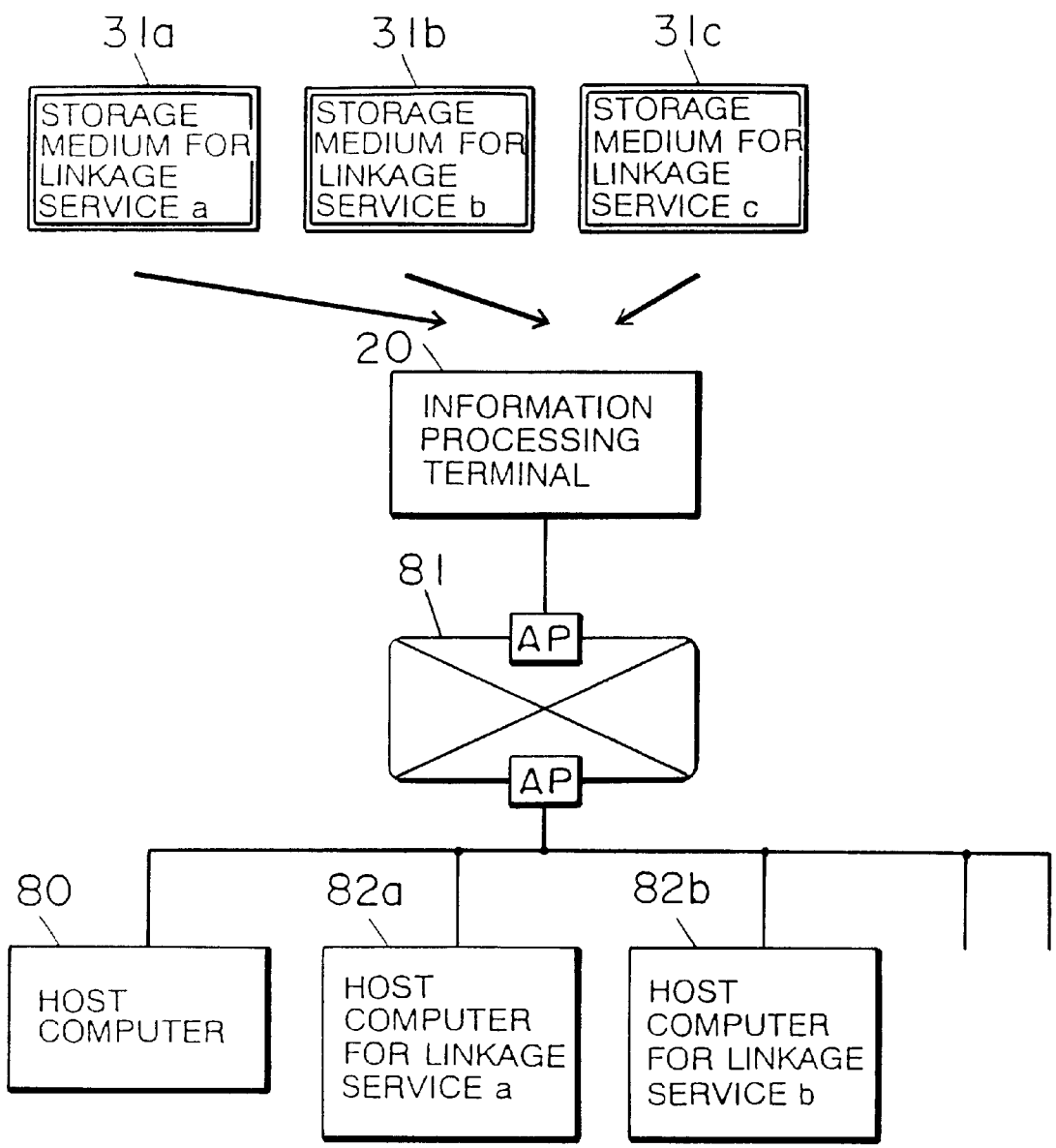
FIG. 3 is a diagram showing a third principle of the network service system of the present invention.

In order to achieve the first object of the present invention described above, a third network service system of the present invention is constructed as follows. FIG. 3 is a diagram showing a principle of the third network service system of the present invention.

That is, the system comprises the host computer 80 connected to the network 81 for providing services via the network 81, the host computers for linkage service 82a and 82b connected to the network 81 for providing services linked to the services provided by the host computer 80 through the network 81 and the information processing terminal 20 connected to the network 81.

When the storage medium for linkage service 31a, 31b or 31c provided with a linkage service identifier for identifying a type of the linkage service is attached to the information processing terminal 20, the terminal 20 identifies the linkage service identifier which the storage medium 31a, 31b or 31c has and informs the host computer 80 of that.

When the host computer 80 receives the linkage service identifier, it informs the information processing terminal 20 of information on connection with the host computer for linkage service 82a or 82b which corresponds to the linkage service identifier.

When the information processing terminal 20 receives the information on connection with the host computer for linkage service 82a or 82b, it disconnects the connection with the host computer 80 and connects the line with the host computer for linkage service 82a or 82b based on the connection information. Then, it receives a network service from the connected host computer for linkage service 82a or 82b (corresponds to claim 3).

By the way, the reference character "AP" in FIG. 3 denotes an access point and is used in the same manner throughout the drawings.

In operation, according to the third network service system of the present invention, the information processing terminal 20 identifies the linkage service identifier which the storage medium for linkage service 31a, 31b or 31c has and informs the host computer 80 of that when the medium is attached to the terminal 20.

When the host computer 80 receives the linkage service identifier, it informs the information processing terminal 20 of the information on connection with the host computer for linkage service 82a or 82b which corresponds to the linkage service identifier.

When the information processing terminal 20 receives this information, it disconnects the connection with the host computer 80 and connects the line with the host computer for linkage service 82a or 82b based on the connection information and receives the network service from the connected host computer for linkage service 82a or 82b.

<Fourth Network Service System of the Present Invention>

Figure 4:
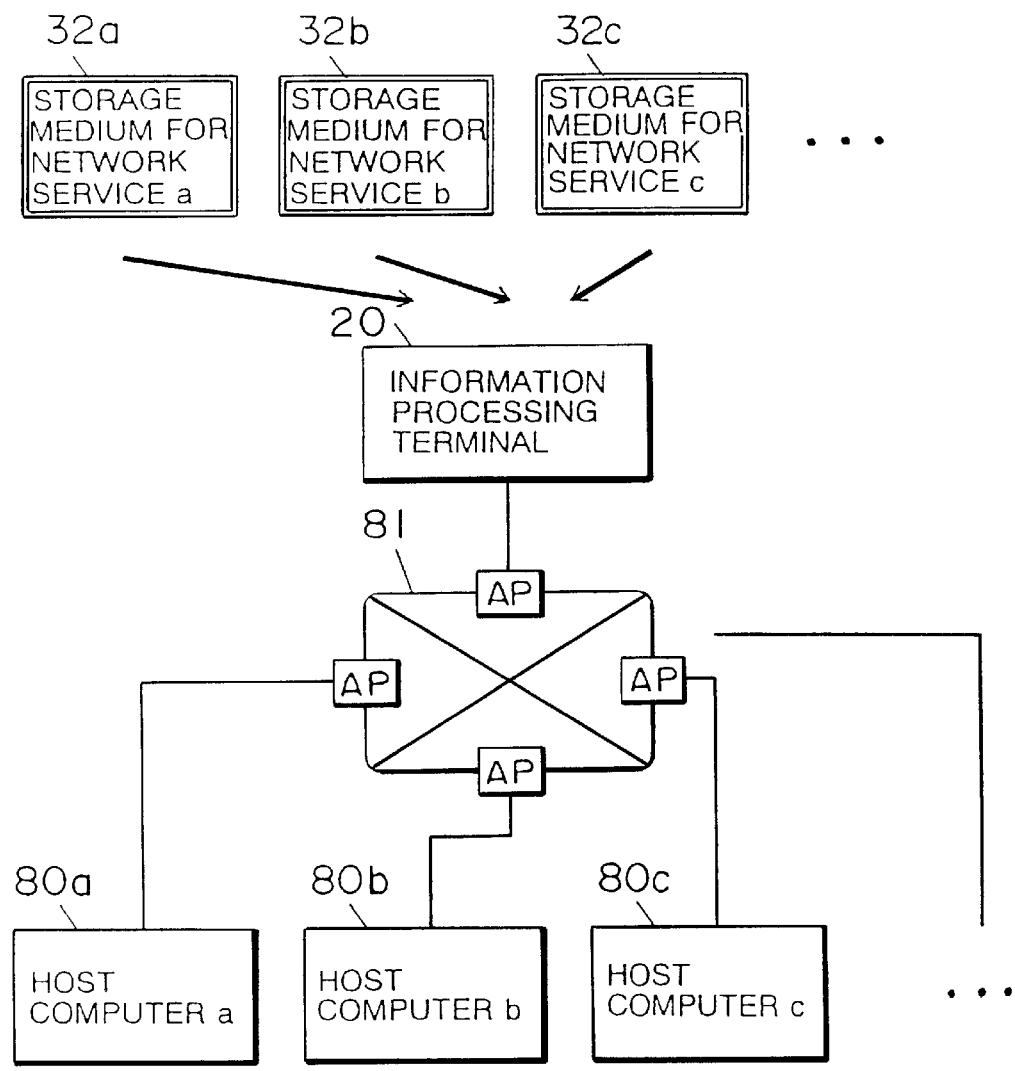
FIG. 4 is a diagram showing a fourth principle of the network service system of the present invention.

In order to achieve the first object of the present invention described above, a fourth network service system of the present invention is constructed as follows. FIG. 4 is a diagram showing a principle of the fourth network service system of the present invention.

That is, the system comprises a plurality of host computers 80a, 80b and 80c connected to the network 81 via different access points for providing services through the network 81 and the information processing terminal 20 connected to the network 81.

The information processing terminal 20 connects the line to the host computer 80 after connecting the line to the network 81 (corresponds to claim 4).

In operation, according to the fourth network service system of the present invention, the information processing terminal 20 connects the line to the host computer 80 after connecting the line to the network 81.

<Fifth Network Service System of the Present Invention>

Figure 5:
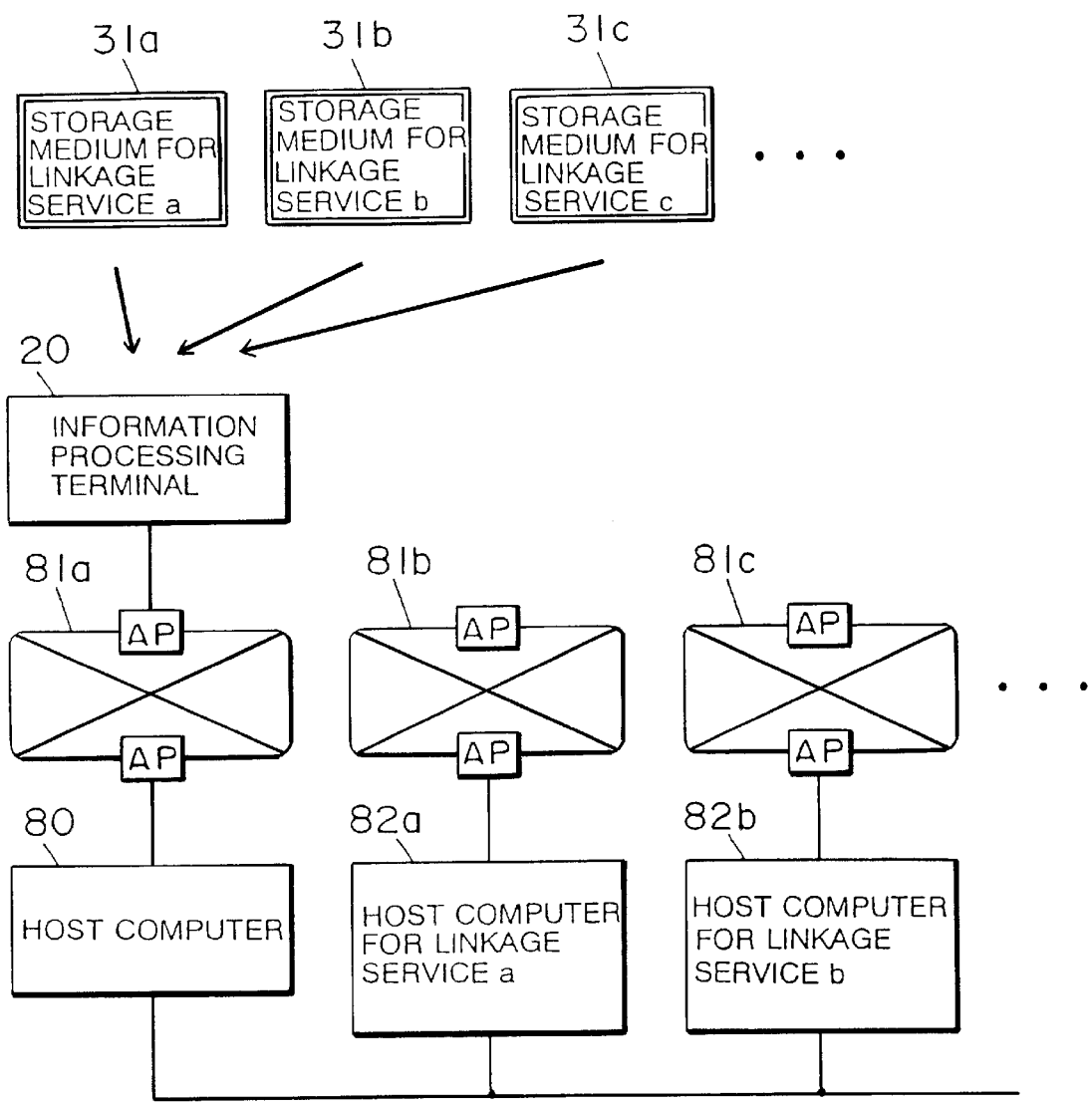
FIG. 5 is a diagram showing a fifth principle of the network service system of the present invention.

In order to achieve the first object of the present invention described above, a fifth network service system of the present invention is constructed as follows. FIG. 5 is a diagram showing a principle of the fifth network service system of the present invention.

That is, the system comprises the host computer 80 connected to a first network 81a for providing services via the first network 81a, the host computers for linkage service 82a and 82b connected to second networks 81b and 81c and connected to the host computer 80 through gateways for providing services linked to the services provided by the host computer 80 and the information processing terminal 20 connected to the first network 81a.

When the storage medium for linkage service 31a, 31b or 31c provided with the linkage service identifier for identifying a type of the linkage service is attached to the information processing terminal 20, the terminal 20 identifies the linkage service identifier which the storage medium 31a, 31b or 31c has and informs the host computer 80 of that.

When the host computer 80 receives the information of the linkage service identifier, it informs the information processing terminal 20 of information on connection with the host computer for linkage service 82a or 82b which corresponds to the linkage service identifier.

When the information processing terminal 20 receives the information on connection with the host computer for linkage service 82a or 82b, it issues a direction to the host computer 80 to connect with the host computer for linkage service 82a or 82b.

When the host computer 80 receives the direction, it connects with the host computer for linkage service 82a or 82b directed to be connected through the gateway.

Then, the information processing terminal 20 receives a network service from the host computer for linkage service 82a or 82b (corresponds to claim 5).

In operation, according to the fifth network service system of the present invention, the information processing terminal 20 identifies the linkage service identifier which the storage medium for linkage service 31a, 31b or 31c has and informs the host computer 80 of that when the medium is attached to the terminal 20.

The host computer 80 which is informed of the linkage service identifier informs the information processing terminal 20 of the information on connection with the host computer for linkage service 82a or 82b which corresponds to the linkage service identifier.

The information processing terminal 20 which is informed of this connection information issues the direction to the host computer 80 to connect with the host computer for linkage service 82a or 82b.

The host computer 80 which is informed of the direction connects with the host computer for linkage service 82 or 82b directed to be connected through the gateway.

Then, the information processing terminal 20 receives a network service from the host computer for linkage service 82a or 82b.

<Sixth Network Service System of the Present Invention>

Figure 6:
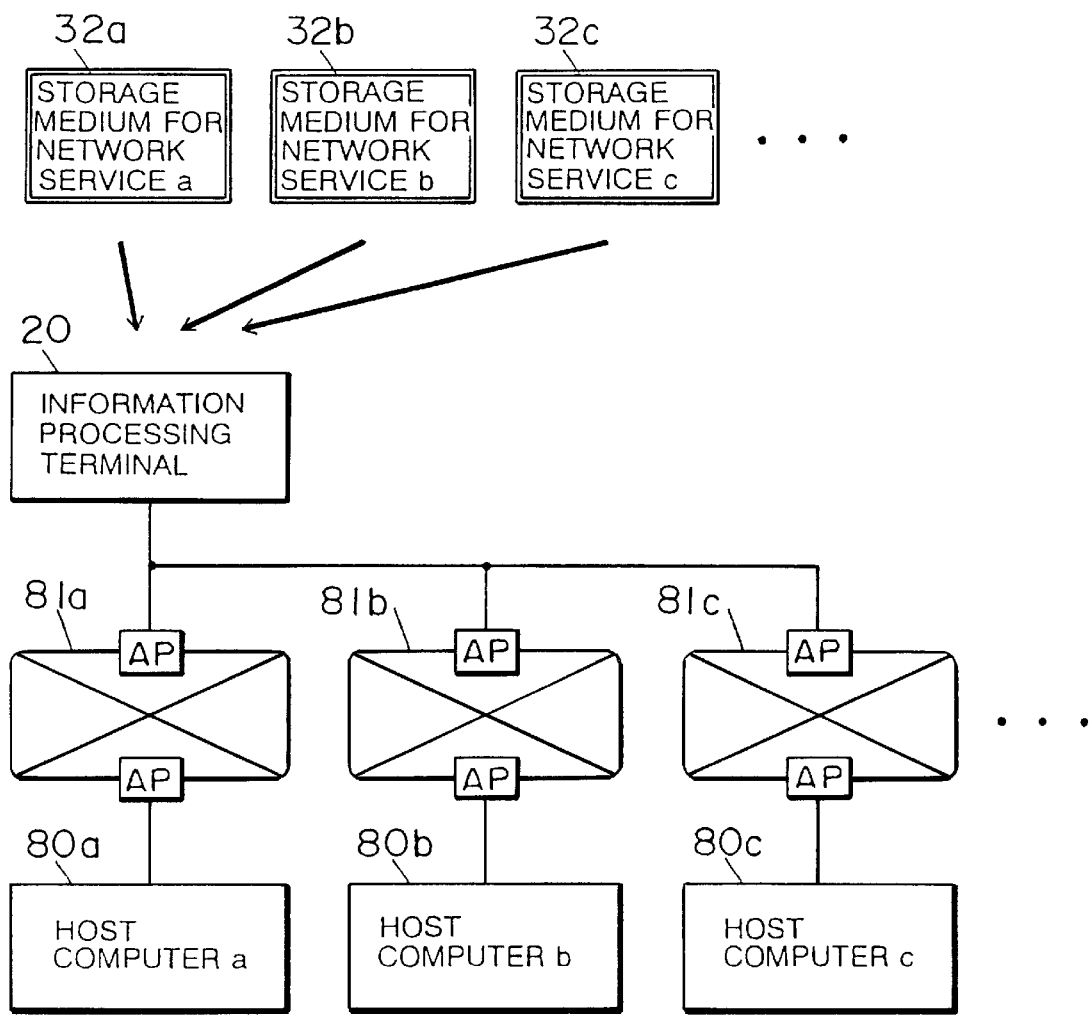
FIG. 6 is a diagram showing a sixth principle of the network service system of the present invention.

In order to achieve the first object of the present invention described above, a sixth network service system of the present invention is constructed as follows. FIG. 6 is a diagram showing a principle of the sixth network service system of the present invention.

That is, the system comprises a plurality of host computers 80a, 80b and 80c respectively connected with different networks 81a, 81b and 81c for providing services through the networks 81a, 81b and 81c and the information processing terminal 20 connected to one of the networks 81a, 81b and 81c.

When the storage medium for network service 32a, 32b or 32c provided with the service identifier for identifying a type of the network service is attached to the information processing terminal 20, the terminal 20 identifies the service identifier which the storage medium 32a, 32b or 32c has. Then, it connects the line to the network 81a, 81b or 81c to which the host computer 80a, 80b or 80c which corresponds to the identified service identifier is connected and receives a network service from the host computer 80a, 80b or 80c connected to the connected network 81a, 81b or 81c (corresponds to claim 6).

In operation, according to the sixth network service system of the present invention, the information processing terminal 20 identifies the main service identifier which the storage medium 32a, 32b or 32c has when the medium is attached to the terminal 20. It then connects the line to the identified network 81a, 81b or 81c and receives the network service from the connected host computer 80a, 80b or 80c connected to the line connected network 81a, 81b or 81c.

<Seventh Network Service System of the Present Invention>

In order to achieve the first object of the present invention described above, a seventh network service system of the present invention is constructed as follows.

That is, in the first through sixth network service systems, the function for connecting the information processing terminal 20 with the host computer 80 is provided in a form of a storage medium (corresponds to claim 7).

Here, for the storage medium, a ROM cassette, IC card, CD-ROM, floppy magnetic disc or the like may be used.

The operation of the seventh network service system of the present invention is the same with that of the first through sixth network service systems.

<Eighth Network Service System of the Present Invention>

In order to achieve the first object of the present invention described above, an eighth network service system of the present invention is constructed as follows.

That is, the storage medium for linkage service 31 described before has a linkage service menu which allows to receive a service by using the storage medium 31.

The host computer 80 has a main service menu which is a menu of services provided by the host computer 80.

When the storage medium for linkage service 31 is attached to the information processing terminal 20, the terminal 20 displays both of the main service menu transmitted from the host computer 80 and the linkage service menu to allow to select either menu. Then, it executes the service of the host computer 80 when the main service menu is selected and connects to the host computer for linkage service 82 when the linkage service menu is selected (corresponds to claim 8).

In operation of the eighth network service system of the present invention, the information processing terminal 20 displays both of the main service menu transmitted from the host computer 80 and the linkage service menu when the storage medium for linkage service 31 is attached to it to allow to select either menu, in addition to the operations of the second, third and fifth network service systems.

Then, it executes the service of the host computer 80 when the main service menu is selected and connects to the host computer for linkage service 82 when the linkage service menu is selected.

<Ninth Network Service System of the Present Invention>

In order to achieve the first object of the present invention described above, a ninth network service system of the present invention is constructed as follows.

That is, the host computer 80 has a main service menu which is a menu of services provided by the host computer 80 and a linkage service menu which allows to receive a service by using the storage medium for linkage service 31.

When the storage medium for linkage service 31 is attached to the information processing terminal 20, the terminal 20 displays both of the main service menu and linkage service menu transmitted from the host computer 80 to allow to select either menu. Then, it executes the service of the host computer 80 when the main service menu is selected and connects to the host computer for linkage service 82 when the linkage service menu is selected (corresponds to claim 9).

In operation of the ninth network service system of the present invention, in addition to the operations of the second, third and fifth network service systems, the information processing terminal 20 displays both of the main service menu and the linkage service menu transmitted from the host computer 80 when the storage medium for linkage service 31 is attached to it to allow to select either menu.

Then, it executes the service of the host computer 80 when the main service menu is selected and connects to the host computer for linkage service 82 when the linkage service menu is selected.

<Tenth Network Service System of the Present Invention>

In order to achieve the first object of the present invention described above, a tenth network service system of the present invention is constructed as follows.

That is, in the first through sixth network service systems, the information processing terminal 20 records and holds setting information on line connection with the host computer 80 and host computer for linkage service 82 and information of customer who receives the service and updates them every time when the service is provided (corresponds to claim 10).

In operation of the tenth network service system of the present invention, the information processing terminal 20 records and holds setting information on line connection with the host computer 80 and host computer for linkage service 82 and information of customer who receives the service and updates them every time when the service is provided, in addition to the operations of the first through sixth network service systems.

<Eleventh Network Service System of the Present Invention>

In order to achieve the first object of the present invention described above, an eleventh network service system of the present invention is constructed as follows.

That is, in the first through sixth network service systems, the information processing terminal 20 records and holds setting information on line connection with the host computer 80 and host computer for linkage service 82.

The host computer 80 records and holds customer information of the main service and linkage service and updates them every time when the service is provided (corresponds to claim 11).

In operation of the eleventh network service system of the present invention, the information processing terminal 20 records and holds the setting information on line connection with the host computer 80 and host computer for linkage service 82, in addition to the operations of the first through sixth network service systems.

The host computer 80 records and hold customer information of the main service and linkage service and updates them every time when the service is provided.

<Twelfth Network Service System of the Present Invention>

In order to achieve the first object of the present invention described above, a twelfth network service system of the present invention is constructed as follows.

That is, in the eleventh network service system, the host computer 80 records and holds customer information for main service and updates it every time when the service is provided.

The host computer for linkage service 82 records and holds customer information for linkage service and updates it every time when the service is provided (corresponds to claim 12).

In operation of the twelfth network service system of the present invention, the host computer 80 records and holds the customer information for main service and updates it every time when the service is provided, in addition to the operation of the eleventh network service system.

The host computer for linkage service 82 records and holds the customer information for linkage service and updates it every time when the service is provided.

<Thirteenth Network Service System of the Present Invention>

In order to achieve the first object of the present invention described above, a thirteenth network service system of the present invention is constructed as follows.

That is, in the tenth through twelfth network service systems, the host computer 80 and the host computer for linkage service 82 inform the information processing terminal 20 of information on use of a provided service per each customer who used the service and per each type of the service and the information processing terminal 20 recorded the informed use information (corresponds to claim 13).

In operation of the thirteenth network service system of the present invention, the host computer 80 and host computer for linkage service 82 inform the information processing terminal 20 of information on use of the provided service per each customer who used the service and per each type of the service and the information processing terminal 20 recorded the informed use information, in addition to the operation of the tenth through twelfth network service systems.

<Fourteenth Network Service System of the Present Invention>

In order to achieve the first object of the present invention described above, a fourteenth network service system of the present invention is constructed as follows.

That is, in the thirteenth network service systems, the information processing terminal 20 displays the informed customer information (corresponds to claim 14).

In operation of the fourteenth network service system of the present invention, the information processing terminal 20 displays the informed customer information, in addition to the operation of the thirteenth network service system.

<Fifteenth Network Service System of the Present Invention>

In order to achieve the first object of the present invention described above, a fifteenth network service system of the present invention is constructed as follows.

That is, in the first through sixth network service systems, the information processing terminal 20 selects one or more items from a data table which the storage medium for network service 32 has to activate a preset network access software and execution software and automatically connects the line to the host computer 80 to execute an answering process (corresponds to claim 15).

In operation of the fifteenth network service system of the present invention, the information processing terminal 20 selects one or more items from the data table which the storage medium for network service 32 has to activate a preset network access software and execution software, in addition to the operations of the first through sixth network service systems. It then automatically connects the line to the host computer 80 to execute an answering process.

<Sixteenth Network Service System of the Present Invention>

Figure 7:
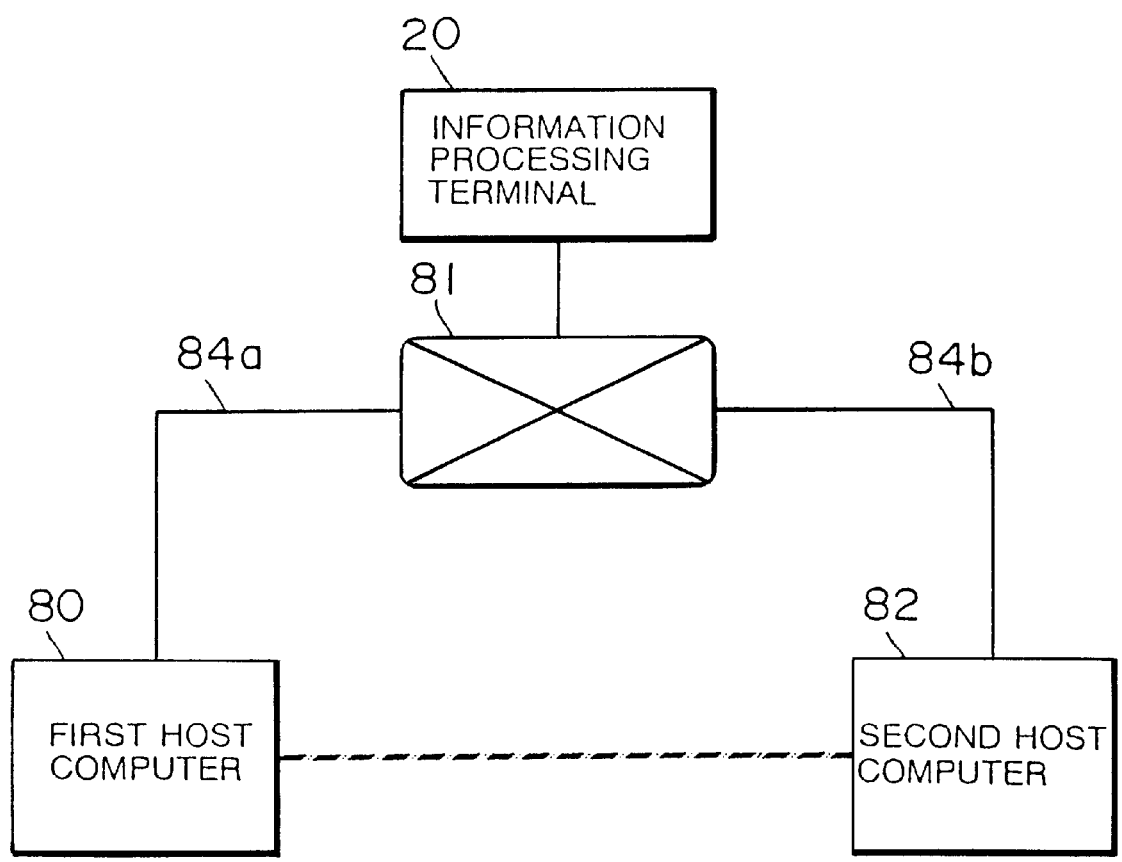
FIG. 7 is a diagram showing a seventh principle of the network service system of the present invention.

In order to achieve the second object of the present invention described above, a sixteenth network service system of the present invention is constructed as follows. FIG. 7 is a diagram showing a principle of the sixteenth network service system.

That is, the system comprises the first host computer 80 connected to the network 81 via a first communication path 84a for providing services via the network 81, the second host computer 82 connected to the network 81 via a second communication path 84b and connected to the first host computer 80 through a gateway and the information processing terminal 20, connected to the network 81, which stores an address necessary for connecting to the second host computer 82.

The information processing terminal 20 is connected at first to the first host computer 80 to receive the network service menus which the first host computer 80 and the second host computer 82 provide through the first host computer 80.

Then, when the information processing terminal 20 requests a network service provided by the second host computer 82, the first host computer 80 disconnects the line to the first communication path 84a.

Next, the information processing terminal 20 connects to the second host computer 82 via the second communication path 84b (corresponds to claim 16).

In operation, according to the sixteenth network service system of the present invention, the information processing terminal 20 is connected to the first host computer 80 to receive the network service menus which the first host computer 80 and the second host computer 82 provide through the first host computer 80.

Then, when the information processing terminal 20 requests a network service provided by the second host computer 82, the first host computer 80 disconnects the line to the first communication path 84a.

Next, the information processing terminal 20 connects to the second host computer 82 via the second communication path 84b.

<Seventeenth Network Service System of the Present Invention>

Figure 8:
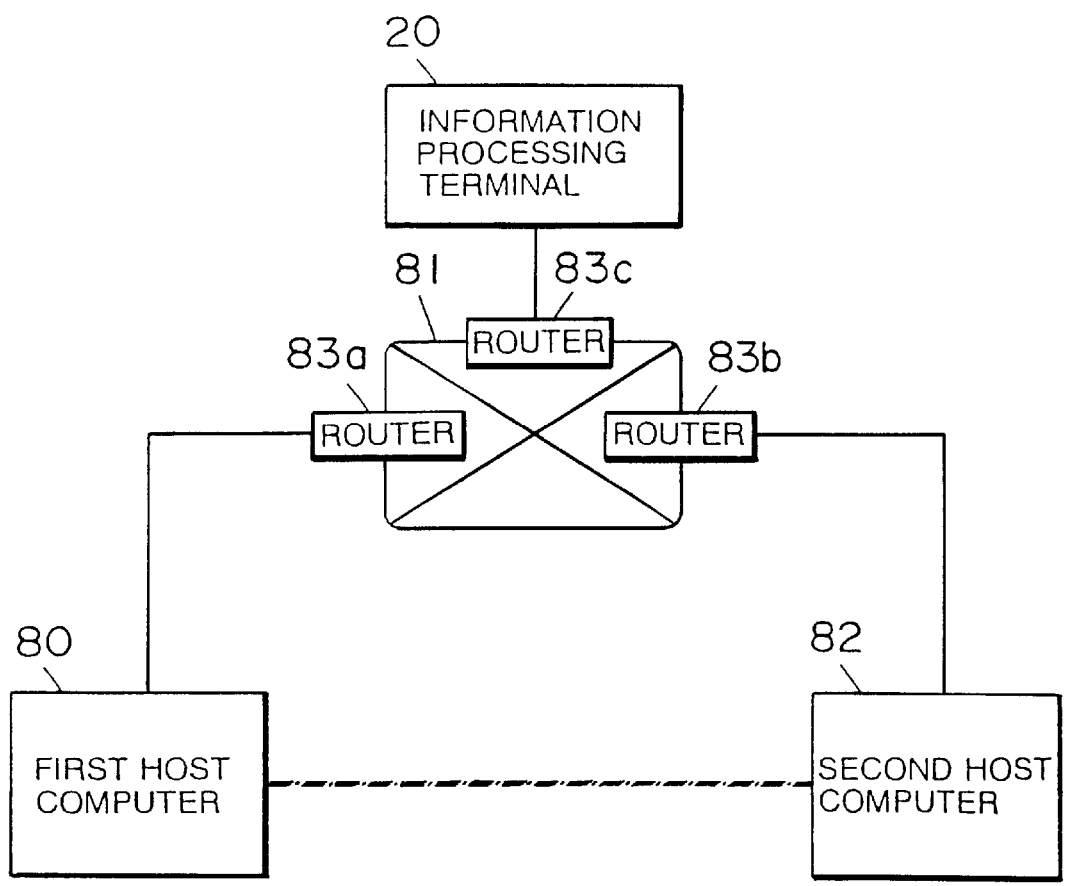
FIG. 8 is a diagram showing an eighth principle of the network service system of the present invention.

In order to achieve the second object of the present invention described above, a seventeenth network service system of the present invention is constructed as follows. FIG. 8 is a diagram showing a principle of the seventeenth network service system.

That is, the system comprises the first host computer 80 connected to the network 81 via a first router 83a for providing network services, the second host computer 82 connected to the network 81 via a second router 83b and connected to the first host computer 80 through the gateway and the information processing terminal 20, connected to the network 81 via a third router 83c, which stores an address necessary for connecting to the second host computer 82.

The information processing terminal 20 is connected at first to the first host computer 80 to receive the network service menu which the first host computer 80 and the second host computer 82 provide through the first host computer 80.

Then, when the information processing terminal 20 requests the network service provided by the second host computer 82, the first host computer 80 adds the address of the second host computer 82 to transmission data transmitted from the information processing terminal 20 and transmits it to the first router 83a.

Then, the information processing terminal 20 is connected to the second host computer 82 via the third and second routers 83c and 83b (corresponds to claim 17).

In operation, according to the seventeenth network service system of the present invention, the information processing terminal 20 is connected to the first host computer 80 to receive the network service menus which the first host computer 80 and the second host computer 82 provide through the first host computer 80.

Then, when the information processing terminal 20 requests the network service provided by the second host computer 82, the first host computer 80 adds the address of the second host computer 82 to the transmission data transmitted from the information processing terminal 20 and transmits it to the first router 83a.

Then, the information processing terminal 20 is connected to the second host computer 82 via the third and second routers 83c and 83b.

<Eighteenth Network Service System of the Present Invention>

In order to achieve the second object of the present invention described above, an eighteenth network service system of the present invention is constructed as follows.

That is, in the sixteenth and seventeenth network service systems, the information processing terminal 20 is connected to the first host computer 80 when the network service provided by the second host computer 82 is finished (corresponds to claim 18).

In operation, according to the eighteenth network service system of the present invention, the information processing terminal 20 is connected to the first host computer 80 when the network service provided by the second host computer 82 is finished, in addition to the operation of the sixteenth and seventeenth network service systems.

<First Communication Unit for Game Machine of the Present Invention>

Figure 9:
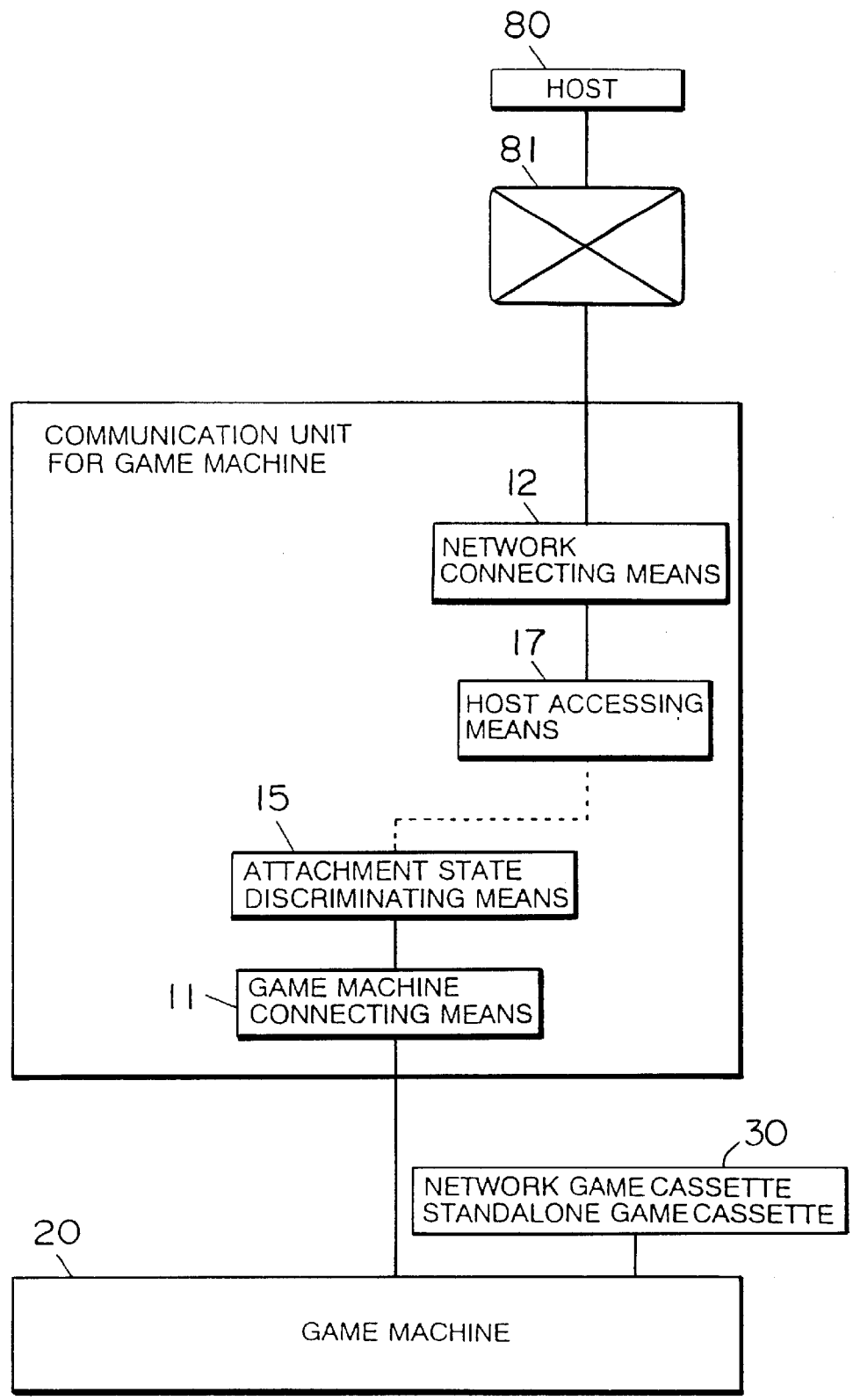
FIG. 9 is a diagram showing a first principle of a communication unit for game machine of the present invention.

In order to achieve the third object of the present invention described before, a first communication unit for game machine of the present invention is constructed as follows. FIG. 9 is a diagram showing a principle of the first communication unit for game machine of the present invention.

That is, the unit comprises game machine connecting means 11 for connecting to a game machine 20, network connecting means 12 for connecting to the network 81 which connects a host 80 which provides a game service, attachment state discriminating means 15 for discriminating whether a game cassette 30 (also referred to as modules and encompasses disks, CD-ROMs and the like) is attached to the game machine 20 and for discriminating its type when it is attached and host accessing means 17 for accessing to the host 80.

When a network gate cassette 30a which allows to play a game utilizing the host 80 is attached to the attachment state discriminating means 15, the host accessing means 17 is activated (corresponds to claim 19).

Here, the network game cassette 30a may be what allows to play the game with the host 80 or with a third party through the network 81. Or, it may be what allows to play the game with both of the host 80 and the third party.

Game cassette attaching means 13 may be realized using a connector. The attachment state discriminating means 15 may be realized by utilizing a combination of a light emitter and light receiver, combination of ultrasonic transmitter and ultrasonic receiver, contactless switch, micro-switch, magnetic sensor, reader of ID codes printed on a label, CPU (central processing unit) or the like.

In operation, according to the first communication unit for game machine of the present invention, the attachment state discriminating means 15 discriminates whether the game cassette 30 is attached to the game machine 20 or not and discriminates its type when it is attached.

Then, when the network game cassette 30a which allows to play a game utilizing the host 80 is attached to the attachment state discriminating means 15, the host accessing means 17 is activated.

<Second Communication Unit for Game Machine of the Present Invention>

Figure 10:
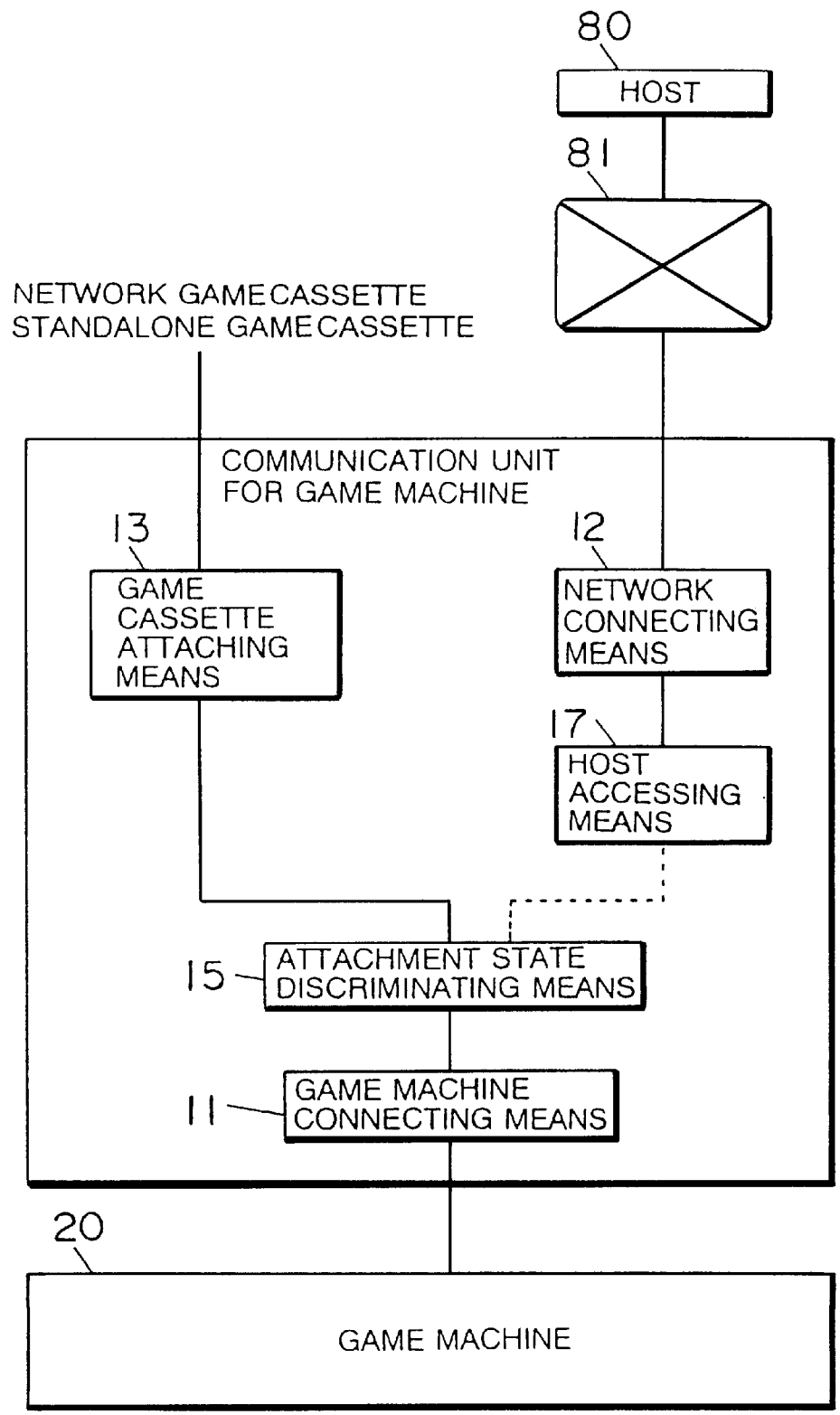
FIG. 10 is a diagram showing a second principle of the communication unit for game machine of the present invention.

In order to achieve the third object of the present invention described above, a second communication unit for game machine of the present invention is constructed as follows. FIG. 10 is a diagram showing a principle of the second communication unit for game machine of the present invention.

That is, the unit comprises the game machine connecting means 11 for connecting to the game machine 20, the network connecting means 12 for connecting to the network 81 which connects the host 80 which provides a game service, the game cassette attaching means 13 for removably attaching either network game cassette 30a which allows to play a game utilizing the game machine 20 and the host 80 or stand-alone game cassette 30b which allows to play a game utilizing the game machine 20, the attachment state discriminating means 15 for discriminating whether the game cassette 30 is attached to the game cassette attaching means 13 and for discriminating its type when it is attached and the host accessing means 17 for accessing to the host 80.

When the network gate cassette 30a is attached to the game cassette attaching means 13, the host accessing means 17 is activated (corresponds to claim 20).

Here, the network game cassette 30a may be what allows to play the game with the host 80 or with the third party through the network 81. Or, it may be what allows to play the game with both of the host 80 and the third party.

The game cassette attaching means 13 may be realized using a connector. The attachment state discriminating means 15 may be realized by utilizing a combination of a light emitter and light receiver, combination of ultrasonic transmitter and ultrasonic receiver, contactless switch, micro-switch, magnetic sensor, reader of ID codes printed on a label, CPU or the like.

In operation, according to the second communication unit for game machine of the present invention, either network game cassette 30a or stand-alone game cassette 30b is removably attached to the game cassette attaching means 13. Then, the attachment state discriminating means 15 discriminates whether the game cassette 30 is attached to the game cassette attaching means 13 or not and discriminates its type when it is attached.

When the network game cassette 30a is attached to the game cassette attaching means 13, the host accessing means 17 is activated.

<Third Communication Unit for Game Machine of the Present Invention>

Figure 31:
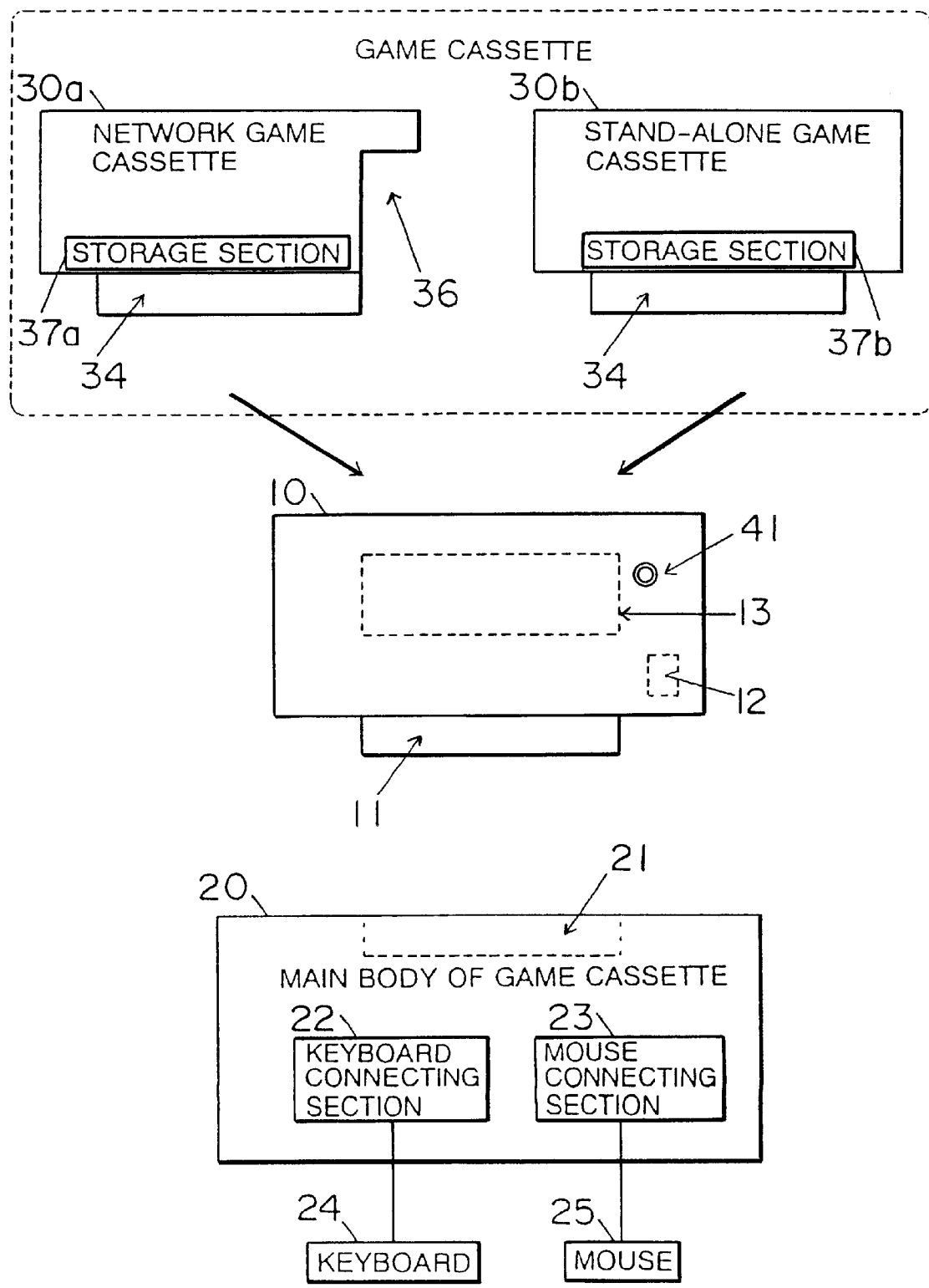
FIG. 31 is a front view of a game cassette, communication unit and main body of game machine in a state separated from each other according to a fifth embodiment.

In order to achieve the third object of the present invention described above, a third communication unit for game machine of the present invention is constructed as follows. FIG. 31 is a diagram showing one preferred embodiment of the third communication unit for game machine of the present invention.

That is, in the first or second communication unit for game machine, cases of the network game cassette 30a and the stand-alone game cassette 30b are formed so as not to transmit light, a cut section is formed on the case of either game cassette 30 and a light emitting section 41a and light receiving section 41b which are positioned so that the cut section 36 is interposed therebetween when the game cassette 30 is attached to the game cassette attaching means 13 are provided.

The attachment state discriminating means 15 discriminates a type of the attached game cassette 30 based on an output of the light receiving section 41b (corresponds to claim 21).

Here, for the light emitting section 41a, a LED (light emitting diode), bulb, luminous paint or the like may be used.

For the light receiving section 41b, a photoconductive cell, photo-diode, photo-transistor, photo-thyristor, photo-multiplier, photo-cell, photo-coupler, photo-interrupter or the like may be used.

In operation, according to the third communication unit for game machine of the present invention, the light receiving section 41b receives light emitted by the light emitting section 41a, in addition to the operation of the first or second communication unit for game machine.

Then, the attachment state discriminating means 15 discriminates the type of the attached game cassette 30 based on the output of the light receiving section 41b.

<Fourth Communication Unit for Game Machine of the Present Invention>

Figure 44:
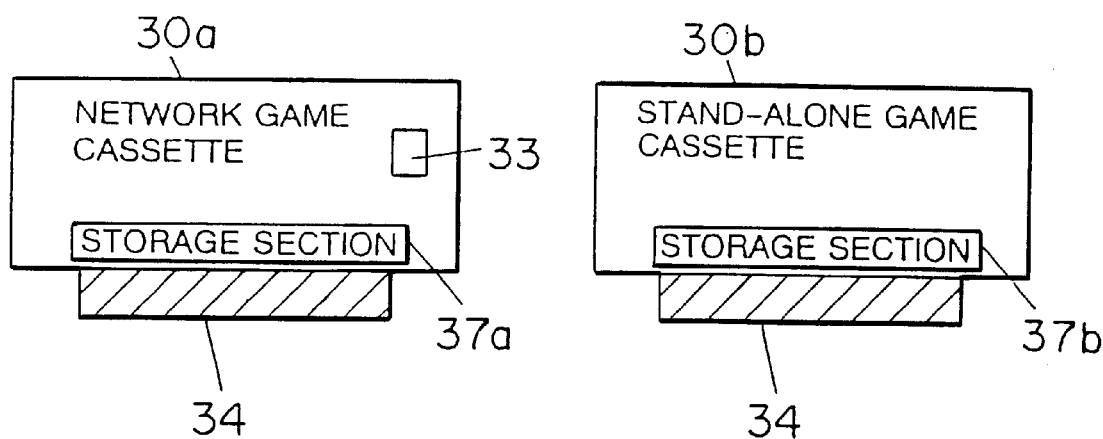
FIG. 44 is a front view of the network game cassette and stand-alone game cassette according to an eighth embodiment.

In order to achieve the third object of the present invention described above, a fourth communication unit for game machine of the present invention is constructed as follows. FIG. 44 is a diagram showing one preferred embodiment of the fourth communication unit for game machine of the present invention.

That is, in the first or second communication unit for game machine, a translucent section 33 having a light transmittivity from one end to the other end is provided either on the case of the network game cassette 30a or on that of the stand-alone game cassette 30b.

Further, the light emitting section 41a and light receiving section 41b which are positioned so that the translucent section 33 is interposed therebetween when the game cassette 30 is attached to the game cassette attaching means 13 are provided.

Then, the attachment state discriminating means 15 discriminates a type of the attached game cassette 30 based on an output of the light receiving section 41b (corresponds to claim 22).

Here, for the light emitting section 41a, a LED, bulb, luminous paint or the like may be used.

For the light receiving section 41b, a photoconductive cell, photo-diode, photo-transistor, photo-thyristor, photo-multiplier, photo-cell, photo-coupler, photo-interrupter or the like may be used.

In operation, according to the fourth communication unit for game machine of the present invention, the light receiving section 41b receives light emitted by the light emitting section 41a, in addition to the operation of the first or second communication unit for game machine.

Then, the attachment state discriminating means 15 discriminates the type of the attached game cassette 30 based on the output of the light receiving section 41b.

<Fifth Communication Unit for Game Machine of the Present Invention>

In order to achieve the third object of the present invention described above, a fifth communication unit for game machine of the present invention is constructed as follows.

That is, in the first or second communication unit for game machine, the cut section 36 is formed either on the case of the network game cassette 30a or on that of the stand-alone game cassette 30b.

Further, an ultrasonic transmitting section 42a and ultrasonic receiving section 42b positioned so that the cut section 36 is interposed therebetween when the game cassette 30 is attached to the game cassette attaching means 13 are provided.

Then, the attachment state discriminating means 15 discriminates a type of the attached game cassette 30 based on an output of the ultrasonic receiving section 42b (corresponds to claim 23).

Here, for the ultrasonic transmitting section 42a, a piezo-electric vibrator (e.g., quartz crystal), electrostrictive vibrator (e.g., $BaTiO_3$), magnetostrictive vibrator (e.g., nickel, ferrite) or the like may be used.

In operation, according to the fifth communication unit for game machine of the present invention, the ultrasonic receiving section 42b receives ultrasonic transmitted by the ultrasonic transmitting section 42a, in addition to the operation of the first or second communication unit for game machine.

Then, the attachment state discriminating means 15 discriminates the type of the attached game cassette 30 based on the output of the ultrasonic receiving section 42b.

15

<Sixth Communication Unit for Game Machine of the Present Invention>

Figure 45:
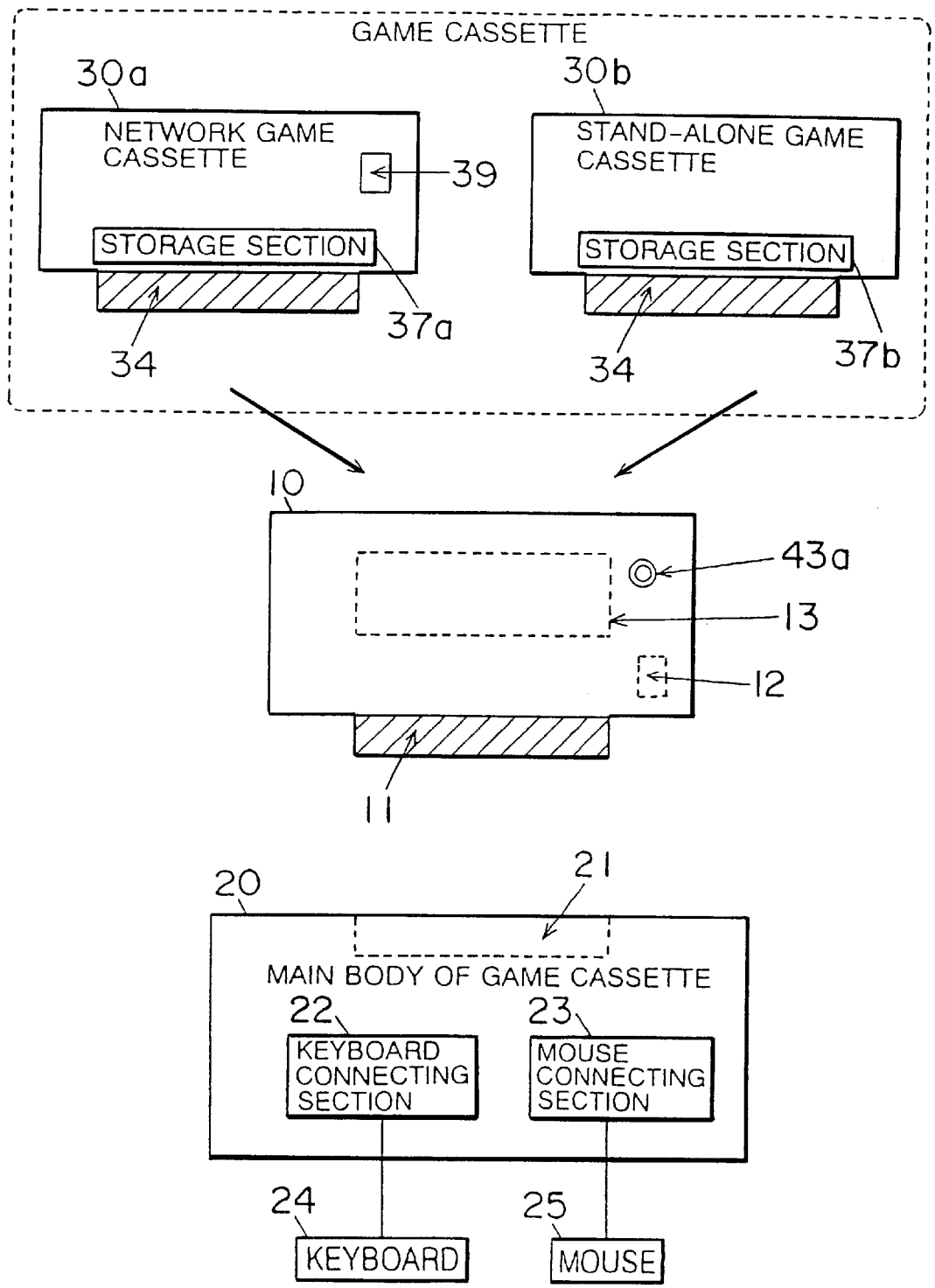
FIG. 45 is a front view of the game cassette, communication unit and main body of game machine in a state separated from each other according to a ninth embodiment.

In order to achieve the third object of the present invention described above, a sixth communication unit for game machine of the present invention is constructed as follows. FIG. 45 is a diagram showing one preferred embodiment of the sixth communication unit for game machine of the present invention.

That is, in the first or second communication unit for game machine, a magnetic body 39 is provided either on the case of the network game cassette 30a or on that of the stand-alone game cassette 30b.

Further, a magnetic contactless switch 43a for detecting the magnetic body 39 when the game cassette 30 is attached to the game cassette attaching means 13 is provided.

Then, the attachment state discriminating means 15 discriminates a type of the attached game cassette 30 based on a detection result of the magnetic contactless switch 43a (corresponds to claim 24).

In operation, according to the sixth communication unit for game machine of the present invention, the magnetic contactless switch 43a detects the magnetic body 39 provided either on the case of the network game cassette 30a or on that of the stand-alone game cassette 30b when the game cassette 30 is attached to the game cassette attaching means 13, in addition to the operation of the first or second communication unit for game machine.

Then, the attachment state discriminating means 15 discriminates the type of the attached game cassette 30 based on the detection result of the magnetic contactless switch 43a.

<Seventh Communication Unit for Game Machine of the Present Invention>

Figure 47:
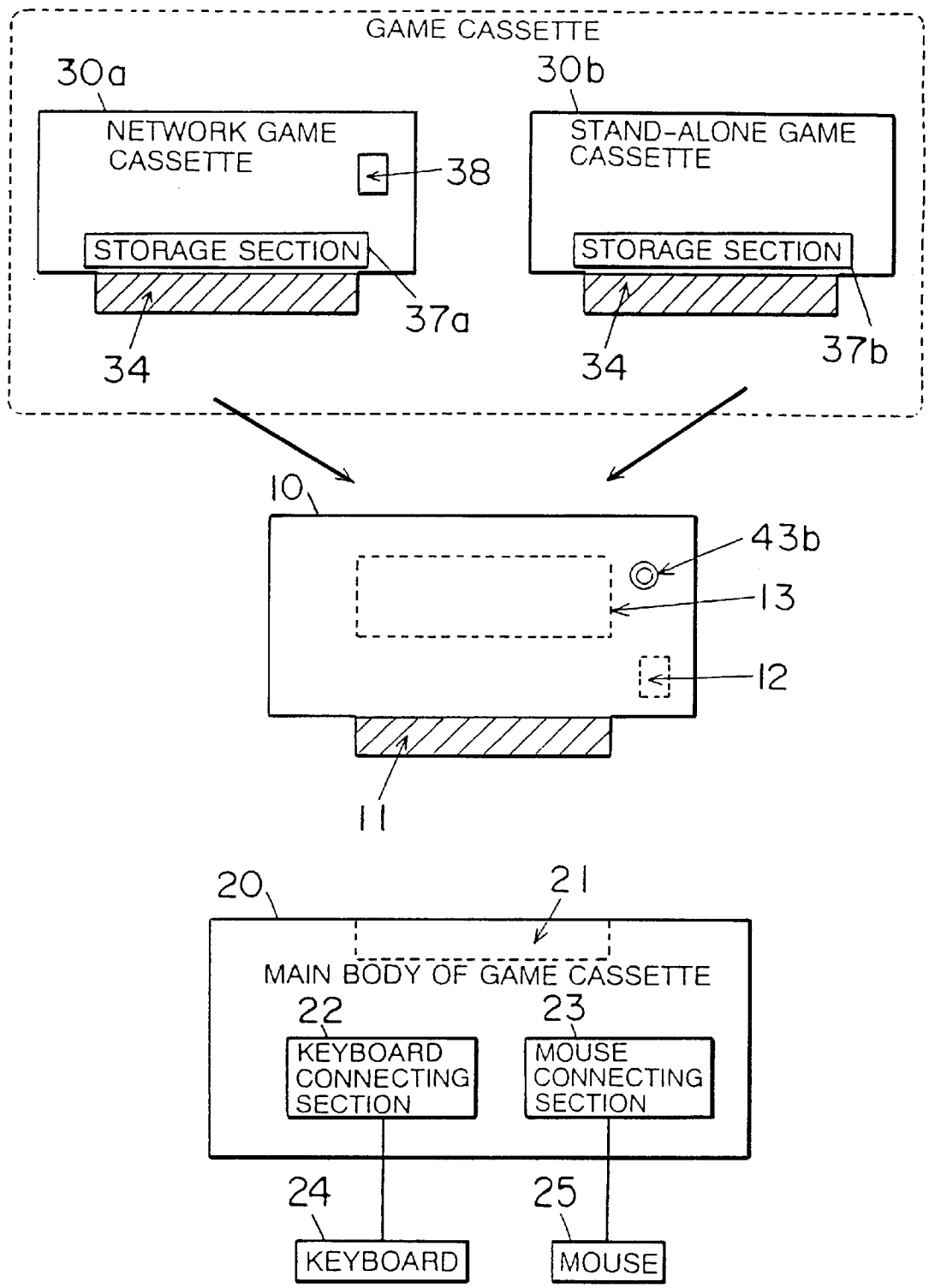
FIG. 47 is a front view of the game cassette, communication unit and main body of game machine in a state separated from each other according to a tenth embodiment.

In order to achieve the third object of the present invention described above, a seventh communication unit for game machine of the present invention is constructed as follows. FIG. 47 is a diagram showing one preferred embodiment of the seventh communication unit for game machine of the present invention.

That is, in the first or second communication unit for game machine, a metallic body 38 is provided either on the case of the network game cassette 30a or on that of the stand-alone game cassette 30b.

Further, a high frequency contactless switch 43b for detecting the metallic body 38 when the game cassette 30 is attached to the game cassette attaching means 13 is provided.

Then, the attachment state discriminating means 15 discriminates a type of the attached game cassette 30 based on a detection result of the high frequency contactless switch 43b (corresponds to claim 25).

Here, for the metallic body 38, iron, aluminum, copper or the like may be used for example.

By the way, the high frequency contactless switch 43b is called also as a high frequency oscillating contactless switch.

In operation, according to the seventh communication unit for game machine of the present invention, the high frequency contactless switch 43b detects the metallic body 38 provided either on the case of the network game cassette 30a or on that of the stand-alone game cassette 30b when the game cassette 30 is attached to the game cassette attaching means 13, in addition to the operation of the first or second communication unit for game machine.

Then, the attachment state discriminating means 15 discriminates the type of the attached game cassette 30 based on the detection result of the high frequency contactless switch 43b.

16

<Eighth Communication Unit for Game Machine of the Present Invention>

Figure 36:
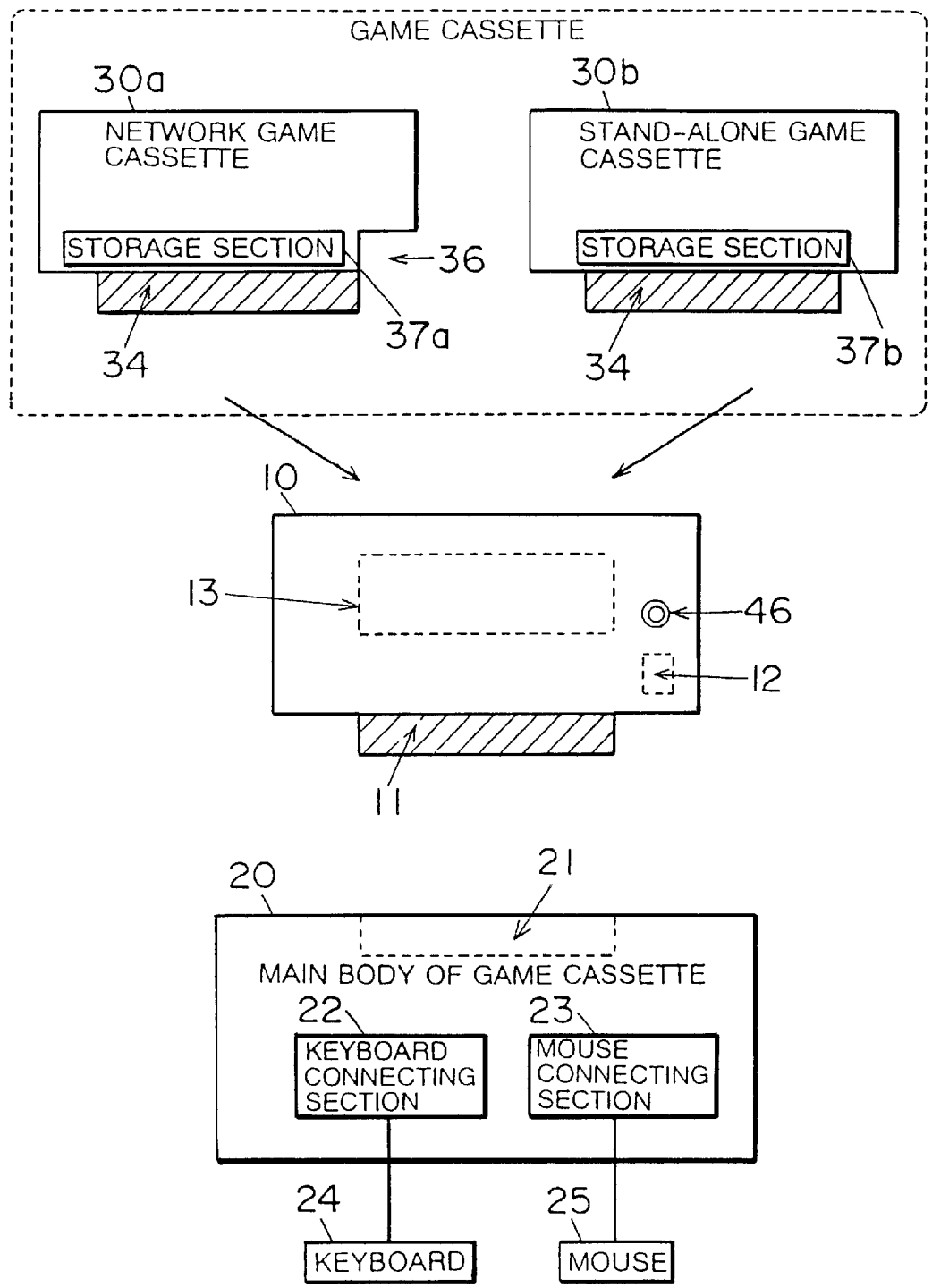
FIG. 36 is a front view of the game cassette, communication unit and main body of game machine in a state separated from each other according to a sixth embodiment.
Figure 37:
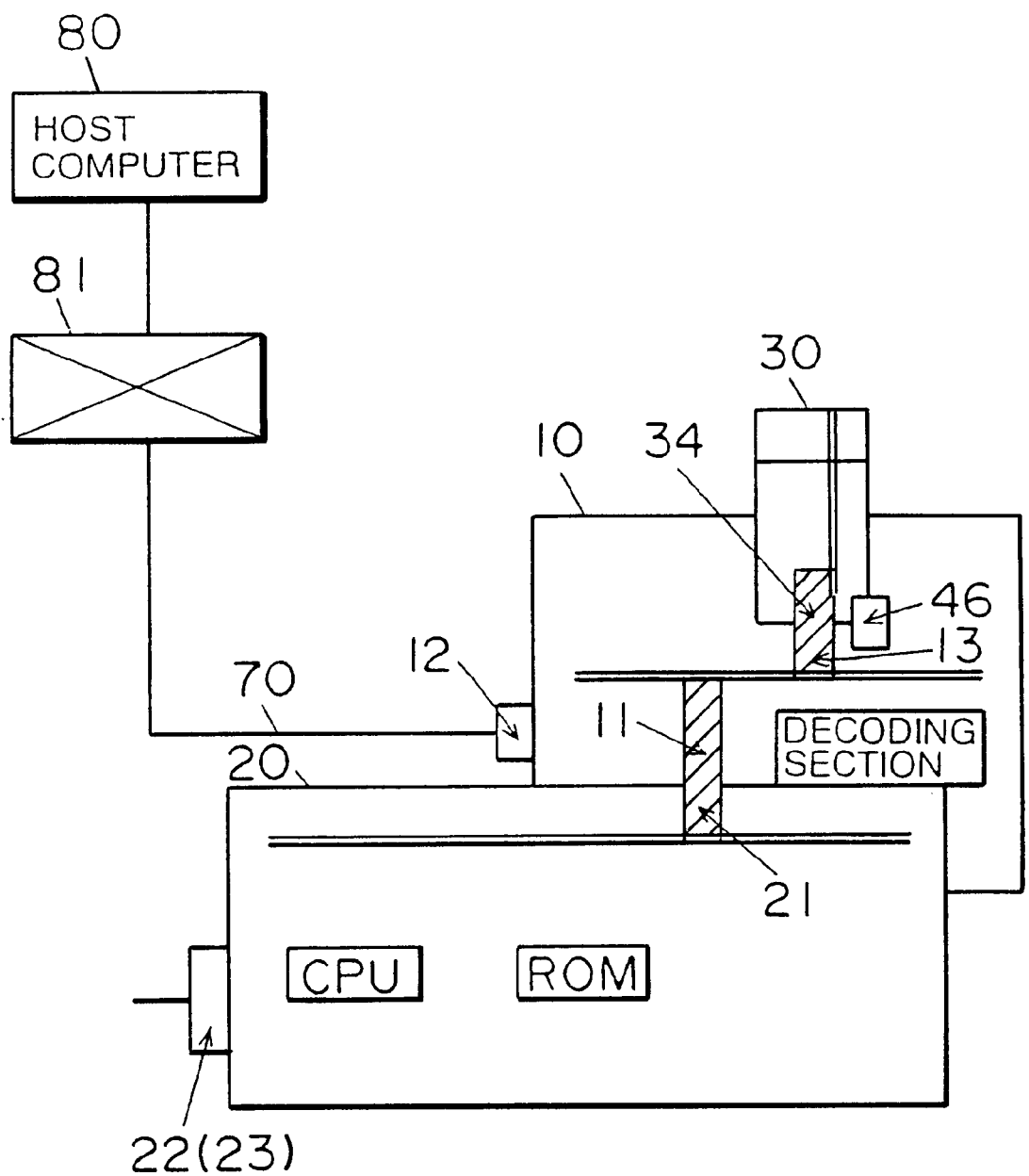
FIG. 37 is a side view of the game cassette, communication unit and main body of game machine in a combined state according to the sixth embodiment.

In order to achieve the third object of the present invention described above, an eighth communication unit for game machine of the present invention is constructed as follows. FIG. 36 is a diagram showing one preferred embodiment of the eighth communication unit for game machine of the present invention.

That is, in the first or second communication unit for game machine, each case of the network game cassette 30a and stand-alone game cassette 30b is formed so as to have a different shape.

Further, a microswitch 46 which can contact either with the case of the network game cassette 30a or with that of the stand-alone game cassette 30b when the game cassette 30 is attached to the game cassette attaching means 13 is provided.

Then, the attachment state discriminating means 15 discriminates a type of the attached game cassette 30 based on a detection result of the microswitch 46 (corresponds to claim 26).

In operation, according to the eighth communication unit for game machine of the present invention, the microswitch 46 contacts either with the case of the network game cassette 30a or with that of the stand-alone game cassette 30b when the game cassette 30 is attached to the game cassette attaching means 13, in addition to the operation of the first or second communication unit for game machine.

Then, the attachment state discriminating means 15 discriminates the type of the attached game cassette 30 based on the detection result of the microswitch 46.

<Ninth Communication Unit for Game Machine of the Present Invention>

In order to achieve the third object of the present invention described above, a ninth communication unit for game machine of the present invention is constructed as follows.

That is, in the first or second communication unit for game machine, a magnetic body 39 is provided either on the case of the network game cassette 30a or on that of the stand-alone game cassette 30b.

Further, a magnetic sensor 44 for detecting the magnetic body 39 when the game cassette 30 is attached to the game cassette attaching means 13 is provided.

Then, the attachment state discriminating means 15 discriminates a type of the attached game cassette 30 based on a detection result of the magnetic sensor 44 (corresponds to claim 27).

Here, for the magnetic body 39, a lead switch, Hall element, magnetic induction coil, superconductive device or the like may be used.

In operation, according to the ninth communication unit for game machine of the present invention, the magnetic sensor 44 detects the magnetic body 39 provided either on the case of the network game cassette 30a or on that of the stand-alone game cassette 30b when the game cassette 30 is attached to the game cassette attaching means 13, in addition to the operation of the first or second communication unit for game machine.

Then, the attachment state discriminating means 15 discriminates the type of the attached game cassette 30 based on the detection result of the magnetic sensor 44.

<Tenth Communication Unit for Game Machine of the Present Invention>

Figure 49:
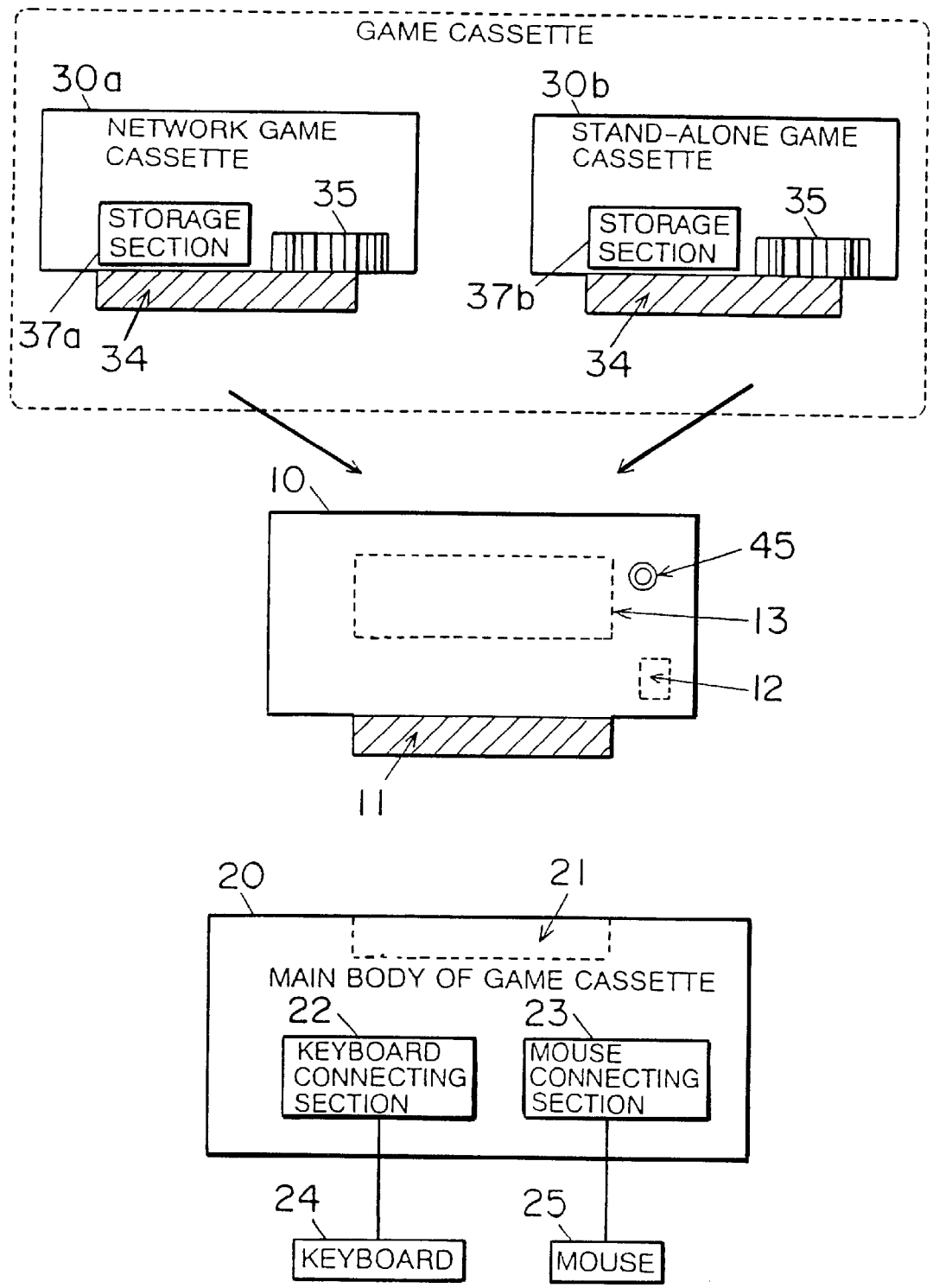
FIG. 49 is a front view of the game cassette, communication unit and main body of game machine in a state separated from each other according to an eleventh embodiment.

In order to achieve the third object of the present invention described above, a tenth communication unit for game machine of the present invention is constructed as follows. FIG. 49 is a diagram showing one preferred embodiment of the tenth communication unit for game machine of the present invention.

That is, in the first or second communication unit for game machine, a label 35 on which ID code is printed is provided at least either on the surface of the case of the network game cassette 30a or on that of the stand-alone game cassette 30b.

Further, ID code reading means 45 for reading the ID code on the label 35 when the game cassette 30 is attached to the game cassette attaching means 13 is provided.

Then, the attachment state discriminating means 15 discriminates a type of the attached game cassette 30 based on a read result of the ID code reading means 45 (corresponds to claim 28).

Here, for the ID code, a bar code or the like may be used.

In operation, according to the tenth communication unit for game machine of the present invention, the ID code reading means 45 reads the ID code printed on the label 35 provided either on the surface of the case of the network game cassette 30a or on that of the stand-alone game cassette 30b when the game cassette 30 is attached to the game cassette attaching means 13, in addition to the operation of the first or second communication unit for game machine.

Then, the attachment state discriminating means 15 discriminates the type of the attached game cassette 30 based on the read result of the ID code reading means 45.

<Eleventh Communication Unit for Game Machine of the Present Invention>

In order to achieve the third object of the present invention described above, an eleventh communication unit for game machine of the present invention is constructed as follows.

That is, in the first communication unit for game machine, a memory section 37 in which ID information which allows to discriminate a type of the game cassette 30 is provided on the network game cassette 30a and stand-alone game cassette 30b.

The attachment state discriminating means 15 discriminates a type of the attached game cassette 30 by reading the ID information stored in the memory section 37 when the game cassette 30 is attached to the game cassette attaching means 13 (corresponds to claim 29).

Here, for the memory section 37, a mask ROM (read only memory), PROM, EPROM, EEPROM or the like may be used.

In operation, according to the eleventh communication unit for game machine of the present invention, the attachment state discriminating means 15 discriminates the type of the attached game cassette 30 by reading the ID information stored in the memory section 37 when the game cassette 30 is attached to the game cassette attaching means 13.

<Twelfth Communication Unit for Game Machine of the Present Invention>

In order to achieve the third object of the present invention described above, a twelfth communication unit for game machine of the present invention is constructed as follows.

That is, in the first or second communication unit for game machine, the game machine connecting means 11 is formed as a terminal attachable to a game cassette attachment port 21 of the game machine 20 and the game cassette attaching means 13 is formed as an attachment port which allows to attach the existing game cassette 30 (corresponds to claim 30).

Here, the terminal includes a connector.

The operation of the twelfth communication unit for game machine is the same with that of the first or second communication unit for game machine.

<Thirteenth Communication Unit for Game Machine of the Present Invention>

In order to achieve the third object of the present invention described above, a thirteenth communication unit for game machine of the present invention is constructed as follows.

That is, the network 81 connected to the first through twelfth communication units for game machine is any one of the first through eighteenth network service systems (corresponds to claim 31).

That is, according to the thirteenth communication unit for game machine of the present invention, any one network of the first through eighteenth network service systems is connected to the first through twelfth communication units for game machine.

<First Game Machine of the Present Invention>

Figure 11:
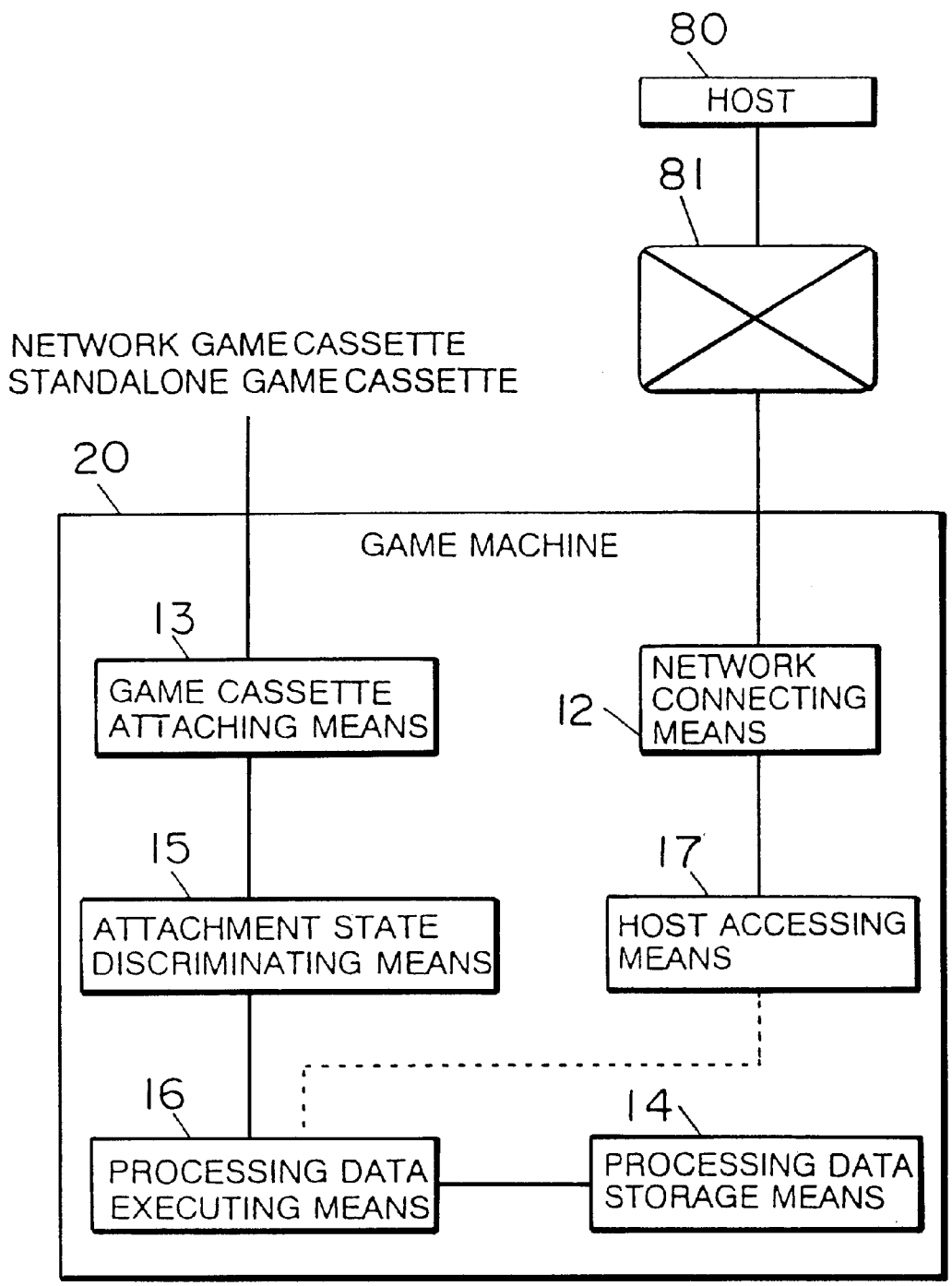
FIG. 11 is a diagram showing a first principle of a game machine of the present invention.

In order to achieve the fourth object of the present invention described above, a first game machine of the present invention is constructed as follows. FIG. 11 is a diagram showing a principle of the first game machine of the present invention.

That is, the game machine having the network connecting means 12 for connecting to the network 81 which is connected with the host 80 which provides game services and the game cassette attaching means 13 for removably attaching either network game cassette 30a which allows to play a game using the host 80 or stand-alone game cassette 30b which allows to play a game without using the host 80 comprises processing information storage means 14 for storing processing information for the network connecting means 12, network game cassette 30a and stand-alone game cassette 30b, the attachment state discriminating means 15 which discriminates whether the game cassette 30 is attached to the game cassette attaching means 13 or not and discriminates a type of the game cassette when it is attached, processing information executing means 16 for executing the processing information stored in the processing information storage means 14 based on the discrimination result of the attachment state discriminating means 15 and host accessing means 17 for accessing to the host 80.

Then, when the network game cassette 30a is attached to the game cassette attaching means 13, the host accessing means 17 is activated (corresponds to claim 32).

Here, for the processing information storage means 14, a ROM (read only memory), semiconductor memory, magnetic disk memory, flexible unit, magnetic tape unit, CD-ROM (compact disc ROM), M/O (magneto-optic) memory or the like may be used.

The processing information executing means 16 may be realized by a program executed on the CPU.

In operation, according to the first game machine of the present invention, either network game cassette 30a or stand-alone game cassette 30b is removably attached to the game cassette attaching means 13. Then, the attachment state discriminating means 15 discriminates the attachment state of the game cassette attaching means 13.

Next, the processing information executing means 16 executes the processing information stored in the processing information storage means 14 based on the discrimination result of the attachment state discriminating means 15.

When the network game cassette 30a is attached to the game cassette attaching means 13, the host accessing means 17 is activated.

<Second Game Machine of the Present Invention>

Figure 12:
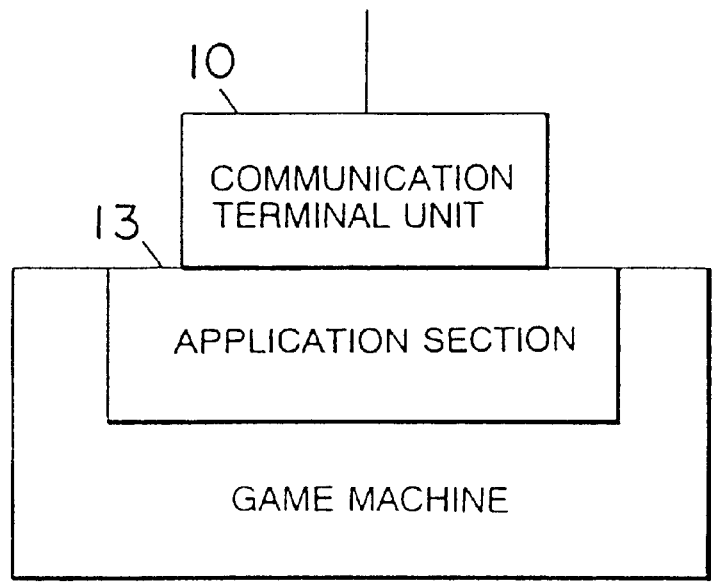
FIG. 12 is a diagram showing a second principle of the game machine of the present invention.

In order to achieve the fourth object of the present invention described above, a second game machine of the present invention is constructed as follows. FIG. 12 is a diagram showing a principle of the second game machine of the present invention.

That is, the game machine comprises an application section 13 for attaching a communication terminal unit 10.

Then, when either network application medium ROM-B in which an application software for network service is stored or stand-alone application medium ROM-C in which an application software for stand-alone service is stored is attached to the communication terminal unit 10, the machine executes a processing related to the network application medium ROM-B or stand-alone application medium ROM-C by linking with a processing related to the communication terminal unit 10 (corresponds to claim 33).

In operation, according to the second game machine of the present invention, the processing related to the network application medium ROM-B or stand-alone application medium ROM-C is executed in linkage with the processing related to the communication terminal unit 10.

<Third Game Machine of the Present Invention>

Figure 13:
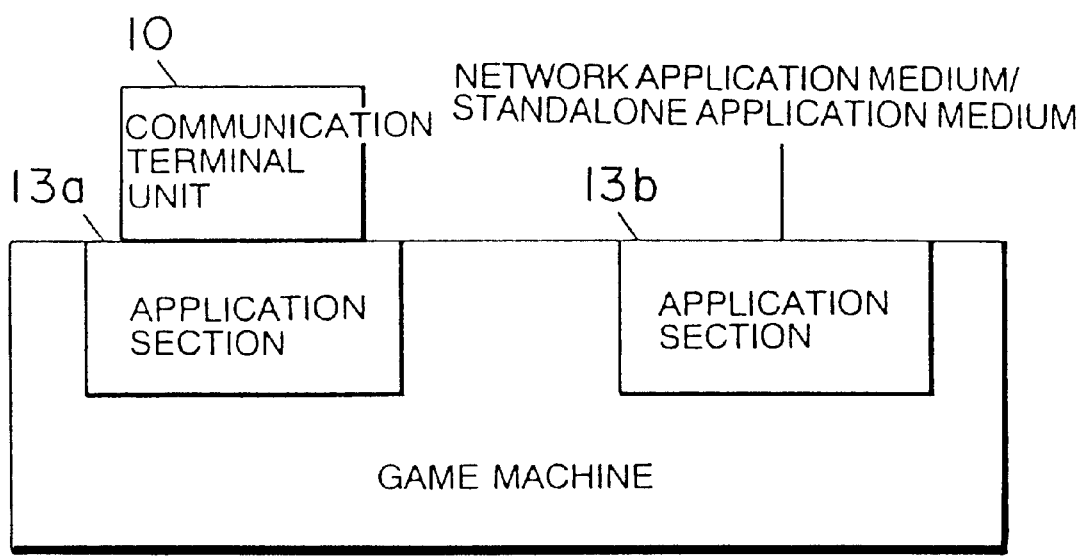
FIG. 13 is a diagram showing a third principle of the game machine of the present invention.

In order to achieve the fourth object of the present invention described above, a third game machine of the present invention is constructed as follows. FIG. 13 is a diagram showing a principle of the third game machine of the present invention.

That is, the game machine comprises a first application section 13a for attaching the communication terminal unit 10 and a second application section 13b for attaching either network application medium (ROM-B) in which the application software for network service is stored or stand-alone application medium (ROM-C) in which the application software for stand-alone service is stored.

Then, the machine executes the processing related to the network application medium ROM-B or stand-alone application medium ROM-C by linking with the processing related to the communication terminal unit 10 (corresponds to claim 34).

<Fourth Game Machine of the Present Invention>

In order to achieve the fourth object of the present invention described above, a fourth game machine of the and 14c are diagrams showing a principle of the fourth game machine of the present invention.

That is, the game machine comprises a plurality of application sections 13a and 13b for attaching either communication terminal unit 10, network application medium ROM-B in which the application software for network service is stored or stand-alone application medium ROM-C in which the application software for stand-alone service is stored.

Figure 14:
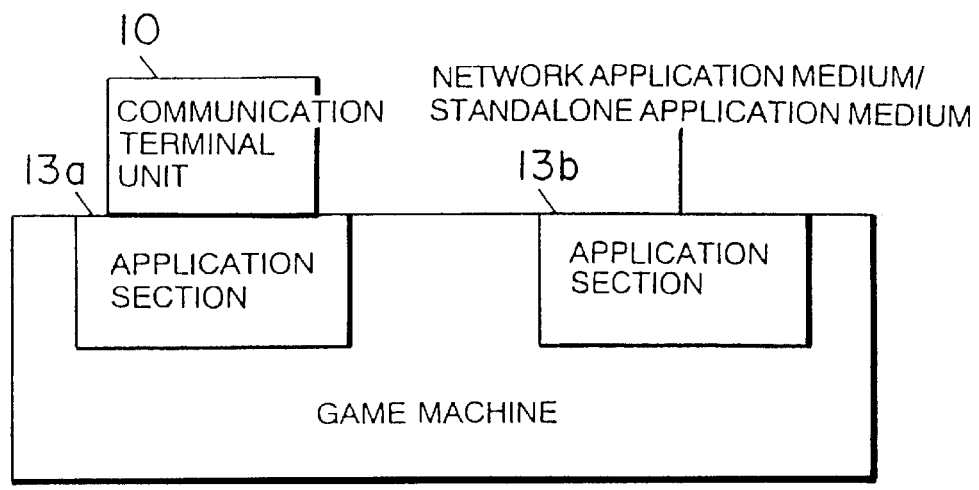
FIGS. 14a, 14b and 14c are diagrams showing a fourth principle of the game machine of the present invention.
Figure 14:
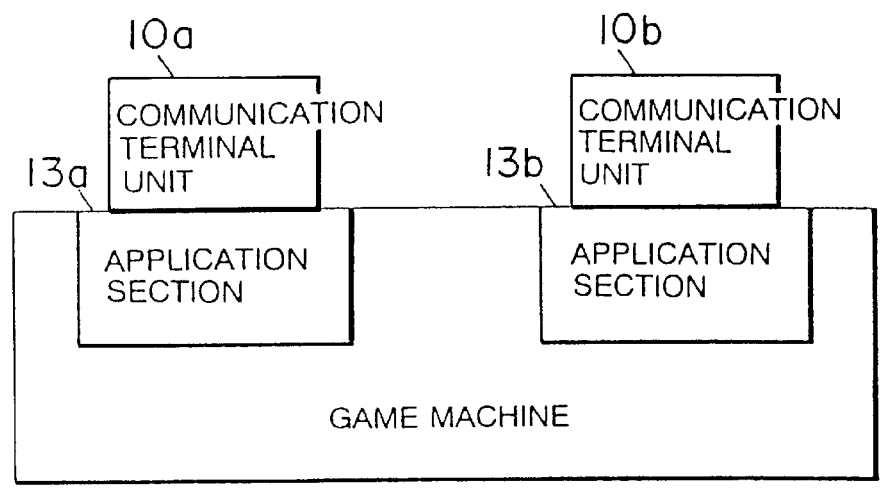
Figure 14:
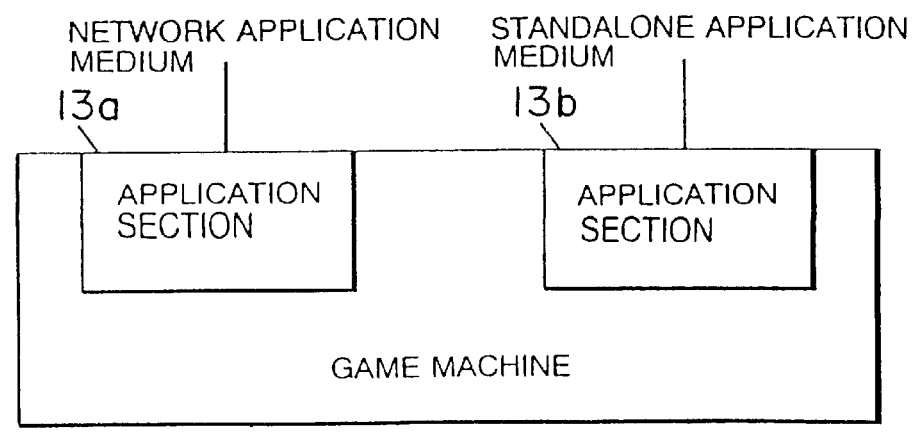

Three modes as shown in FIGS. 14a through 14c are conceivable as modes connected to the plurality of application sections 13a and 13b.

FIG. 14a shows a case when the network application medium ROM-B or stand-alone application medium ROM-C is connected to one application section 13b and the communication terminal unit 10 is connected to the other application section 13a. In this case, the processing related to the network application medium ROM-B or stand-alone application medium ROM-C is executed in linkage with the processing related to the communication terminal unit 10 (corresponds to claim 35).

By the way, it is also possible to attach a communication terminal unit 10b to one application section 13b and to attach another communication terminal unit 10a to the other application section 13a as shown in FIG. 14b.

Further, it is also possible to attach the stand-alone application medium ROM-C to one application section 13b and to attach the network application medium ROM-B to the other application section 13a as shown in FIG. 14c.

<Fifth Game Machine of the Present Invention>

Figure 15:
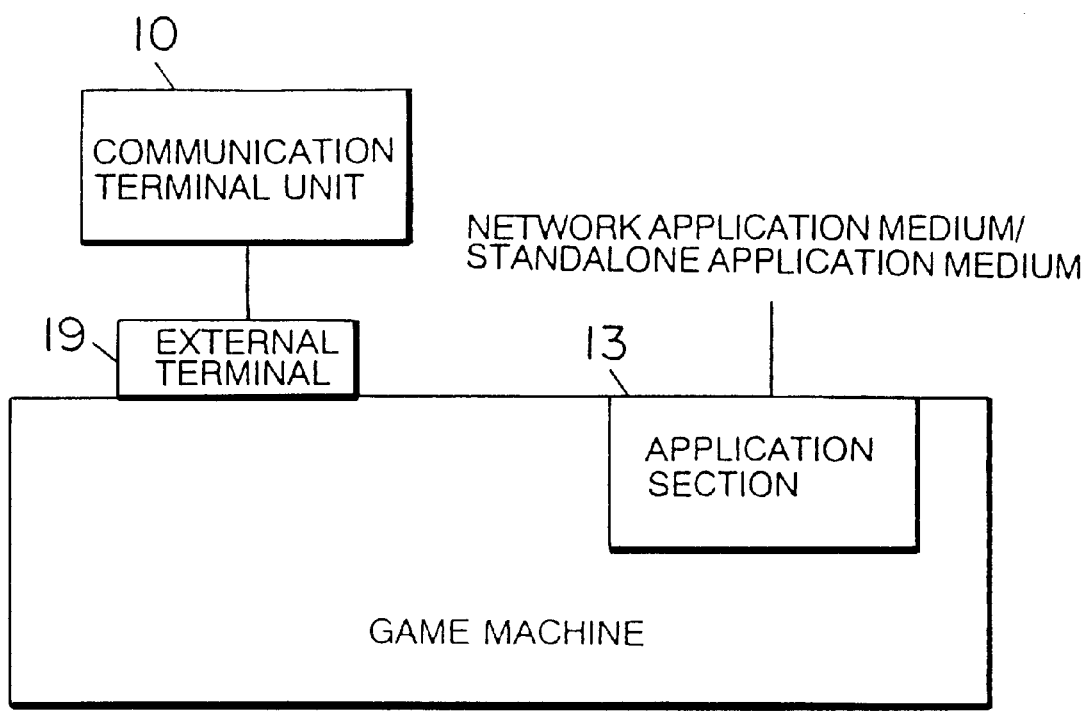
FIG. 15 is a diagram showing a fifth principle of the game machine of the present invention.

In order to achieve the fourth object of the present invention described above, a fifth game machine of the present invention is constructed as follows. FIG. 15 is a diagram showing a principle of the fifth game machine of the present invention.

That is, the game machine comprises an application section 13 for attaching either network application medium ROM-B in which the application software for network service is stored or stand-alone application medium ROM-C in which the application software for stand-alone service is stored and an external terminal 19 for connecting the communication terminal unit 10.

Then, the machine executes the processing related to either the network application medium ROM-B or stand-alone application medium ROM-C by linking with the processing related to the communication terminal unit 10 connected to the external terminal 19 (corresponds to claim 36).

In operation, according to the fifth game machine of the present invention, the machine executes the processing related to either network application medium ROM-B or stand-alone application medium ROM-C by linking with the processing related to the communication terminal unit 10 connected to the external terminal 19.

<Sixth Game Machine of the Present Invention>

In order to achieve the fourth object of the present invention described above, a sixth game machine of the present invention is constructed as follows.

That is, in the second through fifth game machines, the processing-related to the network application medium ROM-B or stand-alone application medium ROM-C is executed preferentially over the processing related to the communication terminal unit 10 (corresponds to claim 37).

In operation, according to the sixth game machine of the present invention, the processing related to the network application medium ROM-B or stand-alone application medium ROM-C is operated preferentially over the processing related to the communication terminal unit 10, in addition to the operation of the second through fifth game machines.

<Seventh Game Machine of the Present Invention>

In order to achieve the fourth object of the present invention described above, a seventh game machine of the present invention is constructed as follows.

That is, in the second through fifth game machines, the network application medium ROM-B discriminates whether the communication terminal unit 10 is attached or not and when the communication terminal unit 10 does not have a communication application software ROM-A for connecting to the host computer 80 which provides network services via the network 81, executes a network service process by implementing a process for connecting the line to the network 81 and the host computer 80 by itself (corresponds to claim 38).

In operation, according to the seventh game machine of the present invention, the network application medium ROM-B discriminates whether the communication terminal unit 10 is attached or not and when the communication terminal unit 10 does not have the communication application software ROM-A for connecting to the host computer 80 which provides network services via the network 81, executes the network service process by implementing the process for connecting the line to the network 81 and host computer 80 by itself, in addition to the operation of the second through fifth game machine.

<Eighth Game Machine of the Present Invention>

In order to achieve the fourth object of the present invention described above, an eighth game machine of the present invention is constructed as follows.

That is, in the second through fifth game machines, the network application medium ROM-B discriminates whether the communication terminal unit 10 is attached or not and when the communication terminal unit 10 has the communication application software ROM-A for connecting to the host computer 80 which provides network services via the network 81, connects the line to the network 81 and the host computer 80 utilizing the communication terminal unit 10 (corresponds to claim 39).

In operation, according to the eighth game machine of the present invention, the network application medium ROM-B discriminates whether the communication terminal unit 10 is attached or not and when the communication terminal unit 10 has the communication application software ROM-A for connecting to the host computer 80 which provides network services via the network 81, connects the line to the network 81 and host computer 80 utilizing the communication terminal unit 10.

<Ninth Game Machine of the Present Invention>

In order to achieve the fourth object of the present invention described above, a ninth game machine of the present invention is constructed as follows.

That is, in the second through fifth game machines, the processing related to the communication terminal unit 10 is executed preferentially over the processing related to the network application medium ROM-B or stand-alone application medium ROM-C (corresponds to claim 40).

In operation, according to the ninth game machine of the present invention, the processing related to the communication terminal unit 10 is operated preferentially over the processing related to the network application medium ROM-B or stand-alone application medium ROM-C, in addition to the operation of the second through fifth game machine.

<Tenth Game Machine of the Present Invention>

In order to achieve the fourth object of the present invention described above, a tenth game machine of the present invention is constructed as follows.

That is, in the second through fifth game machines, the communication terminal unit 10 discriminates whether the network application medium ROM-B or stand-alone application medium ROM-C is attached when it has the communication application software ROM-A for connecting to the host computer 80 which provides network services via the network 81.

Then, when the network application medium ROM-B is attached, it operates the communication application software ROM-A by linking with the network application medium ROM-B.

When the stand-alone application medium ROM-C is attached on the other hand, it executes the communication application software ROM-A by linking with the stand-alone application medium ROM-C and stops the execution of the communication application software ROM-A when the stand-alone application medium ROM-C is activated (corresponds to claim 41).

In operation, according to the tenth game machine of the present invention, the communication terminal unit 10 discriminates whether the network application medium ROM-B or stand-alone application medium ROM-C is attached when it has the communication application software ROM-A for connecting to the host computer 80 which provides network services via the network 81, in addition to the operation of the second through fifth game machine.

Then, when the network application medium ROM-B is attached, it operates the communication application software ROM-A by linking with the network application medium ROM-B.

When the stand-alone application medium ROM-C is attached on the other hand, it executes the communication application software ROM-A by linking with the stand-alone application medium ROM-C and stops the execution of the communication application software ROM-A when the stand-alone application medium ROM-C is activated.

<Eleventh Game Machine of the Present Invention>

In order to achieve the fourth object of the present invention described above, an eleventh game machine of the present invention is constructed as follows.

That is, in the first through tenth game machines, the game machine is adapted to be able to select one which is preferentially executed among the communication application software ROM-A, network application medium ROM-B and stand-alone application medium ROM-C.

When the network application medium ROM-B is attached, the line is automatically connected to the network 81 and host computer 80.

When the stand-alone application medium ROM-C is attached, the stand-alone application medium ROM-C is executed.

When no application medium is attached, the communication application software ROM-A is executed (corresponds to claim 42).

In operation, according to the eleventh game machine of the present invention, when the network application medium ROM-B is attached, the line is automatically connected to the network 81 and host computer 80. When the stand-alone application medium ROM-C is attached, the stand-alone application medium ROM-C is executed. And when no application medium is attached, the communication application software ROM-A is executed.

<Twelfth Game Machine of the Present Invention>

In order to achieve the fourth object of the present invention described above, a twelfth game machine of the present invention is constructed as follows.

That is, the network connected to the first through eleventh game machines is any one of the first through eighteenth network service systems (corresponds to claim 43).

Here, the information processing terminal 20 in the first through eighteenth network service systems corresponds to the game machine. Further, the storage media for network service 32*a*, 32*b* and 32*c* and the storage media for linkage service 31*a*, 31*b* and 31*c* correspond to the network game cassette 30*a* and network application medium ROM-B, respectively.

In operation, according to the twelfth game machine of the present invention, any one of the first through eighteenth network service systems is connected to the first through eleventh game machines.

According to the first through fifteenth network service systems of the present invention, an amount of information communicated between the host computer or host computer for linkage service and the information processing terminal may be reduced by storing image, sound and music information necessary for the network service and the processing of algorithm and of command for the network service in the storage medium for network service and storage medium for linkage service. That is, the service may be provided economically through the network.

According to the sixteenth through eighteenth network service systems of the present invention, the second host computer can provide services to the information processing terminal without passing through the first host computer. That is, the operation burden of the main host computer may be reduced.

According to the first through thirteenth communication units for game machine of the present invention, both of the stand-alone game cassette and network game cassette may be used while connecting them to the game machine since the attachment state discriminating means recognizes the attachment state of the game cassette attaching means. That is, a game may be played utilizing the network service system when the network game cassette is used.

Further, according to the first through twelfth game machines of the present invention, both of the stand-alone game cassette and network game cassette may be used since the attachment state discriminating means recognizes the attachment state of the game cassette attaching means. That is, a game may be played utilizing the network service system when the network game cassette is used.

First Embodiment

Referring now to FIGS. 16 through 23, a first preferred embodiment of the present invention will be explained.

[Outline of the First Embodiment]

Figure 16:
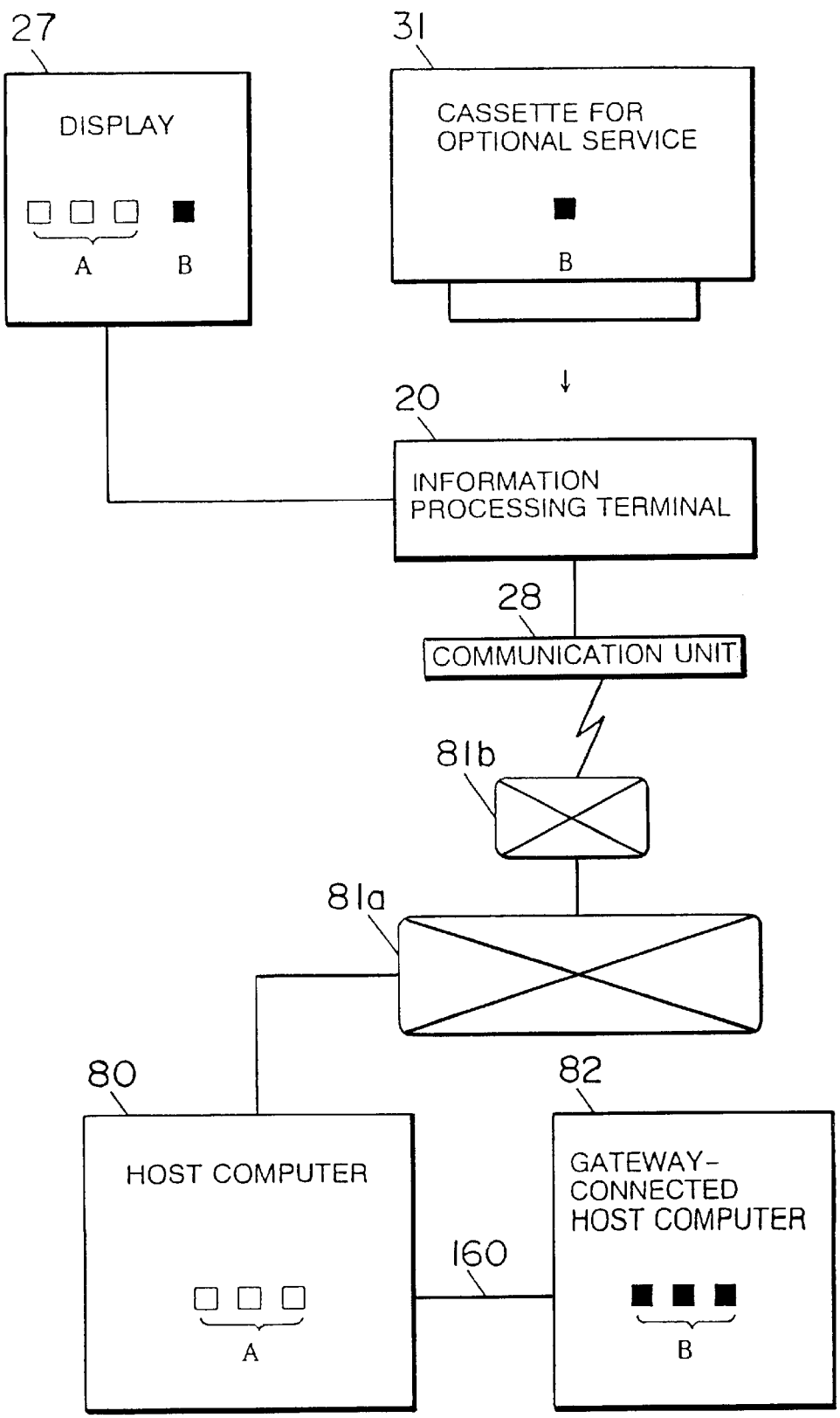
FIG. 16 is a diagram showing a system structure of a first embodiment.

As shown in FIG. 16, the first embodiment is composed of elements a) through h) below.

a) an information processing terminal 20 which is either personal computer, TV game machine or special-purpose terminal;

b) a display 27 connected to the information processing terminal 20 for displaying a processing result;

c) a communication unit 28 connected to the information processing terminal 20 for operating a communication processing;

d) a public line 81*b* connected to the communication unit 28;

e) a VAN (value added network) network 81*a* connected to the public line 81*b*;

f) a host computer 80 connected to the VAN network 81*a* for providing services through the VAN network 81*a*;

g) a gateway-connected host computer 82 connected to the host computer 80 via a dedicated line 160 for providing services linked with the services provided by the host computer 80; and h) a cassette for optional service 31, used by attaching to the information processing terminal 20, for storing application softwares in which algorithms and commands necessary in receiving the network services provided by the gateway-connected host computer 82 are described.

By the way, when the information processing terminal 20 is provided with a function of communication, it may be connected to the public line 81*b* without passing through the communication unit 28.

[Processing Sequence of the First Embodiment]

Figure 17:
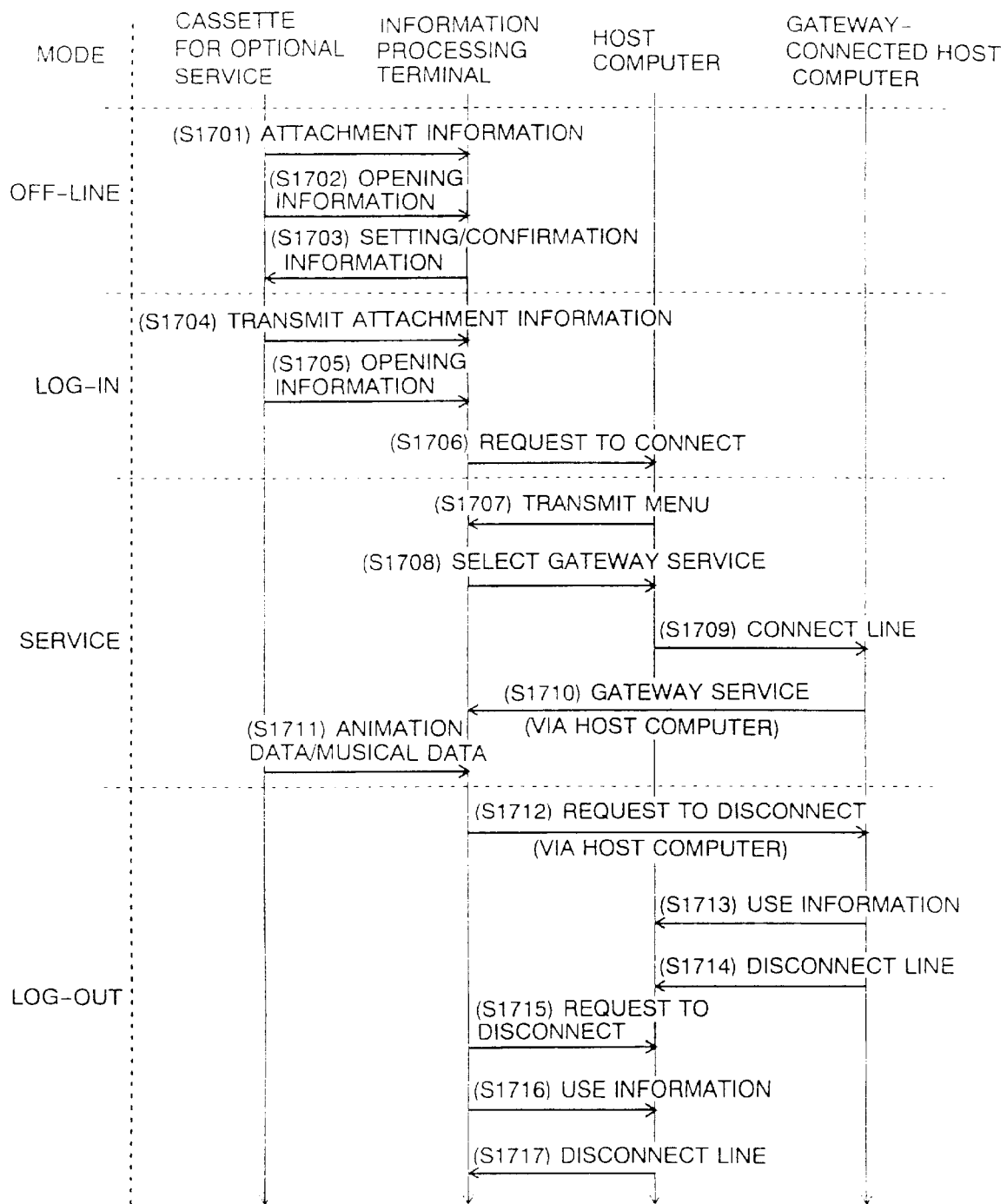
FIG. 17 is a diagram showing a processing sequence of the first embodiment.

Referring now to FIG. 17, a case when receiving an on-line racing game service for example will be explained as a processing sequence of the first embodiment.

The processing sequence of the first embodiment is composed of four modes of "off-line" before connecting to the network, "log-in" (line connection) related to the connection to the network, "service" and "log-out" (disconnection of the line).

Off-line Mode

In off-line mode, as the cassette for optional service for racing game 31 is attached to the information processing terminal 20, attachment information of the cassette is sent to the information processing terminal 20 (Step 1701). Next, opening information of the service (e.g., FIG. 18) is sent to the information processing terminal 20 (Step 1702). Then, the information processing terminal 20 sets up a line number and personal ID number for example to receive the network service and confirms personal information of the service (Step 1703).

Log-in Mode

In log-in mode, as the cassette for optional service for racing game 31 is attached to the information processing terminal 20, the attachment information of the cassette is transmitted (Step 1704).

Next, the opening information of the service (e.g., FIG. 18) is transmitted to the information processing terminal 20 (Step 1705). The information processing terminal 20 requests the host computer 80 to connect via the public line 81*b* and VAN network 81*a* by selecting information of the opening of the information processing terminal 20 (Step 1706).

By the way, the cassette for optional service for racing game 31 may be attached after requesting the connection to the host computer 80.

Service Mode

In service mode, a network service menu A is transmitted from the host computer 80 to the information processing terminal 20 when the line of the information processing terminal 20 and the host computer 80 is connected (Step 1707). The information processing terminal 20 which received the network service menu A displays the network service menu A together with an option menu B on the display 27.

Next, the information processing terminal 20 transmits a command for receiving the service provided by the gateway-connected host computer 82 to the host computer 80 when the menu B which is the service of the on-line racing game is selected (Step 1708).

Then, the host computer 80 automatically connects the line to the gateway-connected host computer 82 via the dedicated line 160 (Step 1709).

The gateway-connected host computer 82 then transmits information of the racing game of a member accessed to the gateway-connected host computer 82 to the information processing terminal 20 (Step 1710).

On the other hand, the cassette for optional service for racing game 31 transmits information such as animation data and music data for the on-line game to the information processing terminal 20 (Step 1711).

The information processing terminal 20 provides the on-line game service to the user by processing the information transmitted from the gateway-connected host computer 82 and the cassette for optional service for racing game 31.

Log-out Mode

In log-out mode, the information processing terminal 20 requests to the gateway-connected host computer 82 to disconnect via the host computer 80 in order to terminate the service (Step 1712).

Next, the gateway-connected host computer 82 which received the disconnection request disconnects the line of the dedicated line 160 to the host computer 80 after transmitting use information (e.g., records of the racing, use time) to the host computer 80 or the information processing terminal 20 (Step 1713, 1714).

Then, the information processing terminal 20 requests to the host computer 80 to disconnect to terminate the service (Step 1715).

The host computer 80 disconnects the line between the information processing terminal 20 after transmitting use information of the service provided by the host computer 80

(e.g., use time, use state of other linkage service) to the information processing terminal 20 (Step 1716, 1717).

[Processing Screen of the First Embodiment]

Next, exemplary screens displayed on the display 27 will be explained with reference to FIGS. 18 through 23 in order to help understanding of the explanation described above.

Figure 18:
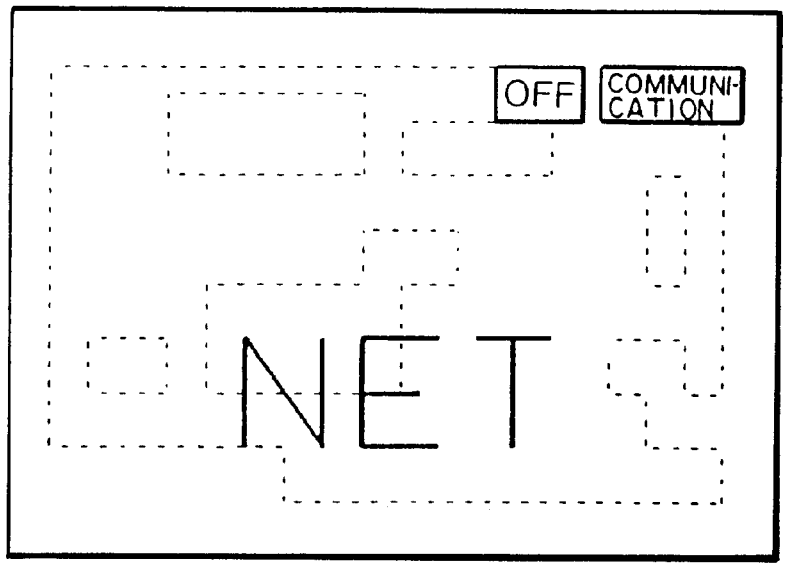
FIG. 18 is a drawing showing an exemplary screen (No. 1) displayed in the first through fourth embodiments.

When the power of the information processing terminal 20 is turned on, an opening screen shown in FIG. 18 shows up at first.

Figure 19:
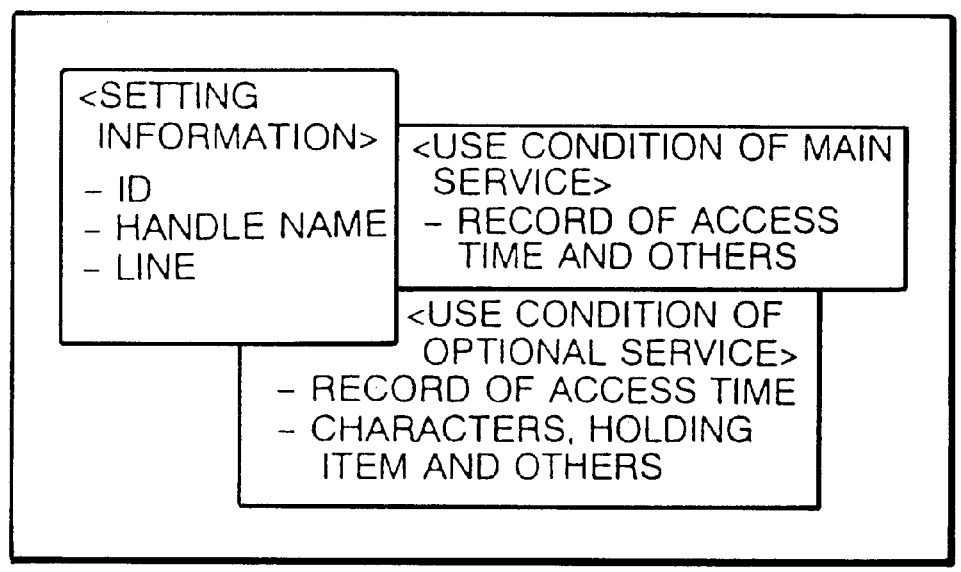
FIG. 19 is a drawing showing an exemplary screen (No. 2) displayed in the first through fourth embodiments.

As a window represented as "OFF" in FIG. 18 is specified by an icon (not shown) and is executed, a screen shown in FIG. 19 shows up. Displayed on the screen in FIG. 19 are information set up to connect to the host computer 80 and use conditions of the main service and optional service transmitted after the previous use. The use condition is what the information processing terminal 20 has automatically recorded.

Figure 20:
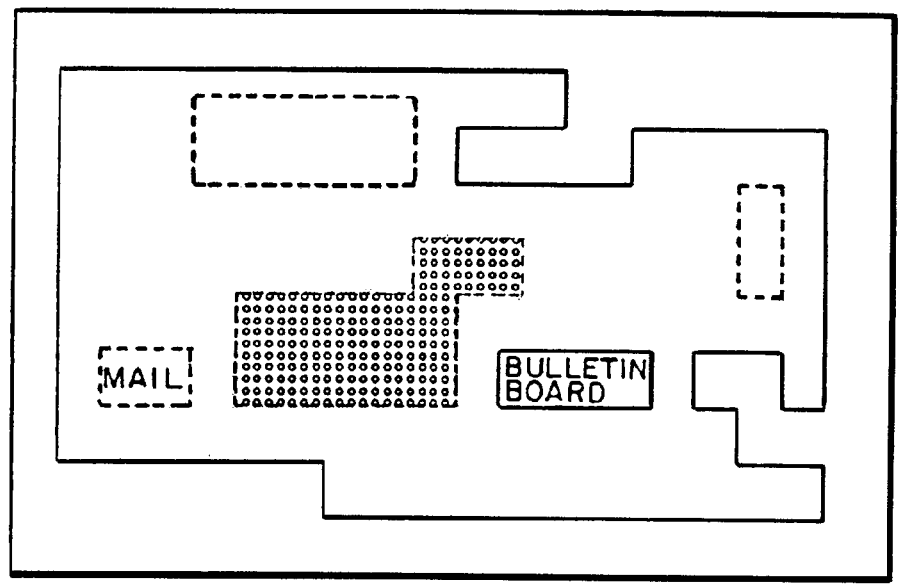
FIG. 20 is a drawing showing an exemplary screen (No. 3) displayed in the first through fourth embodiments.

As a window represented as "COMMUNICATION" in FIG. 18 is specified by the icon (not shown) and is executed, a screen shown in FIG. 20 shows up when the cassette for optional service for racing game 31 is not attached. Windows represented as "MAIL" and "BULLETIN BOARD" in FIG. 20 are standard service menus which the host computer 80 provides. That is, the standard service menus are menus which allow to receive the service without the cassette for optional service 31. By the way, menus corresponding to a type of a cassette are displayed in areas surrounded by dot lines in FIG. 20 when the cassette for optional service for racing game 31 is attached.

Figure 21:
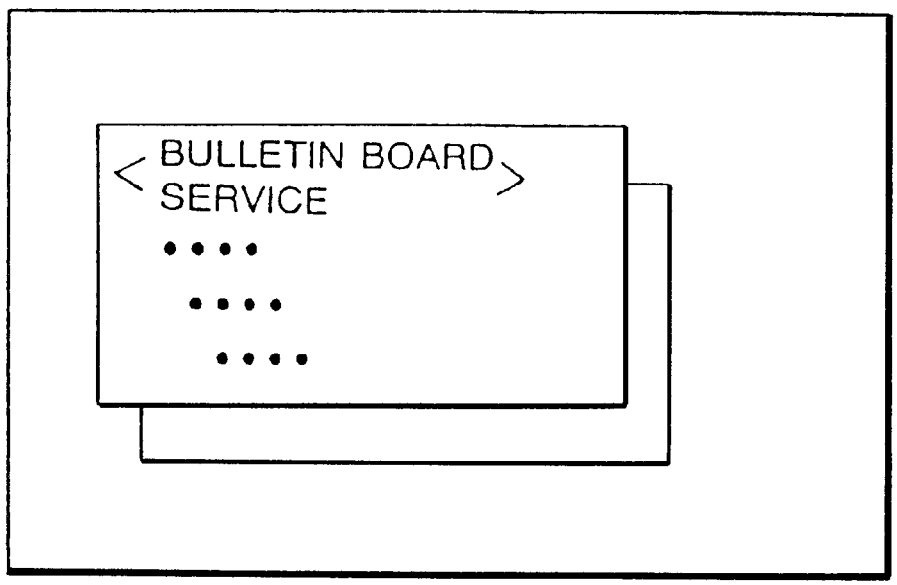
FIG. 21 is a drawing showing an exemplary screen (No. 4) displayed in the first through fourth embodiments.

A screen shown in FIG. 21 shows up when the window represented as "BULLETIN BOARD" in FIG. 20 is specified by the icon (not shown) and is executed.

Figure 22:
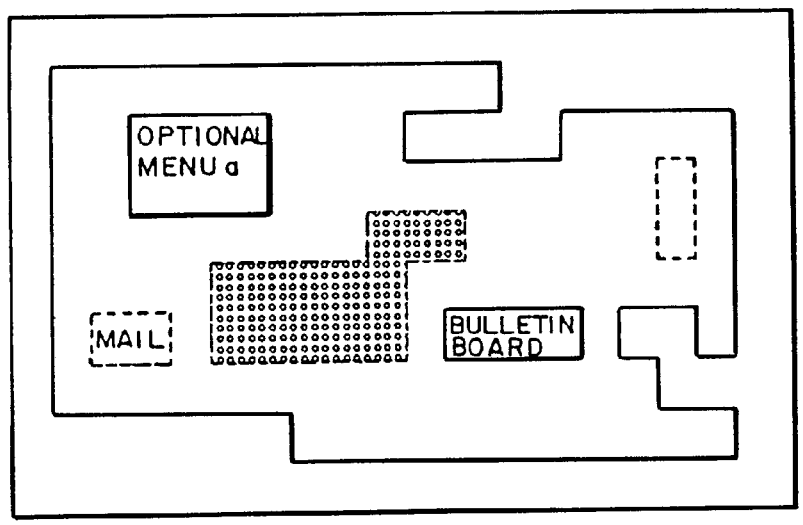
FIG. 22 is a drawing showing an exemplary screen (No. 5) displayed in the first through fourth embodiments.
Figure 23:
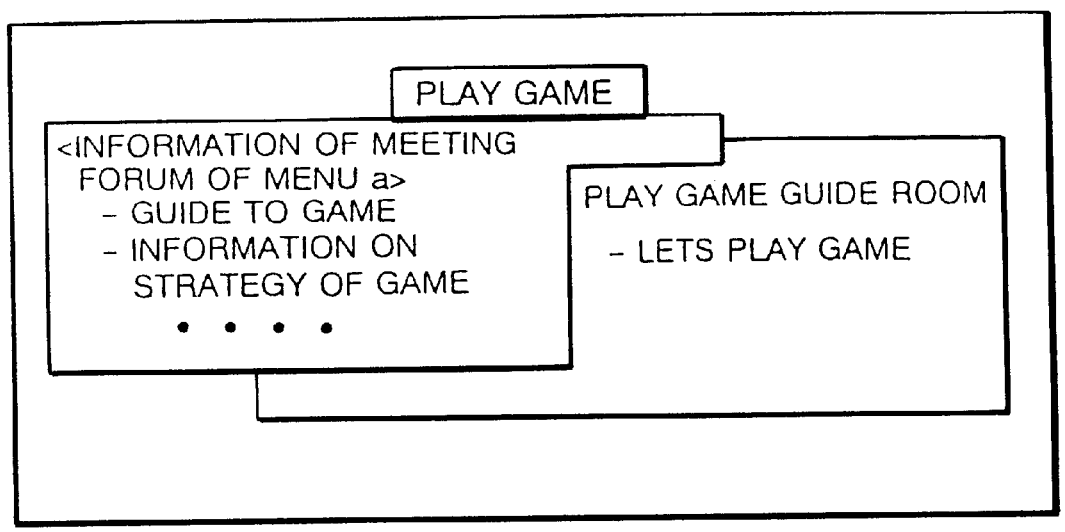
FIG. 23 is a drawing showing an exemplary screen (No. 6) displayed in the first through fourth embodiments.

When the window represented as "COMMUNICATION" in FIG. 18 is specified by the icon (not shown) and is executed, a screen shown in FIG. 22 shows up when the cassette for optional service for racing game 31 which provides an optional service (a) is attached. A screen shown in FIG. 23 shows up as the window represented as "OPTION MENU a" in FIG. 22 is specified by the icon (not shown) and is executed. The screen in FIG. 23 is a screen displaying information transmitted from the gateway-connected host computer 82 which provides services related to the menu (a). Displayed in a window represented as "MEETING FORUM INFORMATION" in FIG. 23 are information on a game tournament carried out in the optional service (a) and on its strategy. Displayed in a window represented as "PLAY GAME GUIDE ROOM" is message exchange information (chat function) for finding players who play a game in the optional service (a). By finding adequate players who can play the game here, it becomes possible to play the game among the players who access to the gateway-connected host computer 82.

Then, when the game is to be played, the software of the gateway-connected host computer 82 and the cassette for optional service for racing game 31 attached to the information processing terminal 20 are linked and executed as a window represented as "PLAY GAME" is specified by the icon (not shown) and is executed.

By the way, the screens explained above are displayed in the same manner also in the second through fourth embodiments.

Second Embodiment

Figure 24:
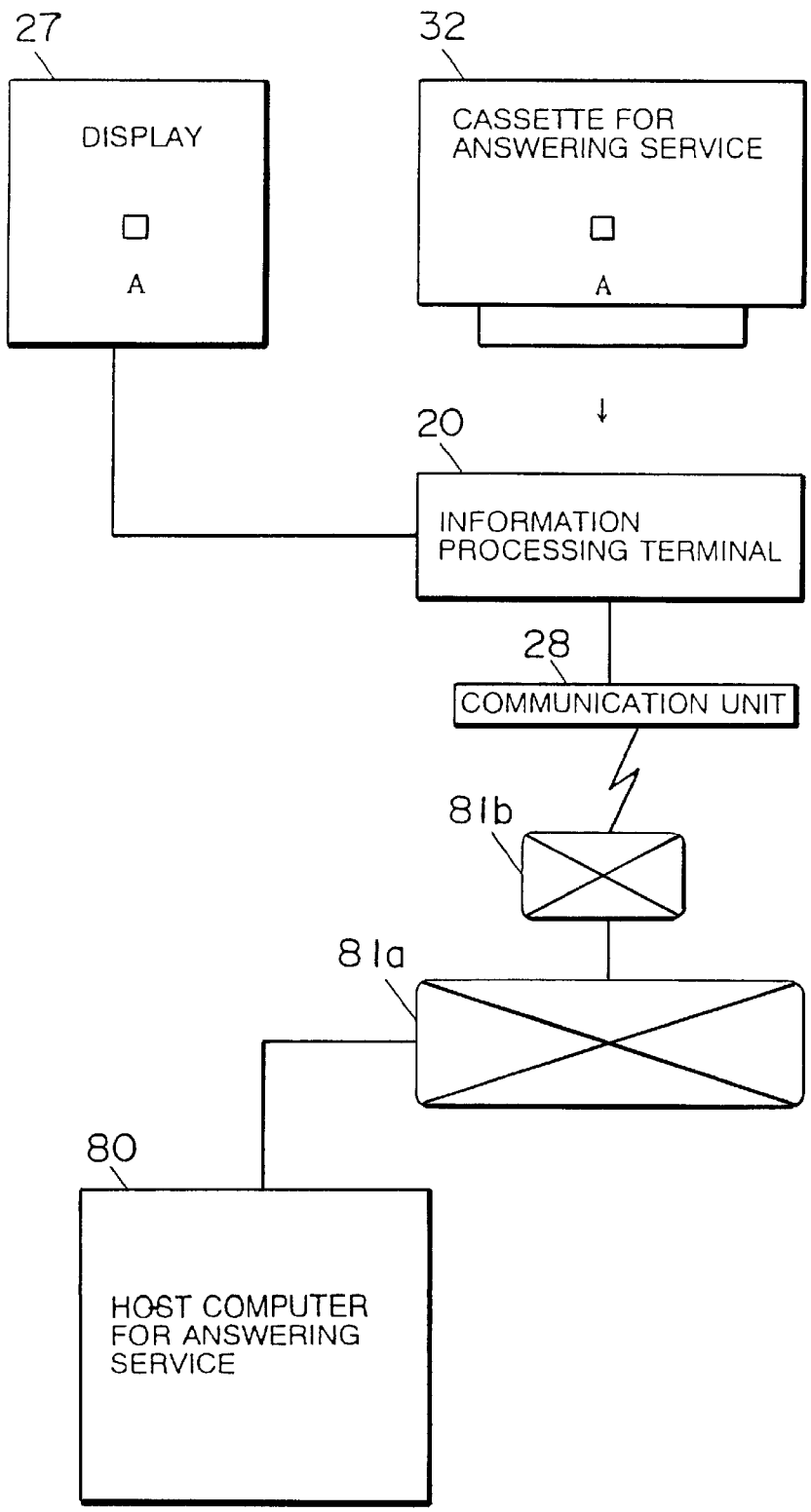
FIG. 24 is a diagram showing a system structure of the second embodiment.
Figure 25:
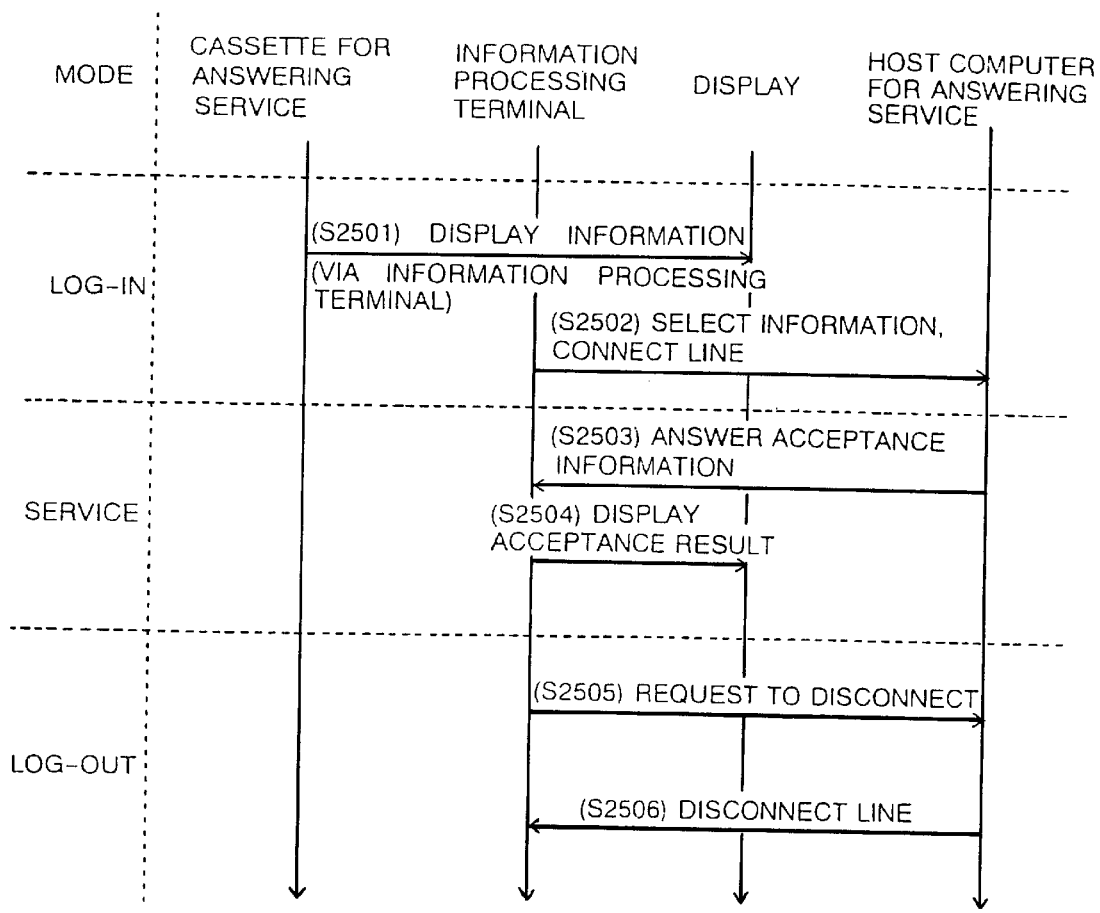
FIG. 25 is a diagram showing a processing sequence of the second embodiment.

Referring now to FIGS. 24 and 25, a second preferred embodiment will be explained.

[Outline of the Second Embodiment]

As shown in FIG. 24, the second embodiment is composed of elements a) through g) below.

a) the information processing terminal 20 which is either personal computer, TV game machine or special-purpose terminal;

b) the display 27 connected to the information processing terminal 20 for displaying a processing result;

c) the communication unit 28 connected to the information processing terminal 20 for operating communication processing;

d) the public line 81b connected to the communication unit 28;

e) the VAN (value added network) network 81a connected to the public line 81b;

f) a host computer for answering service 80 connected to the VAN network 81a for providing services such as a home catalog shopping through the VAN network 81a; and g) a cassette for answering service 32 which corresponds to the service provided by the host computer for answering service 80, has catalog information such as pictures and explanation speeches of the goods, instruction manual of unique goods, a reference of detailed explanation and questionnaire information and has a program for automatically connecting to the host computer for answering service 80.

By the way, when the information processing terminal 20 is provided with the function of communication, it may be connected to the public line 81b without passing through the communication unit 28.

[Processing Sequence of the Second Embodiment]

Referring now to FIG. 25, a case when receiving a network answering service such as an on-line shopping for buying desirable goods through the network from the catalog by means of a CD-ROM having ID (e.g., an issued date of the CD-ROM) designated beforehand will be explained as a processing sequence of the second embodiment.

The processing sequence of the second embodiment is composed of three modes of "log-in" (line connection), "service" and "log-out" (disconnection of the line).

Log-in Mode

In log-in mode, the information which the cassette for answering service 32 has, i.e., a picture of an outside view of goods in the catalog for example, is displayed on the display 27 (Step 2501).

Next, the user selects goods which the user wants to order among the goods by means of the information processing terminal 20. After the selection, the information processing terminal 20 executes an automatic answering processing program and connects the line to the host computer for answering service 80 (Step 2502). At this time, the order of the good is made to the host computer for answering service 80 by transmitting data on a type of the cassette for answering service 32 and information on an answered result.

Service Mode

In service mode, the host computer for answering service 80 transmits information confirming that the goods have been registered (answer acceptance information) to the information processing terminal 20 (Step 2503).

Then, the information processing terminal 20 displays the confirmation information that the goods have been registered on the display 27 (Step 2504).

Log-out Mode

In log-out mode, the information processing terminal 20 requests a disconnection to the host computer for answering service 80 at first (Step 2505).

Then, the host computer for answering service 80 disconnects the line between the information processing terminal 20 (Step 2506).

Third Embodiment

Figure 26:
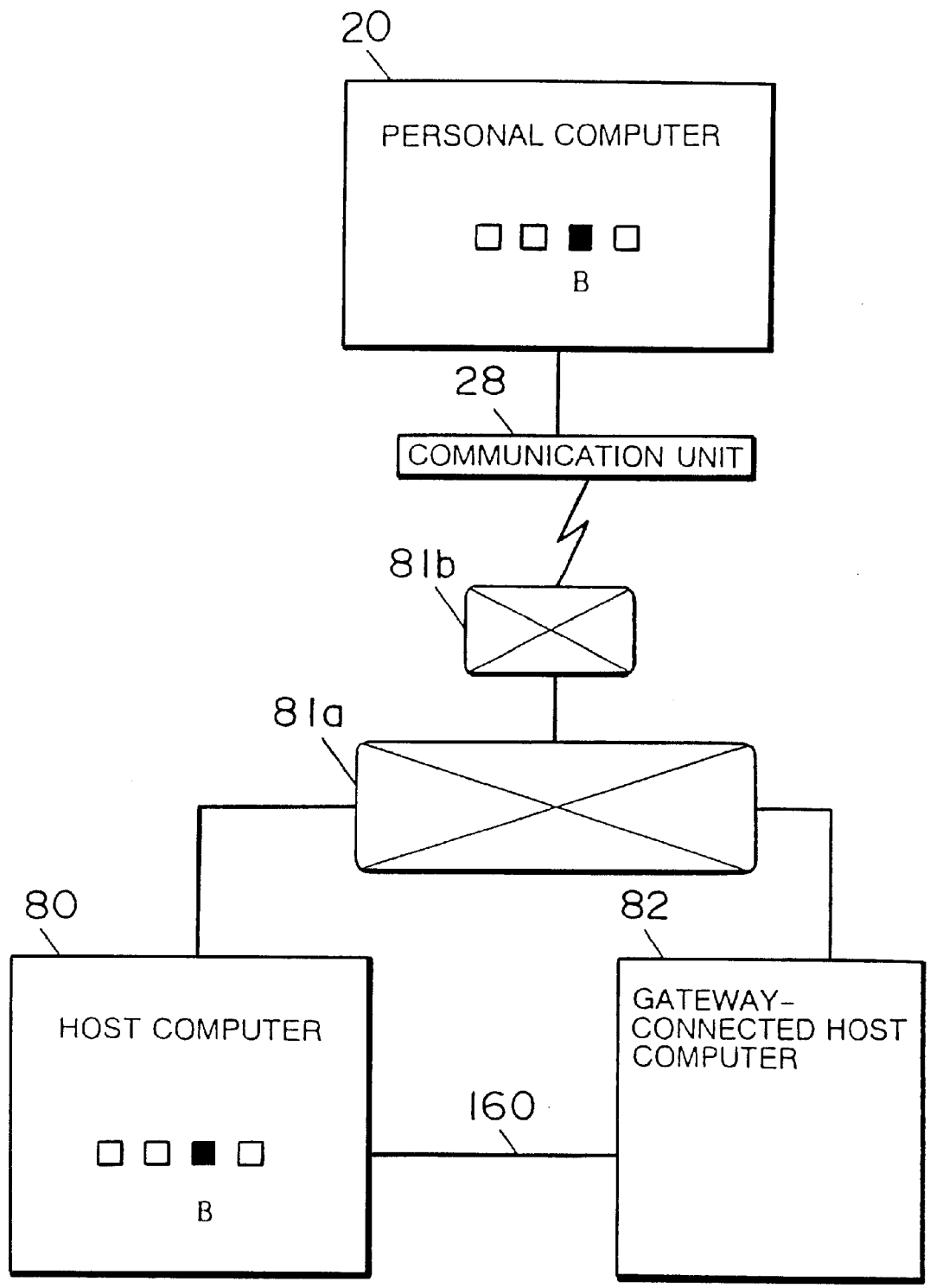
FIG. 26 is a diagram showing a system structure of the third embodiment.
Figure 27:
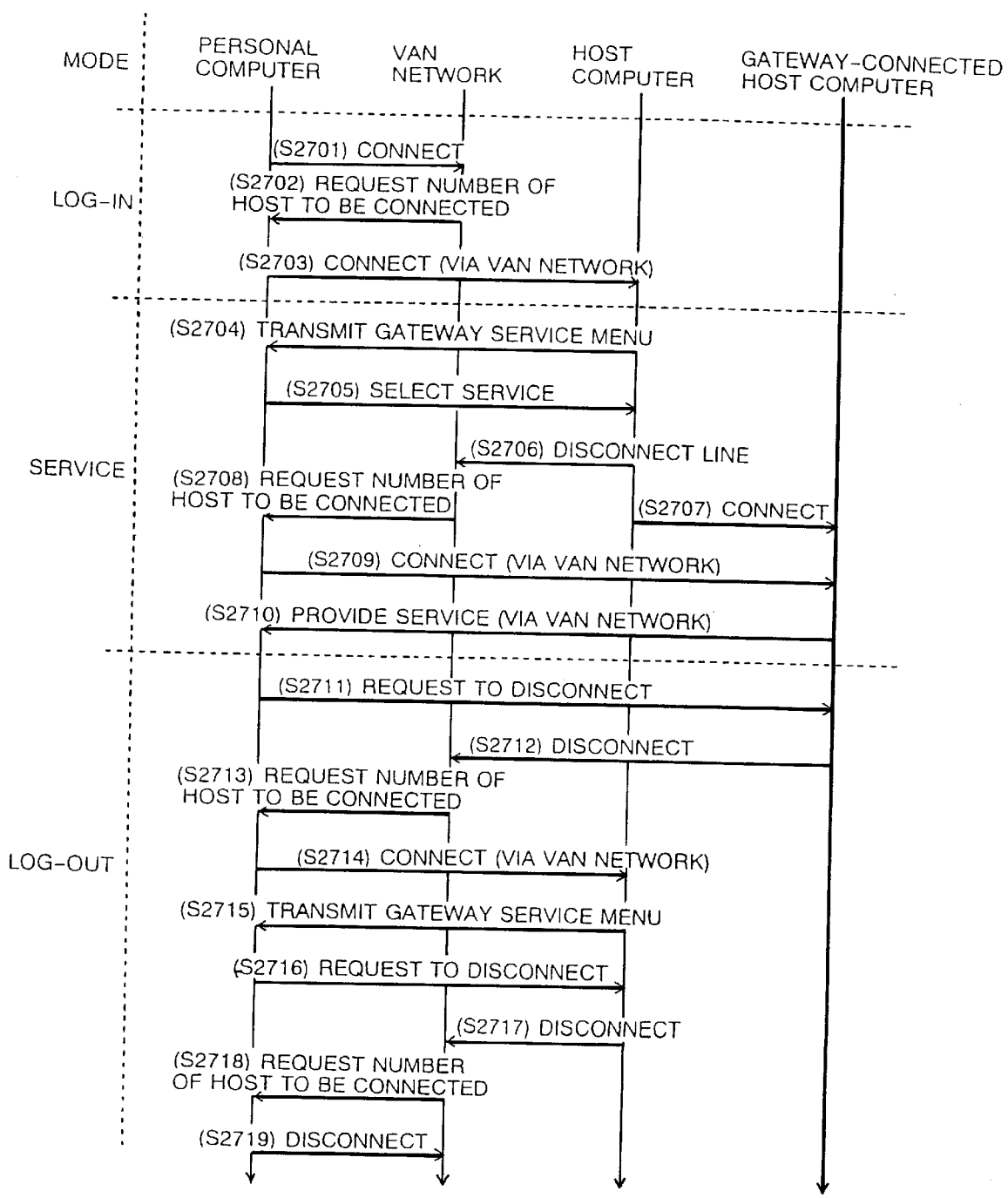
FIG. 27 is a diagram showing a processing sequence of the third embodiment.

Referring now to FIGS. 26 and 27, a third preferred embodiment will be explained.

[Outline of the Third Embodiment]

As shown in FIG. 26, the third embodiment is composed of elements a) through f) below.

a) the VAN network 81a;

b) the host computer 80 connected to the VAN network 81a for providing services through the VAN network 81a. By the way, a menu of the services provided by the host computer 80 is called a gateway service menu;

c) the gateway-connected host computer 82 connected to the host computer 80 via the dedicated line 160 and to the VAN network 81a for providing services linked with the services provided by the host computer 80;

d) the public line 81b connected to the VAN network 81a;

e) a personal computer 20 for executing an application software in which registration of host ID of the gateway-connected host computer 82 which corresponds to the gateway service menu of the host computer 80 has been set; and f) the communication unit 28 connected to the personal computer 20 and to the public line 81b.

By the way, when the personal computer 20 is provided with the function of communication, it may be connected directly to the public line 81b without passing through the communication unit 28.

[Processing Sequence of the Third Embodiment]

Referring now to FIG. 27, a processing sequence of the third embodiment will be explained.

The processing sequence of the third embodiment is composed of three modes of "log-in" (line Connection) "service" and "log-out" (disconnection of the line).

Log-in Mode

In log-in mode, the personal computer 20 is connected to the VAN network 81a (Step 2701).

Next, the VAN network 81a requests a number of host to be connected to the personal computer 20 (Step 2702). Then, the personal computer 20 transmits a host number A to connect to the host computer 80 via the VAN network 81a (Step 2703).

Service Mode

In service mode, the host computer 80 transmits the gateway service menu to the personal computer 20 (Step 2704).

Then, the personal computer 20 selects a service to be received (assumed to be service B here) from the gateway service menu and informs the host computer 80 of that (Step 2705).

Next, the host computer 80 disconnects the line with the VAN network 81a (Step 2706) and connects to the gateway-connected host computer 82 which corresponds to the selected menu (Step 2707). It then periodically manages the connection state between the personal computer 20 and the gateway-connected host computer 82.

Next, the VAN network 81a requests the number of host to be connected to the personal computer 20 similarly to the processing in Step 2702 (Step 2708).

The personal computer 20 sends out a number which corresponds to the host number B from the host ID registration in the gateway-connected host computer 82 which corresponds to the gateway service menu and is connected to the gateway-connected host computer 82 (Step 2709).

Next, the gateway-connected host computer 82 provides the service to the personal computer 20 (Step 2710).

Log-out Mode

In log-out mode, the personal computer 20 requests the gateway-connected host computer 82 to disconnect the line (Step 2711). Then, the gateway-connected host computer 82 disconnects the line between the VAN network 81a (Step 2712).

Next, the VAN network 81a requests the connected host number to the personal computer 20 (Step 2713).

Then, the personal computer 20 is connected to the host computer 80 via the VAN network 81a (Step 2714).

The host computer 80 transmits another gateway service menu to the personal computer 20 (Step 2715). When the personal computer 20 wants to receive another gateway service, the method described above is repeated.

When the personal computer 20 ends the communication service, it requests the host computer 80 to disconnect (Step 2716).

Then, the host computer 80 disconnects the line between the VAN network 81a (Step 2717).

The VAN network 81a then requests the personal computer 20 a number of host to be connected (Step 2718).

The personal computer 20 disconnects the line between the VAN network 81a (Step 2719).

Fourth Embodiment

Figure 28:
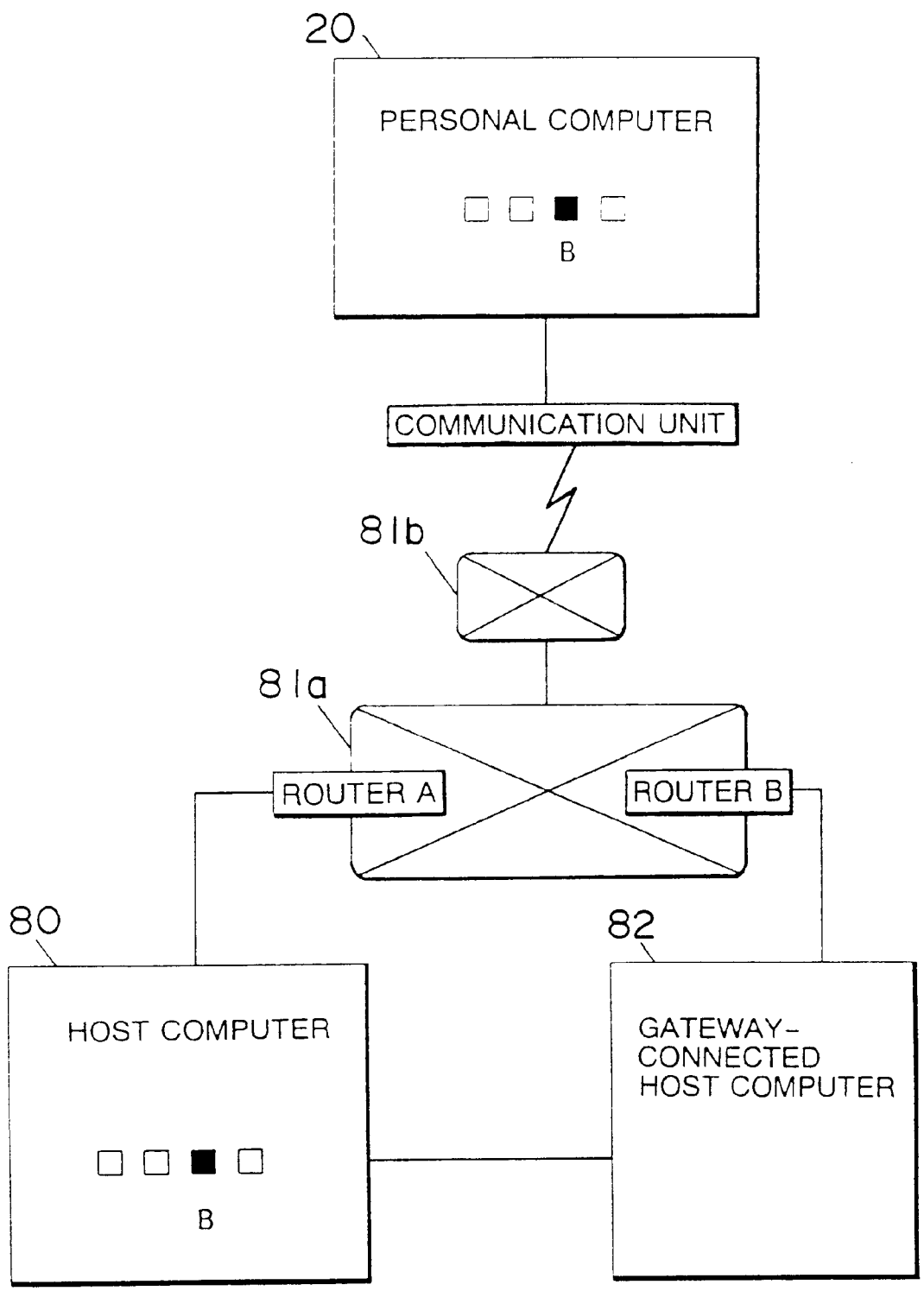
FIG. 28 is a diagram showing a system structure of the fourth embodiment.
Figure 29:
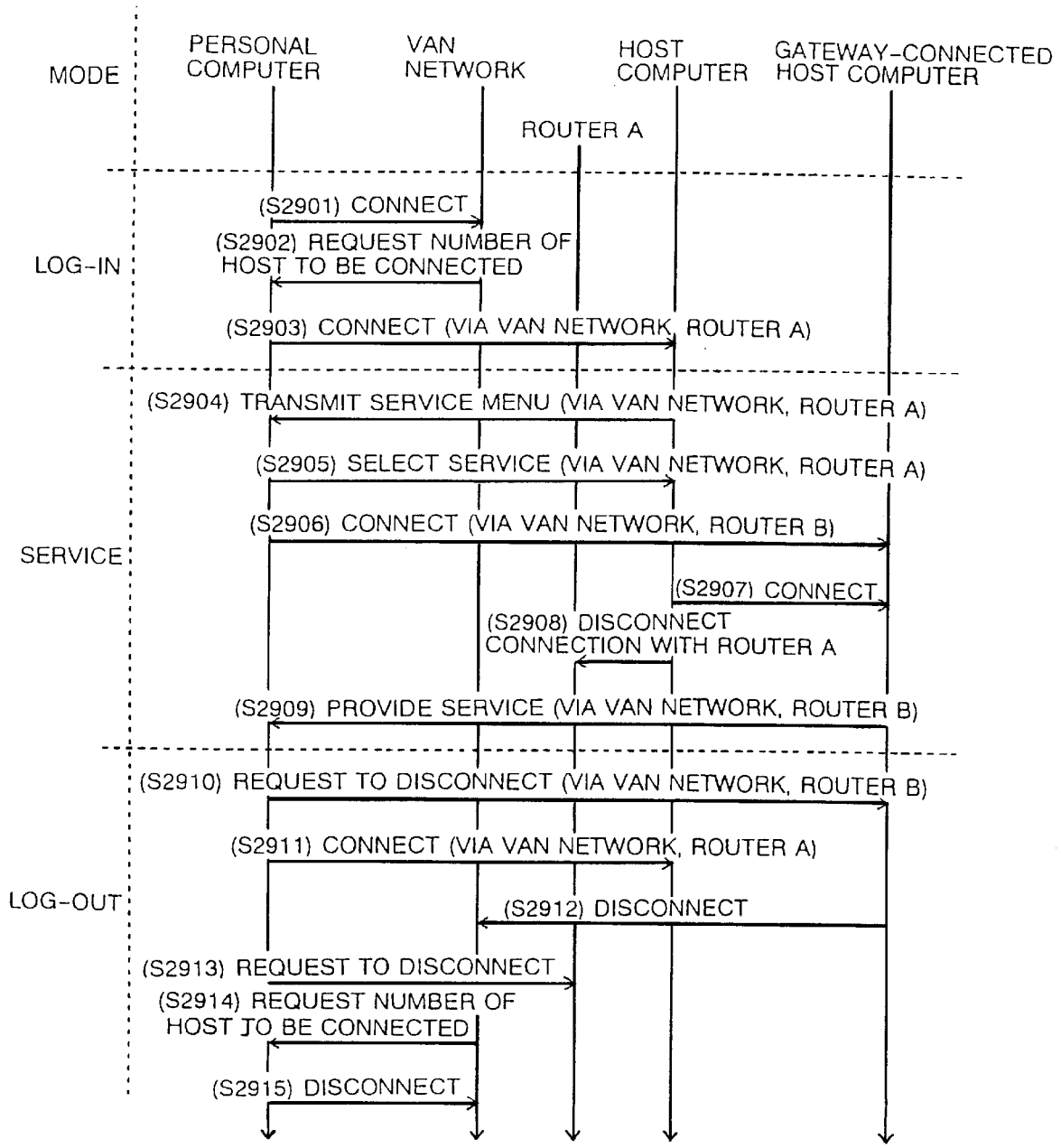
FIG. 29 is a diagram showing a processing sequence of the fourth embodiment.

Referring now to FIGS. 28 and 29, a fourth preferred embodiment will be explained.

[Outline of the Fourth Embodiment]

As shown in FIG. 28, the fourth embodiment is composed of elements a) through f) below.

a) the VAN network 81a;

b) the host computer 80 connected to the VAN network 81a for providing services through the VAN network 81a. By the way, the menu of the services provided by the host computer 80 is called the gateway service menu;

c) the gateway-connected host computer 82 connected to the host computer 80 via the dedicated line 160 and to the VAN network 81a for providing services linked with the services provided by the host computer 80;

d) the public line 81b connected to the VAN network 81a;

e) the personal computer 20 for executing an application software in which registration of host ID of the gateway-connected host computer 82 which corresponds to the gateway service menu of the host computer 80 has been set; and f) the communication unit 28 connected to the personal computer 20 and to the public line 81b.

By the way, when the personal computer 20 is provided with the function of communication, it may be connected directly to the public line 81b without passing through the communication unit 28.

[Processing Sequence of the Fourth Embodiment]

Referring now to FIG. 29, a processing sequence of the fourth embodiment will be explained.

The processing sequence of the fourth embodiment is composed of three modes of "log-in" (line connection), "service" and "log-out" (disconnection of the line).

Log-in Mode

In log-in mode, the personal computer 20 is connected to the VAN network 81a (Step 2901).

Figure 30:
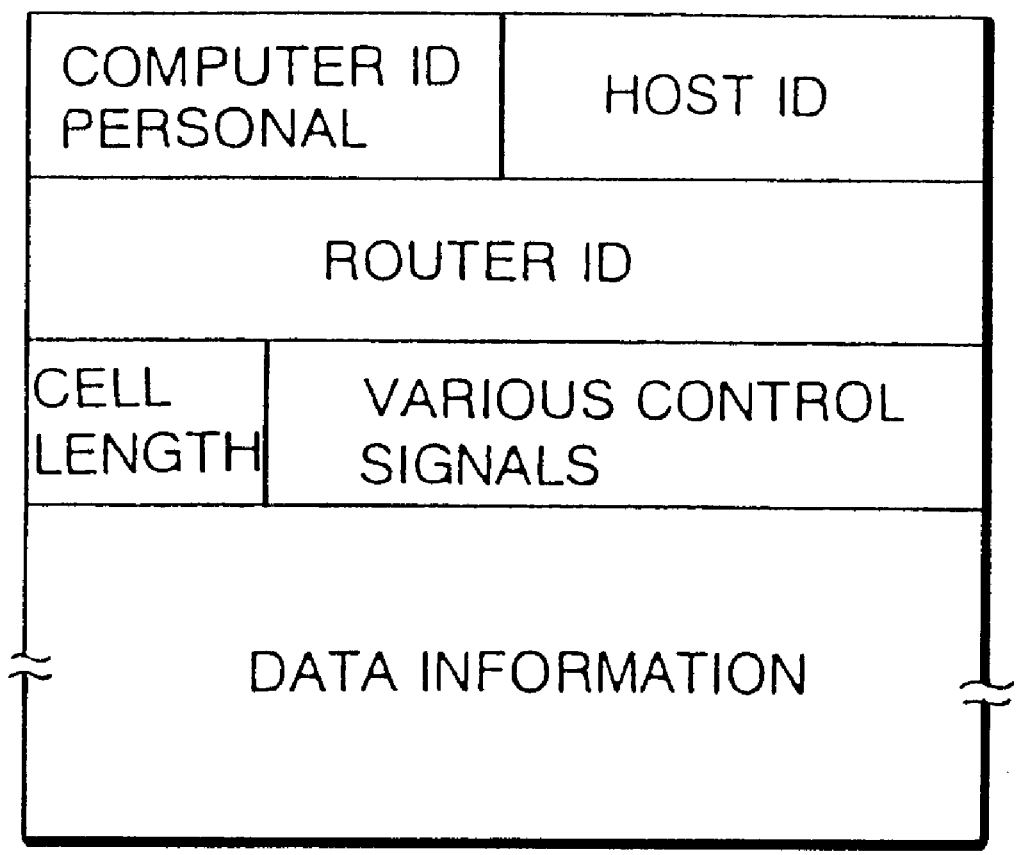
FIG. 30 is a diagram showing a cell header format in the embodiments.

Next, the VAN network 81a requests a number of host to be connected to the personal computer 20 (Step 2902). Then, the personal computer 20 transmits a cell shown in FIG. 30 in addition to an address for recognizing the host A. A router A recognizes this added address and connects to the host computer 80 whose host number is A (Step 2903).

Service Mode

In service mode, the host computer 80 transmits the gateway service menu to the personal computer 20 (Step 2904).

Then, the personal computer 20 selects a service to be received (assumed to be service B here) from the gateway service menu and informs the host computer 80 of that (Step 2905).

Next, the host computer 80 adds an address of the gateway-connected host computer 82 which corresponds to the service B to a signal cell and transmits it to the VAN network 81a. While the transmitted signal cell arrives at the router A and router B, it reaches to the gateway-connected host computer 82 via the router B because the address of the gateway-connected host computer 82 which corresponds to the service B is added. As a result, the personal computer 20 is connected to the gateway-connected host computer 82 via the VAN network 81a and router B (Step 2906).

Next, the host computer 80 is connected with the gateway-connected host computer 82 via a dedicated line 260 (Step 2907) and disconnects the connection with the router A (Step 2908). Further, the host computer 80 disconnects a signal from the personal computer 20 tentatively by a HOLD/ACK signal and recognizes a number ID of the personal computer 20 and a header for the gateway-connected host computer 82 previously given. Then, it stops an access to the gateway-connected host computer 82 by the HOLD signal and repeats the recognition of the header by the ACK signal. Thereby, the host computer 80 manages the connection state between the personal computer 20 and the gateway-connected host computer 82 periodically via the dedicated line 260.

The gateway-connected host computer 82 provides an information service to the personal computer 20 in this state (Step 2909).

Log-out Mode

In log-out mode, the personal computer 20 requests the gateway-connected host computer 82 to disconnect the line via the public line 81b and router B (Step 2910). Then, the personal computer 20 adds an address which corresponds to the host computer 80 whose host number is A to a signal cell and transmits it to the VAN network 81a. While the transmitted signal cell arrives at the router A and router B, it reaches to the host computer 80 via the router A because the address of the host computer 80 which corresponds to the service A is added. As a result, the personal computer 20 is connected to the host computer 80 via the VAN network 81a and router A (Step 2911).

Next, the gateway-connected host computer 82 disconnects the connection with the host computer 80 (Step 2912). When another gateway service is to be received, the above-mentioned process is repeated.

Then, the personal computer 20 requests a disconnection to the router A (Step 2913).

Next, the VAN network 81a request a host number (Step 2914), but the personal computer 20 carries out a disconnection process (Step 2915).

Fifth Embodiment

A fifth embodiment will be explained with reference to FIGS. 31 through 35 and FIG. 53.

[Outline of the Fifth Embodiment]

The present embodiment comprises a game cassette 30, communication unit for game machine 10 (hereinafter referred to as the "communication unit 10") and a main body of game machine 20 as shown in FIG. 31. Although it is possible to separate each of these components, the communication unit 10 is normally used by attaching to the main body of game machine 20.

The communication unit 10 of the present embodiment is connected to the network 81 via a telephone line 70 and the host computer 80 is connected to the network 81.

Now, each component will be explained in detail.

[Game Cassette 30]

The game cassette 30 is composed of two cassettes of a network game cassette 30a and stand-alone game cassette 30b.

The network game cassette 30a is stored in a thin, oblong and approximately cuboid case. The surface of the case is colored to eliminate its transmittivity. Then, as shown in FIG. 31, a cut section 36 is provided on one end of the case. The cut section 36 may be provided at the upper portion or corner portion of the case. Then a connector 34 is hanged at the base end portion of the case. The connector 34 interfaces the communication unit 10 and the main body of game machine 20, i.e., the power is supplied and contents of a program is read through it.

The network game cassette 30a also has a storage section 37a for storing programs and data for playing a game utilizing the host computer 80 connected to the network 81.

On the other hand, the stand-alone game cassette 30b is stored in a thin, oblong and approximately cuboid case. The surface of the case is colored to eliminate its transmittivity. Then, a connector 34 is hanged at the base end portion of the case. The connector 34 interfaces the communication unit 10 and the main body of game machine 20, i.e., the power is supplied and contents of a program is read through it.

The stand-alone game cassette 30b also has a storage section 37b for storing programs and data for playing a game solely without using the host computer 80.

The connector 34 of the game cassette 30 may be attached to both of the communication unit 10 and the main body of game machine 20.

[Communication Unit 10]

The communication unit 10 is stored in an oblong and approximately cuboid case. A game cassette attachment port 13 is provided within the case. The game cassette, attachment port 13 allows to removably attach only one connector 34 of the game cassette 30 as shown in FIG. 31. A connector 11 is hanged at the base end portion of the case. The connector 11 interfaces with the main body of game machine 20, i.e., the power is supplied and contents of a programs is read through it.

The communication unit 10 has an optical switch 41. The optical switch 41 is composed of a light emitting diode (LED) 41a and light receiving sensor 41b. The LED section 41a emits light in visible range. The light receiving sensor 41b receives the light emitted by the LED 41a and outputs s received optical switch signal to a decoding section.

Figure 32:
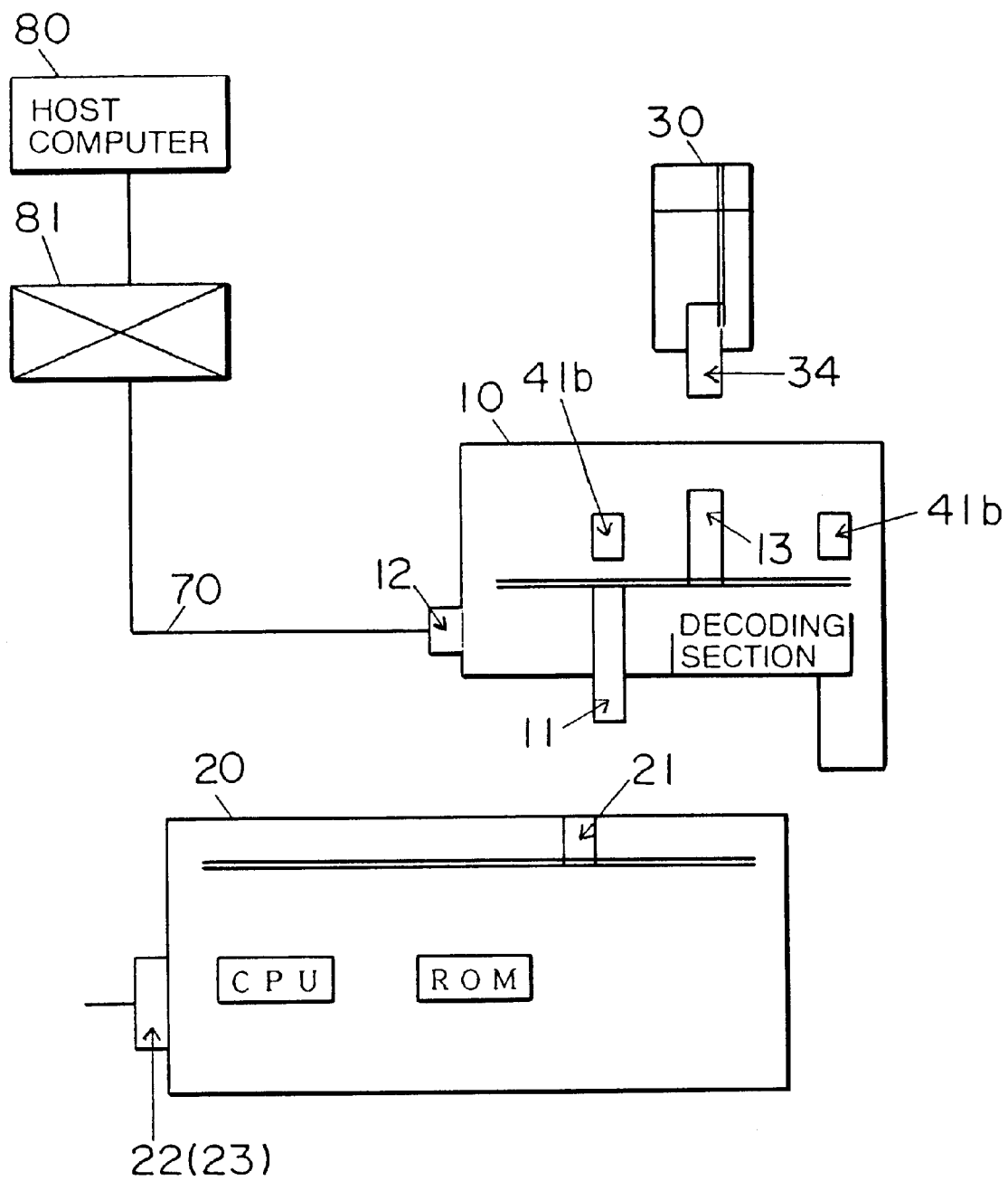
FIG. 32 is a side view of the game cassette, communication unit and main body of game machine in the state separated from each other according to the fifth embodiment.

The communication unit 10 also has a network connecting section 12 which is connected to the network 81 via the telephone line 70. The host computer 80 which provides game services is connected to the network 81 as shown in FIG. 32.

The communication unit 10 also has the decoding section which activates a ROM (see FIG. 53) corresponding to a use condition of the game cassette 30 based on the detection result of the switch 41.

By the way, it is possible to replace the LED 41a by a ultrasonic transmitting section and to replace the light receiving sensor 41b by a ultrasonic sensor.

[Main Body of Game Machine 20]

Figure 33:
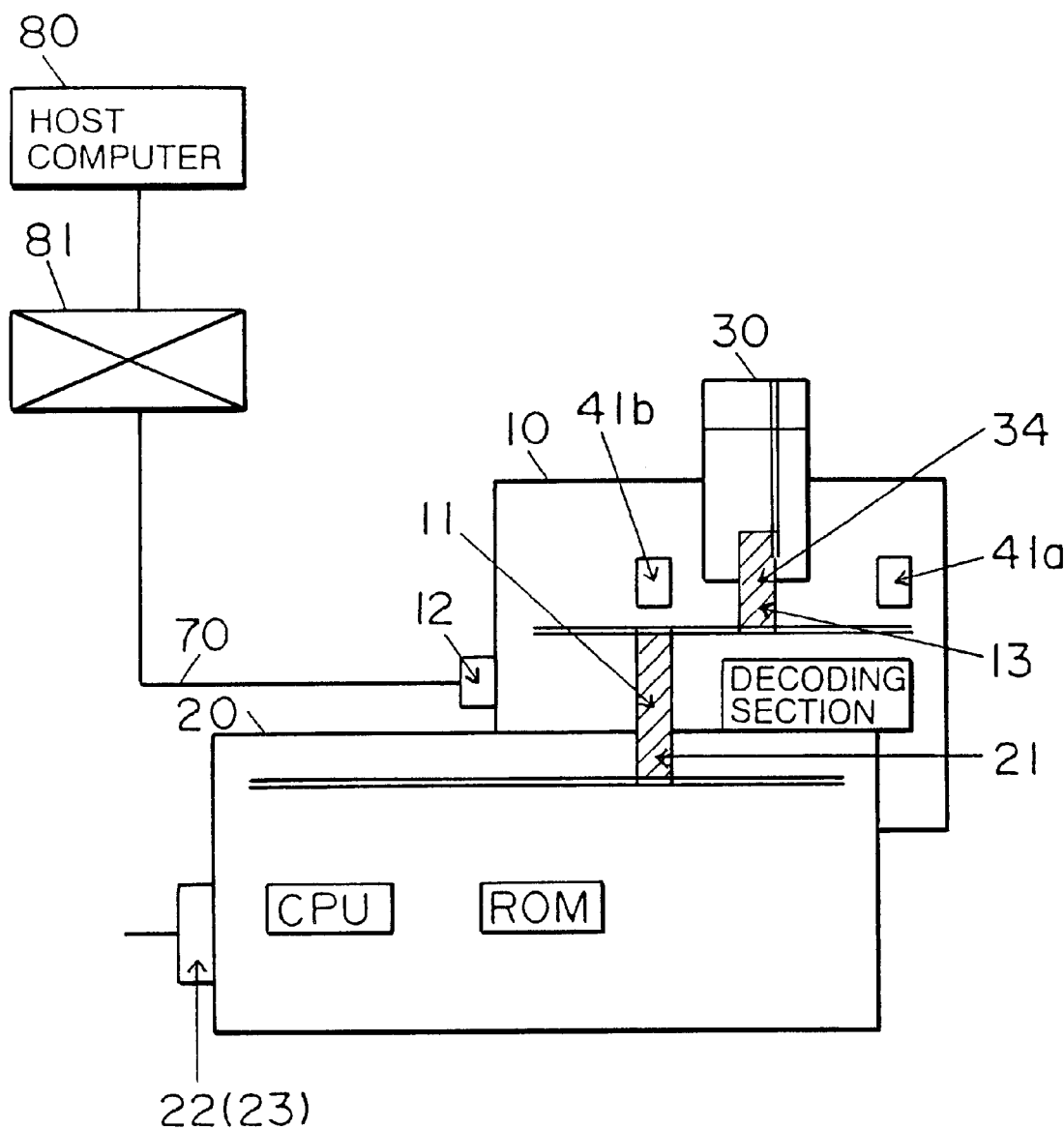
FIG. 33 is a side view of the game cassette, communication unit and main body of game machine in a combined state according to the fifth embodiment.

The main body of game machine 20 is stored in a case which is approximately cuboid. A connector 21 is provided on the top side from the inside of the case. The connector 21 allows to removably attach the connector 11 of the communication unit 10 as shown in FIG. 33. It also allows to removably attach the connector 34 of the game cassette 30. That is, the connector 34 of the stand-alone game cassette 30b may be attached to the connector 21 directly without through the communication unit 10 when a stand-alone type game is played.

Figure 34:
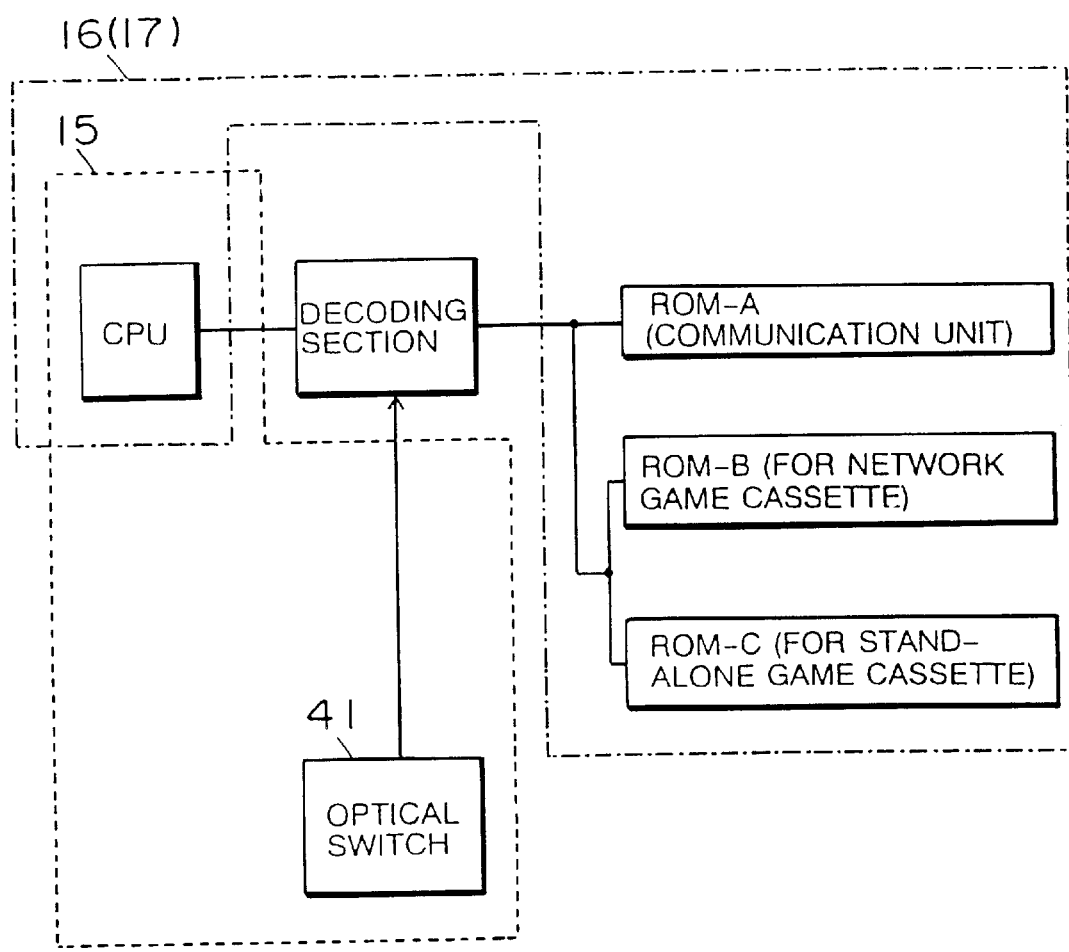
FIG. 34 is a functional block diagram of the fifth embodiment.

The main body of game machine 20 also has an attachment state discriminating section 15 composed of a CPU and the optical switch 41, a processing information executing section 16 composed of the CPU, ROM-A, ROM-B and ROM-C and a host accessing section 17 as shown in a functional block diagram in FIG. 34.

The CPU is connected to the decoding section of the communication unit 10 and carries out processes from a) through d) below:

a) discriminates whether the game cassette 30 is discriminated or not based on the output of the game cassette attachment port 13 and determines that the network game cassette 30a is attached when the light receiving section 41b of the optical switch 41 receives light and determines that the stand-alone game cassette 30b is attached when the sensor receives no light (process as the attachment state discriminating section 15);

b) executes a program stored in the storage section 37 of the game cassette 30 (process as the processing information executing section 16);

c) carries out a communication processing through the communication unit 10; and d) accesses to the host computer 80 recognizing that the network game cassette 30a is attached to the game cassette attachment port 13 (process as the host accessing section 17).

Here, the ROM-A stores a processing procedure of the communication unit 10, the ROM-B stores a processing procedure of the network game cassette 30a and the ROM-C stores a processing procedure of the stand-alone game cassette 30b. When the game cassette 30 is not inserted for example, the ROM-A is turned "ON" and the ROM-B and ROM-C are turned "OFF". That is, only the ROM-A is activated.

The main body of game machine 20 also has a keyboard connecting section 22 for connecting a keyboard 24. The keyboard 24 is used for communicating through the communication unit 10 and for giving various directions from the user to the game machine.

The main body of game machine 20 also has a mouse connecting section 23 for connecting a mouse 25. The mouse 25 is used for making a menu selection on a control screen and for drawing picture or the like.

[Operation of the Fifth Embodiment]

Figure 35:
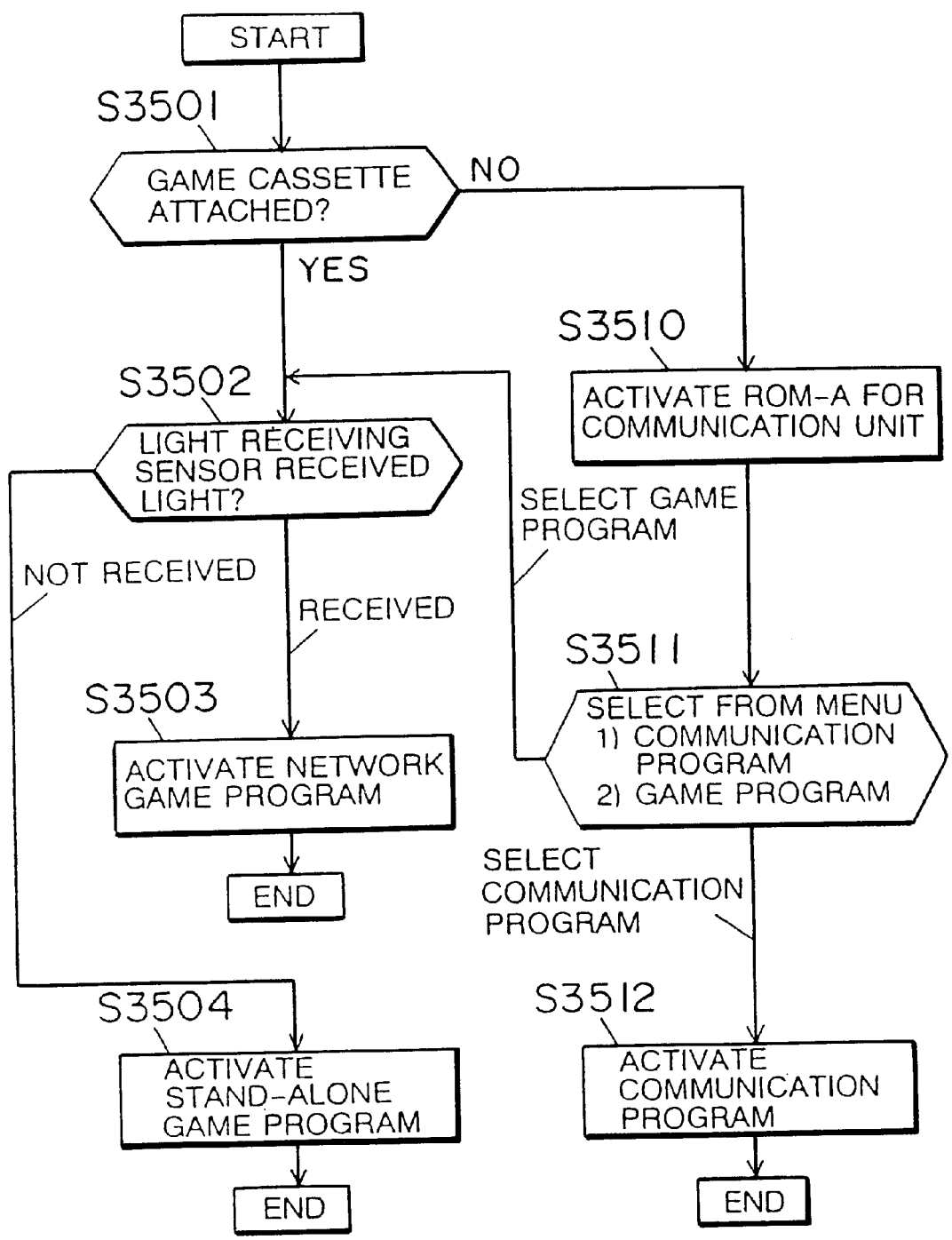
FIG. 35 is a flowchart for explaining an operation of the fifth embodiment.

Next, an operation of the fifth embodiment will be explained with reference to FIG. 35.

The CPU discriminates whether the game cassette is attached to the game cassette attachment port 13 or not (Step 3501). If it is determined to be "YES" in Step 3501, it is discriminated whether the light receiving sensor 41b has received light or not (Step 3502).

If it is determined that the sensor has received light in Step 3502, the network game program is activated (Step 3503). When it is determined that the sensor has not received light in Step 3502, the stand-alone game program is activated (Step 3504).

If it is determined to be "NO" in Step 3501, the ROM-A for communication unit is activated (Step 3510).

Then, it lets the user select from the menu either 1) a communication program or 2) a game program (Step 3511).

When the "game program" is selected in Step 3511, the process executes from Step 3502. When the "communication program" is selected in Step 3511, the communication program is activated (Step 3512).

Sixth Embodiment

A sixth embodiment will be explained with reference to FIGS. 36 through 39 and FIG. 53.

[Outline of the Sixth Embodiment]

Because the present embodiment is configured similarly to the fifth embodiment, only different parts will be explained and the same parts are designated with the same reference numerals and explanation thereof will be omitted.

[Game Cassette 30]

The network game cassette 30a is constructed similarly to the network game cassette 30a in the fifth embodiment except of that it is stored in a oblong, thin and approximately cuboid case which has the cut section 36 created at the lower part of one end. The cut section 36 may be provided at the upper portion or corner portion of the case.

The stand-alone game cassette 30b is constructed similarly to the network game cassette 30a in the fifth embodiment.

[Communication Unit 10]

The optical switch 41 in the communication unit 10 is replaced by a contactless switch 46. The contactless switch 46 may be replaced by a microswitch.

The decoding section activates the ROM corresponding to the use condition of the game cassette 30 based on the detection result of the 46 (see FIG. 53).

[Main Body of Game Machine 20]

Figure 38:
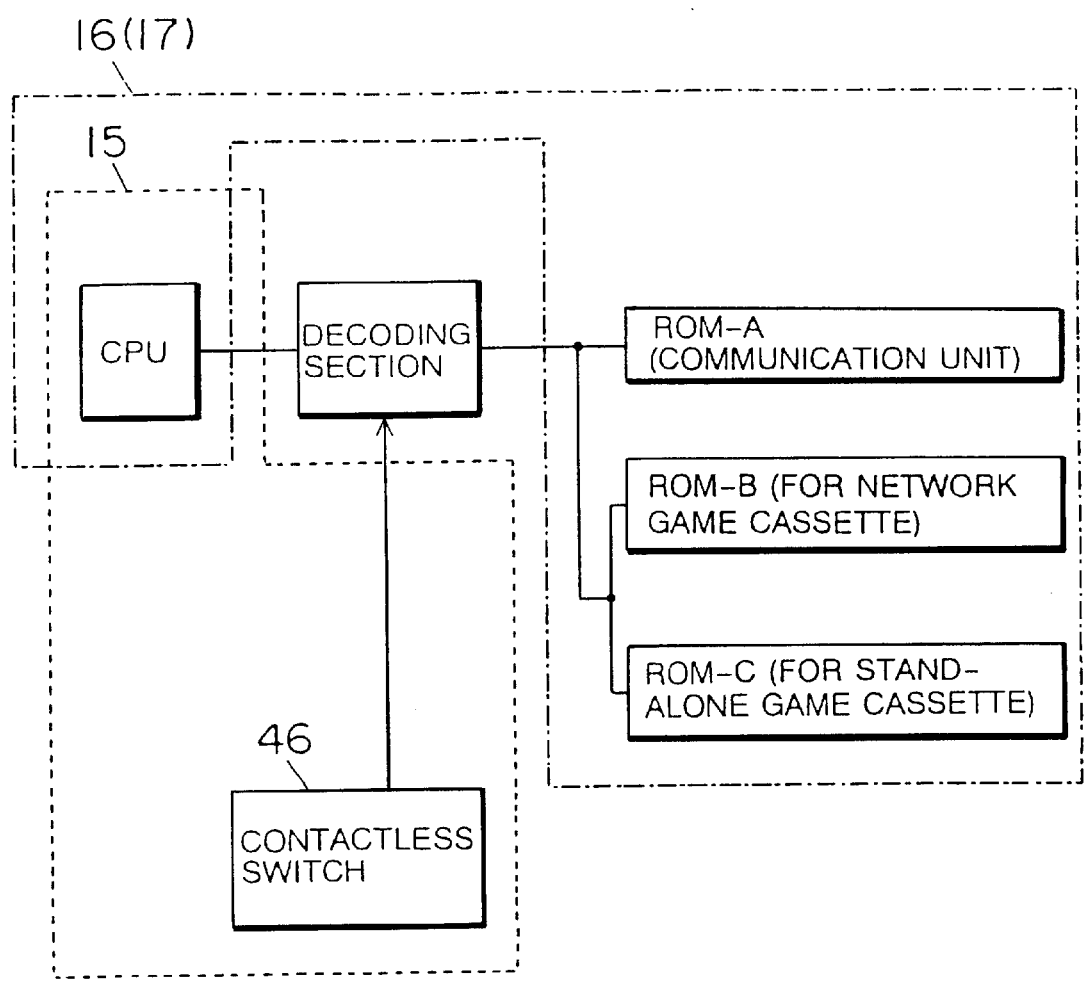
FIG. 38 is a functional block diagram of the sixth embodiment.

The main body of game machine 20 comprises the attachment state discriminating section 15 composed of a CPU and the contactless switch 46, the processing information executing section 16 composed of the CPU, ROM-A, ROM-B and ROM-C and the host accessing section 17 as shown in a functional-block diagram in FIG. 38.

The CPU is connected to the decoding section of the communication unit 10 and carries out processes from a) through d) below:

a) discriminates whether the game cassette 30 is discriminated or not based on the output of the game cassette attachment port 13 and determines that the network game cassette 30a is attached when the contactless switch 46 contacts and determines that the stand-alone game cassette 30b is attached when the switch 46 does not contact (process as the attachment state discriminating section 15);

b) executes the program stored in the storage section 37 of the game cassette 30 (process as the processing information executing section 16);

c) carries out the communication processing through the communication unit 10; and d) accesses to the host computer 80 recognizing that the network game cassette 30a is attached to the game cassette attachment port 13 (process as the host accessing section 17).

[Operation of the Sixth Embodiment]

Figure 39:
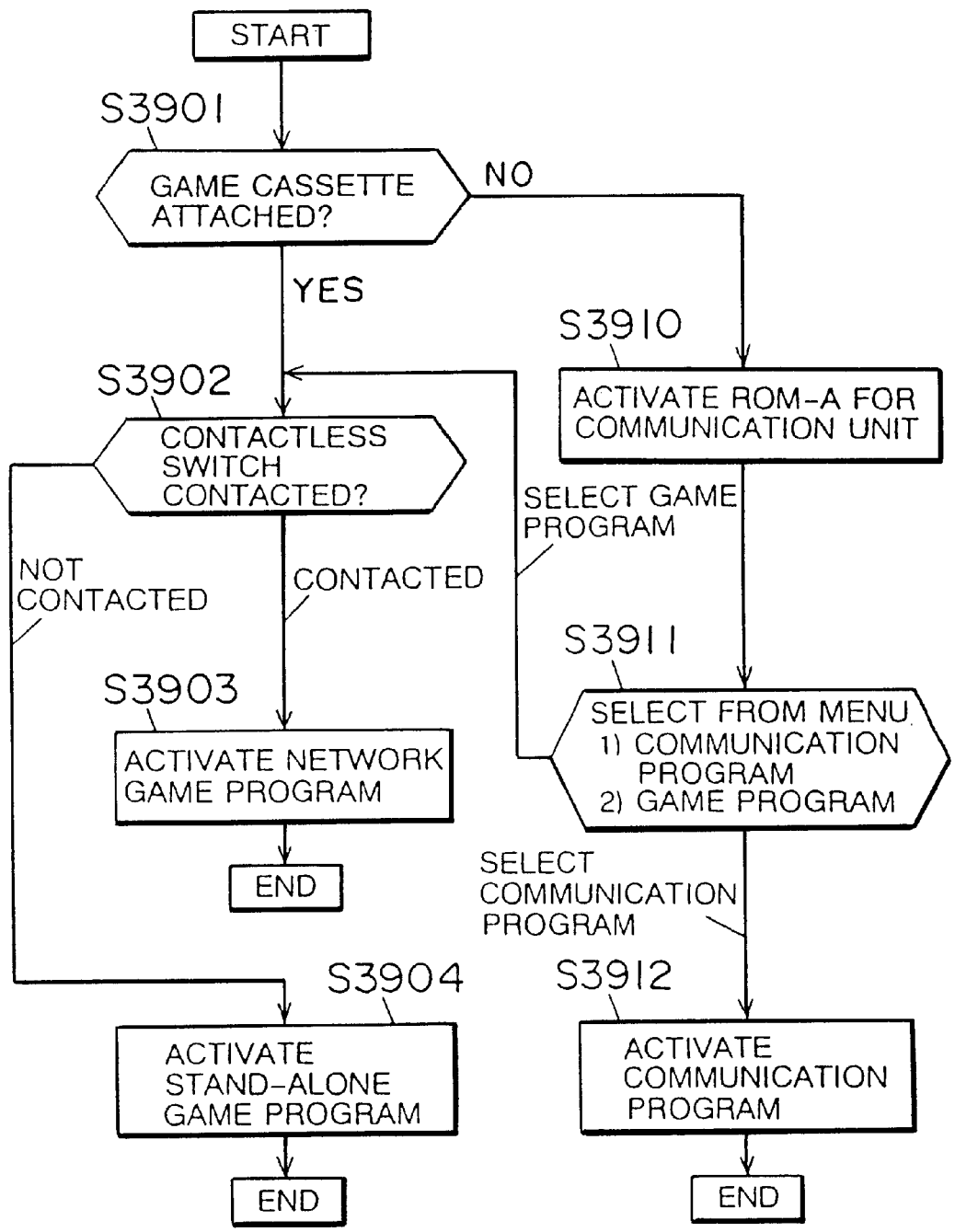
FIG. 39 is a flowchart for explaining an operation of the sixth embodiment.

Next, an operation of the sixth embodiment will be explained with reference to FIG. 39.

The CPU discriminates whether the game cassette is attached to the game cassette attachment port 13 or not (Step 3901). If it is determined to be "YES" in Step 3901, it is discriminated whether the contactless switch 46 has contacted or not (Step 3902).

If it is determined that the switch has contacted in Step 3902, the network game program is activated (Step 3903). When it is determined that the switch has not contacted in Step 3902, the stand-alone game program is activated (Step 3904).

If it is determined to be "NO" in Step 3901, the ROM-A for communication unit is activated (Step 3910).

Then, it lets the user select from the menu either 1) a communication program or 2) a game program (Step 3911).

When the "game program" is selected in Step 3911, the process executes from Step 3902. When the "communication program" is selected in Step 3911, the communication program is activated (Step 3912).

Seventh Embodiment

A seventh embodiment will be explained with reference to FIGS. 40 through 43 and FIG. 53.

[Outline of the Seventh Embodiment]

Because the present embodiment is configured similarly to the fifth embodiment, only different parts will be explained and the same parts are designated with the same reference numerals and explanation thereof will be omitted.

[Game Cassette 30]

Figure 40:
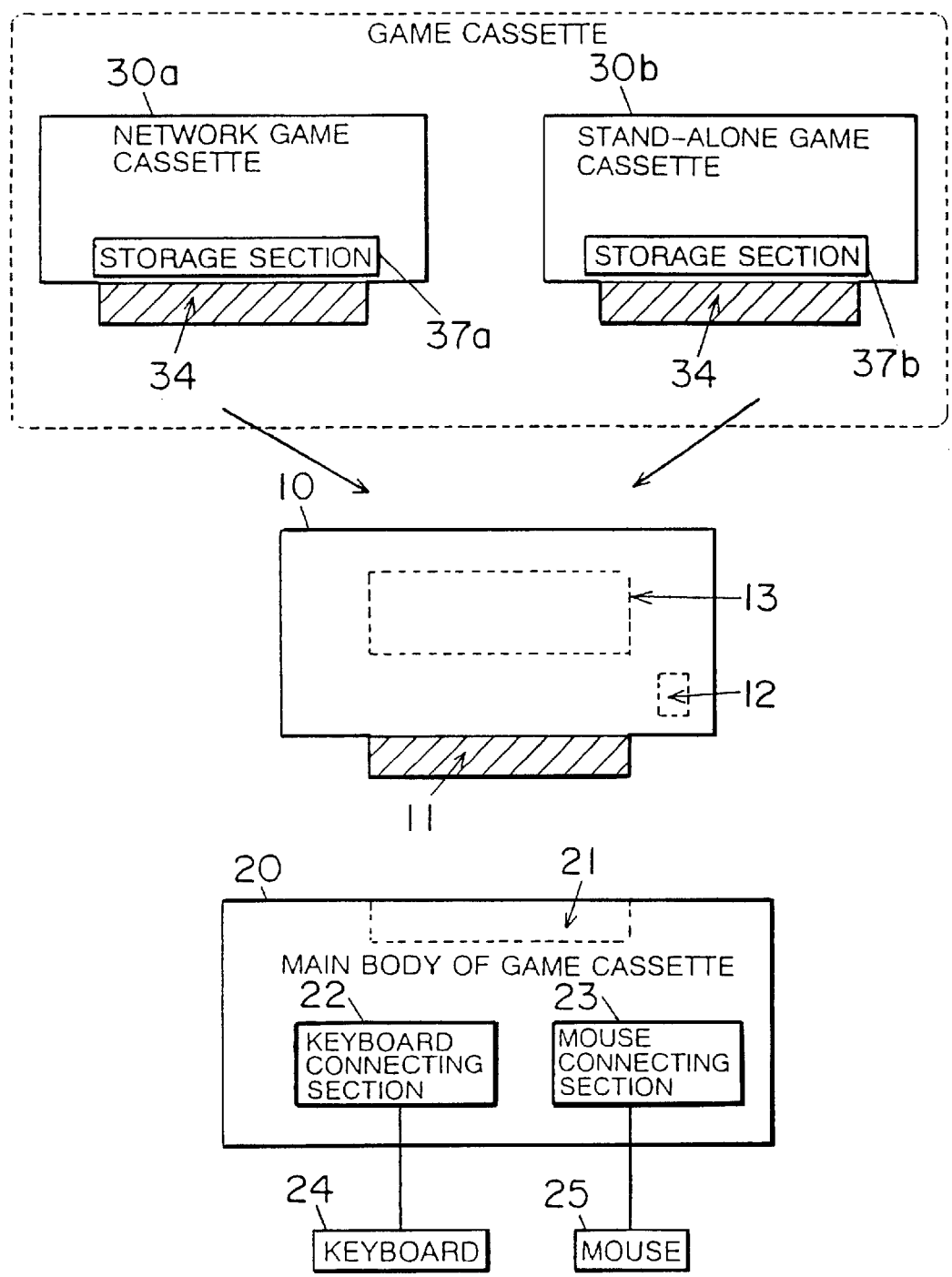
FIG. 40 is a front view of the game cassette, communication unit and main body of game machine in a state separated from each other according to a seventh embodiment.
Figure 41:
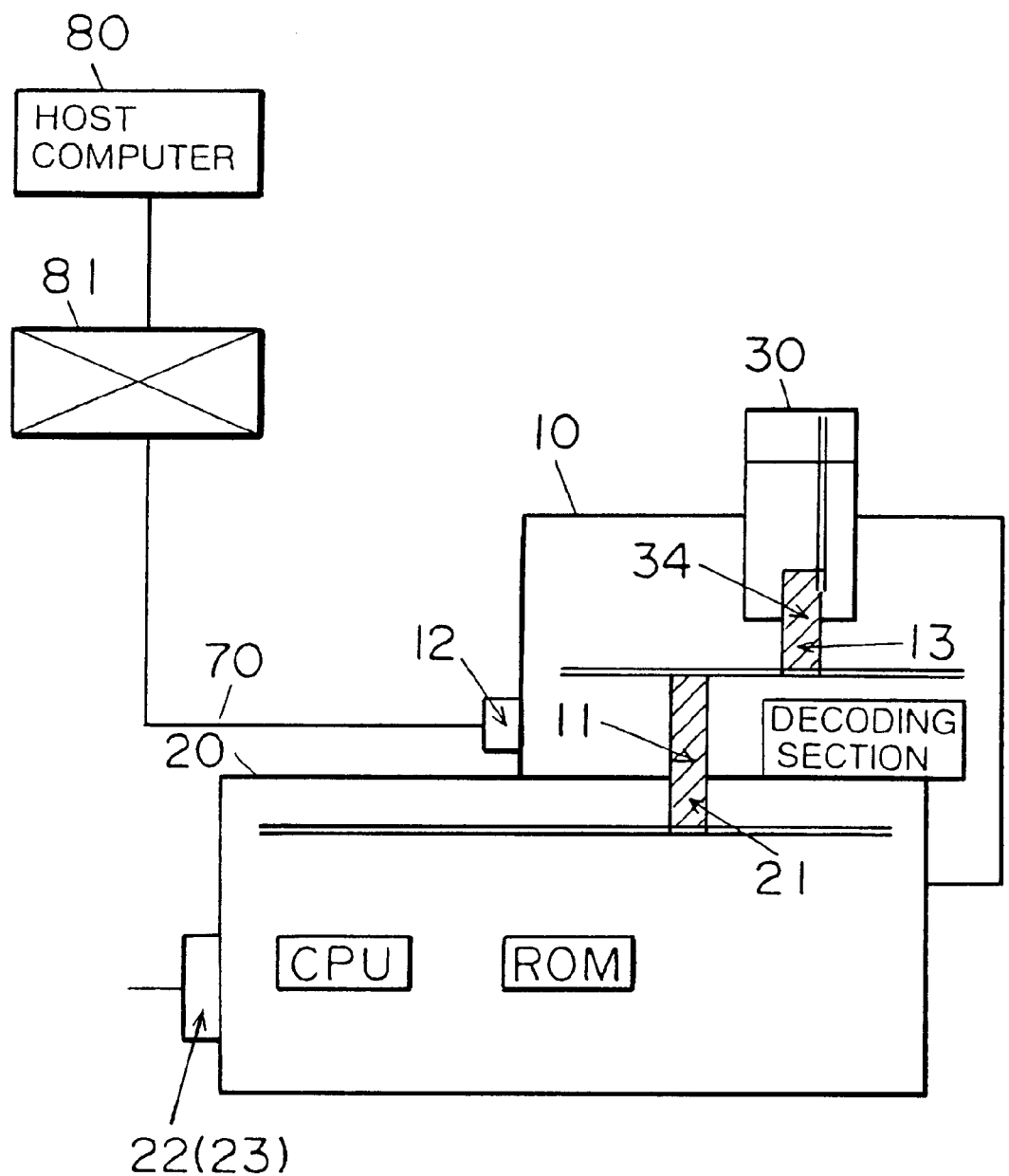
FIG. 41 is a side view of the game cassette, communication unit and main body of game machine in a combined state according to the seventh embodiment.

The network game cassette 30a and the game cassette 30b are stored in the similar cases as shown in FIG. 40. An ID number for identifying a type of the game cassette 30 is stored in the storage sections 37a and 37b of each game cassette 30.

[Communication Unit 10]

The communication unit 10 is constructed by omitting the optical switch 41 from the communication unit 10 in the fifth embodiment.

The decoding section activates the ROM corresponding to the use condition of the game cassette 30 based on the ID information read from the storage section 37 of the game cassette 30 (see FIG. 53).

[Main Body of Game Machine 20]

Figure 42:
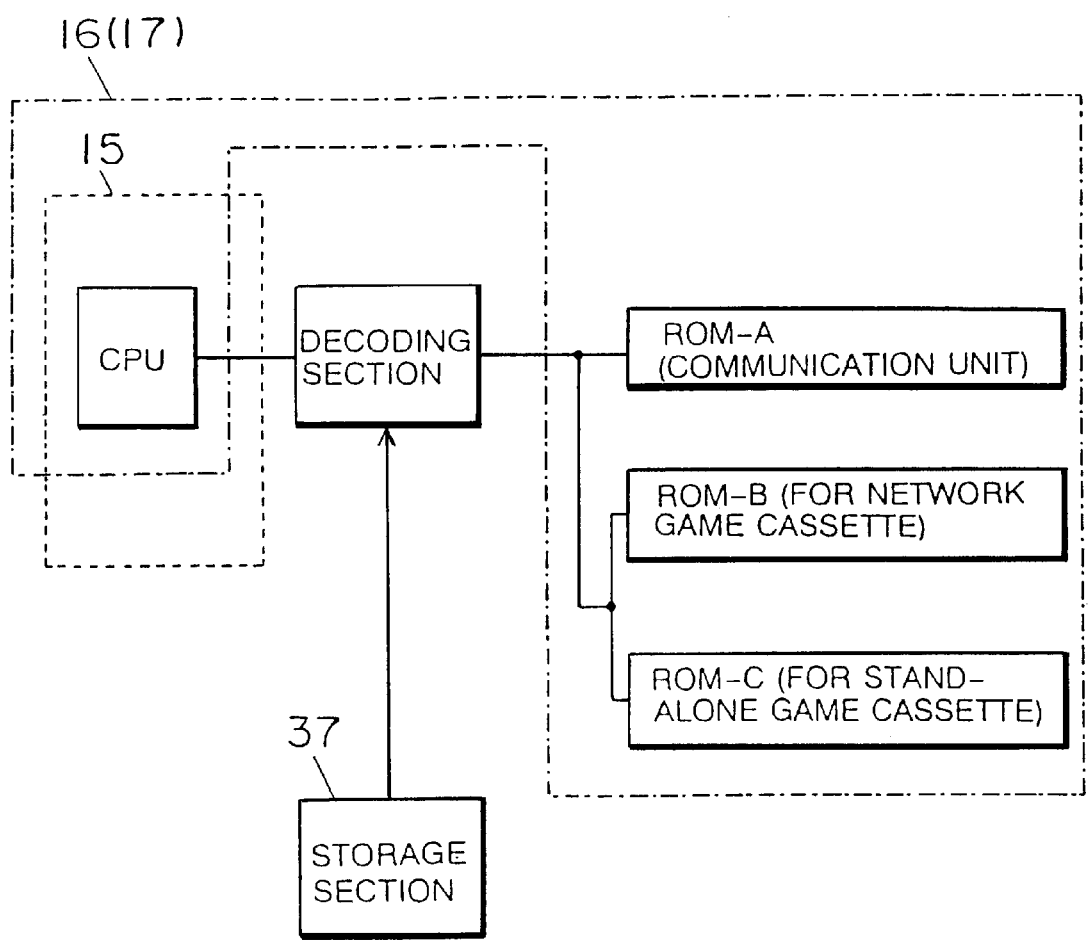
FIG. 42 is a functional block diagram of the seventh embodiment.

The main body of game machine 20 comprises the attachment state discriminating section 15 having the CPU, the processing information executing section 16 composed of the CPU, ROM-A, ROM-B and ROM-C and the host accessing section 17 as shown in a functional block diagram in FIG. 42.

The CPU is connected to the decoding section and carries out processes from a) through d) below:

a) discriminates whether the game cassette 30 is discriminated or not based on the output of the game cassette attachment port 13 and determines that the network game cassette 30a or the stand-alone game cassette 30b is attached based on the ID information read from the storage section 37 of the game cassette 30 (process as the attachment state discriminating section 15);

b) executes the program stored in the storage section 37 of the game cassette 30 (process as the processing information executing section 16);

c) carries out the communication processing through the communication unit 10; and d) accesses to the host computer 80 recognizing that the network game cassette 30a is attached to the game cassette attachment port 13 (process as the host accessing section 17).

Then the decoding section of the main body of game machine 20 activates the ROM corresponding to the use condition of the game cassette 30 based on the ID information read from the storage section 37 of the game cassette 30.

[Operation of the Seventh Embodiment]

Figure 43:
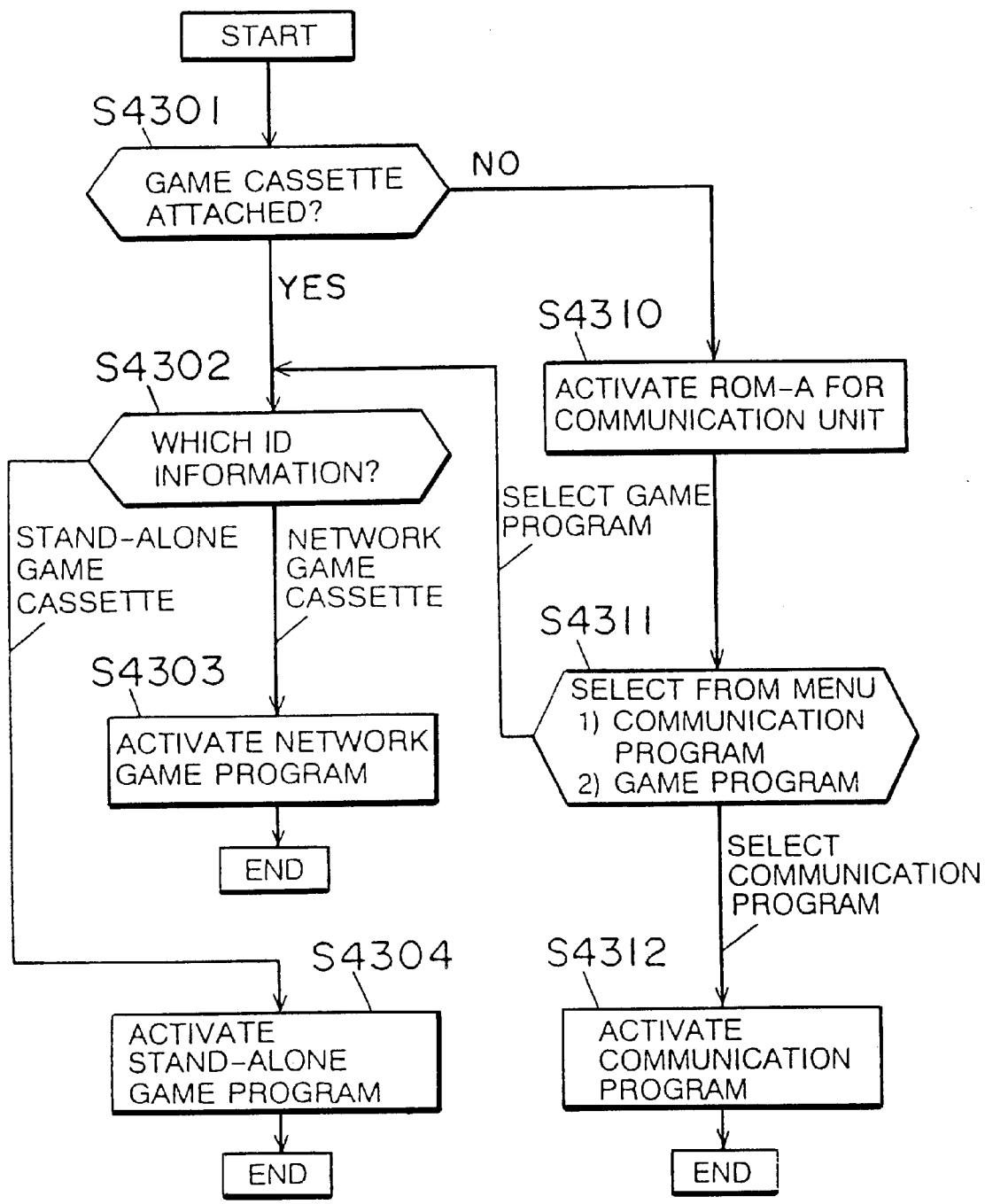
FIG. 43 is a flowchart for explaining an operation of the seventh embodiment.

Next, an operation of the seventh embodiment will be explained with reference to FIG. 43.

The CPU discriminates whether the game cassette is attached to the game cassette attachment port 13 or not (Step 4301). If it is determined to be "YES" in Step 4301, the ID information read from the storage section 37 of the game cassette 30 is determined (Step 4302).

If it is determined to be the ID information of the "network game cassette" in Step 4302, the network game program is activated (Step 4303). When it is determined to be the ID information of the "stand-alone game cassette" in Step 4302, the stand-alone game program is activated (Step 4304).

If it is determined to be "NO" in Step 4301, the ROM-A for communication unit is activated (Step 4310).

Then, it lets the user select from the menu either 1) a communication program or 2) a game program (Step 4311).

When the "game program" is selected in Step 4311, the process executes from Step 4302. When the "communication program" is selected in Step 4311, the communication program is activated (Step 4312).

Eighth Embodiment

A eighth embodiment will be explained with reference to FIG. 44.

[Outline of the Eighth Embodiment]

Because the present embodiment is configured similarly to the fifth embodiment, only different parts will be explained and the same parts are designated with the same reference numerals and explanation thereof will be omitted.

[Game Cassette 30]

The network game cassette 30a is stored in an oblong, thin and approximately cuboid case having a light transmitting section 33 at one end thereof as shown in FIG. 44. While the light transmitting section 33 is created by a clear plastic, it may be created by glass or the like or may be created as a hole. When it is created as a hole, it is preferable to seal around the hole so that dust and the like will not enter within the game cassette 30.

Ninth Embodiment

A ninth embodiment will be explained with reference to FIGS. 44 and 46.

[Outline of the Ninth Embodiment]

Because the present embodiment is configured similarly to the fifth embodiment, only different parts will be explained and the same parts are designated with the same reference numerals and explanation thereof will be omitted.

[Game Cassette 30]

The network game cassette 30a is stored in an oblong, thin and approximately cuboid case on which a magnetic body 39 is formed on one end therein as shown in FIG. 45. The magnetic body 39 is created by a magnet.

[Communication Unit 10]

The communication unit 10 is constructed similarly to that in the fifth embodiment except of that the optical switch 41 in the fifth embodiment is replaced by a magnetic contactless switch 43a. It is possible to replace the magnetic contactless switch 43a by a magnetic sensor 44.

The decoding section activates the ROM corresponding to the use condition of the game cassette 30 based on the detection result of the magnetic contactless switch 43a (see FIG. 53).

[Main Body of Game Machine 20]

Figure 46:
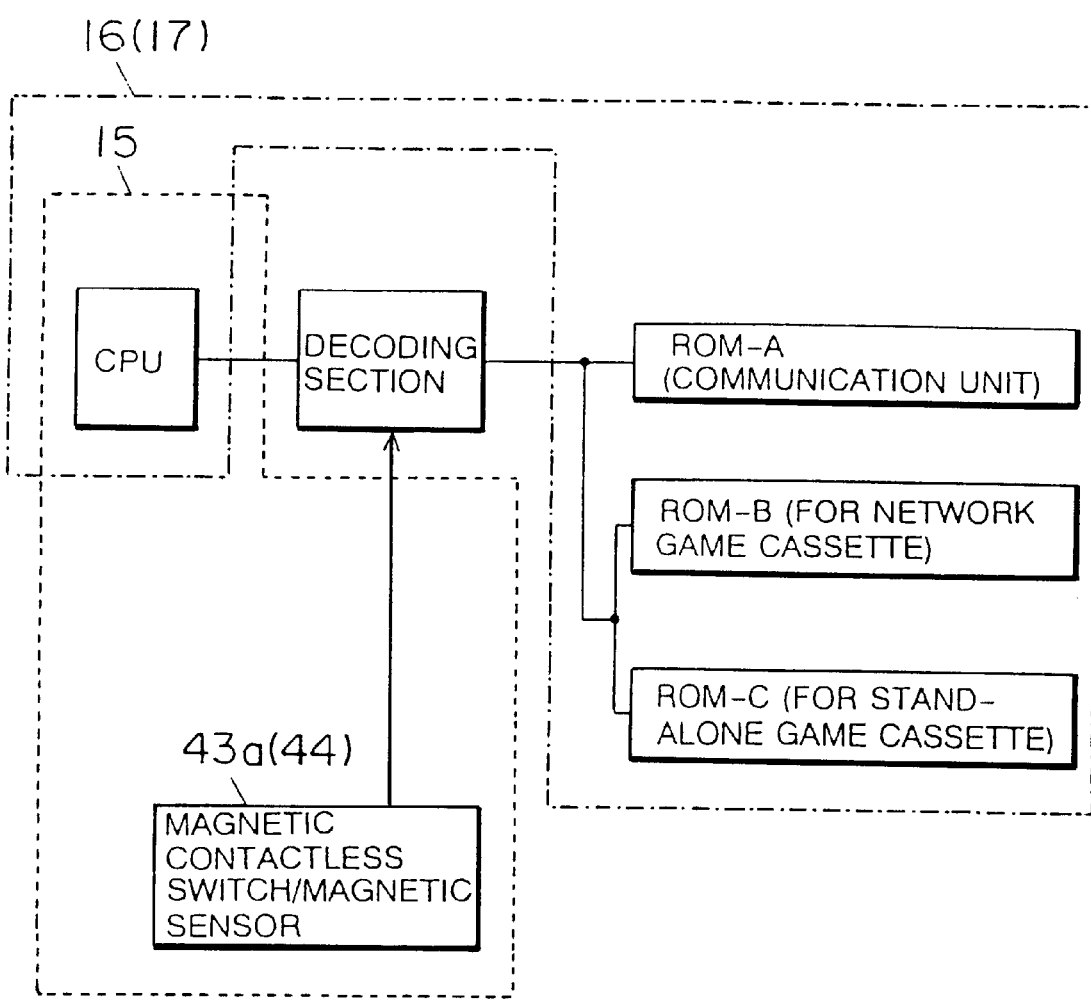
FIG. 46 is a functional block diagram of the ninth embodiment.

The main body of game machine 20 comprises the attachment state discriminating section 15 comprising the CPU and magnetic contactless switch 43a (magnetic sensor 44), the processing information executing section 16 comprising the CPU, ROM-A, ROM-B and ROM-C and the host accessing section 17 as shown in a functional block diagram in FIG. 46.

The CPU is connected to the decoding section and carries out processes from a) through d) below:

a) discriminates whether the game cassette 30 is discriminated or not based on the output of the game cassette attachment port 13 and determines that the network game cassette 30a is attached when the magnetic contactless switch 43a (magnetic sensor 44) detects magnetism and determines that the stand-alone game cassette 30b is attached when no magnetism is detected (process as the attachment state discriminating section 15);

b) executes the program stored in the storage section 37 of the game cassette 30 (process as the processing information executing section 16);

c) carries out the communication processing through the communication unit 10; and d) accesses to the host computer 80 recognizing that the network game cassette 30a is attached to the game cassette attachment port 13 (process as the host accessing section 17).

Tenth Embodiment

A tenth embodiment will be explained with reference to FIGS. 47, 48 and 53.

[Outline of the Tenth Embodiment]

Because the present embodiment is configured similarly to the ninth embodiment, only different parts will be explained and the same parts are designated with the same reference numerals and explanation thereof will be omitted.

[Game Cassette 30]

For the network game cassette 30a, the magnet body 39 in the ninth embodiment is replaced by an iron 38.

[Communication Unit 10]

For the communication unit 10, the magnetic contactless switch 43a in the ninth embodiment is replaced by a high frequency contactless switch 43b.

The decoding section activates the ROM corresponding to the use condition of the game cassette 30 based on the detection result of the high frequency contactless switch 43b (see FIG. 53).

[Main Body of Game Machine 20]

Figure 48:
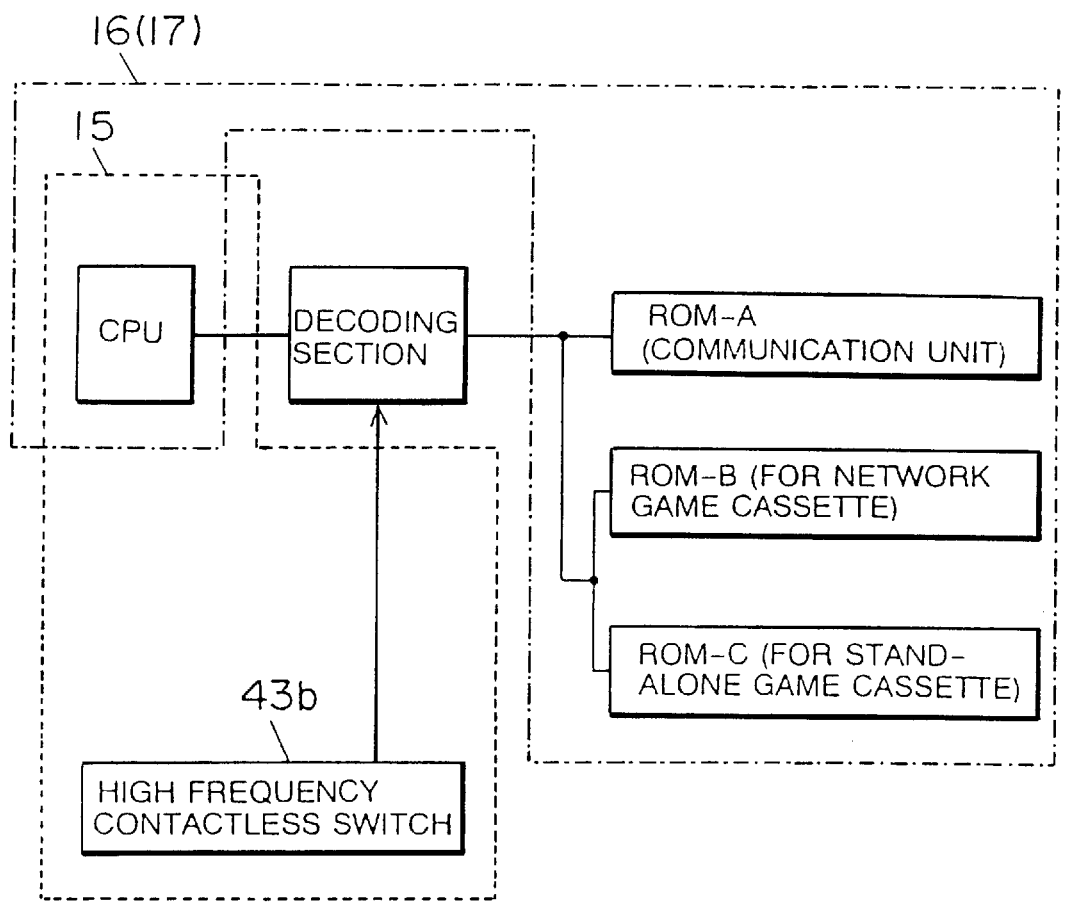
FIG. 48 is a functional block diagram of the tenth embodiment.

The main body of game machine 20 comprises the attachment state discriminating section 15 comprising the CPU and high frequency contactless switch 43b, the processing information executing section 16 comprising the CPU, ROM-A, ROM-B and ROM-C and the host accessing section 17 as shown in a functional block diagram in FIG. 48.

The CPU is connected to the decoding section and carries out processes from a) through d) below:

a) discriminates whether the game cassette 30 is discriminated or not based on the output of the game cassette attachment port 13 and determines that the network game cassette 30a is attached when the high frequency contactless switch 43b detects magnetism and determines that the stand-alone game cassette 30b is attached when no magnetism is detected (process as the attachment state discriminating section 15);

b) executes the program stored in the storage section 37 of the game cassette 30 (process as the processing information executing section 16);

c) carries out the communication processing through the communication unit 10; and d) accesses to the host computer 80 recognizing that the network game cassette 30a is attached to the game cassette attachment port 13 (process as the host accessing section 17).

Eleventh Embodiment

An eleventh embodiment will be explained with reference to FIGS. 49, 50 and 53.

[Outline of the Eleventh Embodiment]

Because the present embodiment is configured similarly to the seventh embodiment, only different parts will be explained and the same parts are designated with the same reference numerals and explanation thereof will be omitted. However, no ID number for identifying a type of the game cassette 30 is stored in the storage sections 37a and 37b of this game cassette.

[Game Cassette 30]

A label 35 on which a bar code is printed is labeled at the lower part of the surface of the network game cassette 30a and the stand-alone game cassette 30b as shown in FIG. 49.

[Communication Unit 10]

The communication unit 10 is provided with a bar code reader 45 for reading the bar code printed on the label 35.

The decoding section activates the ROM corresponding to the use condition of the game cassette 30 based on the detection result of the bar code reader 45 (see FIG. 53).

[Main Body of Game Machine 20]

Figure 50:
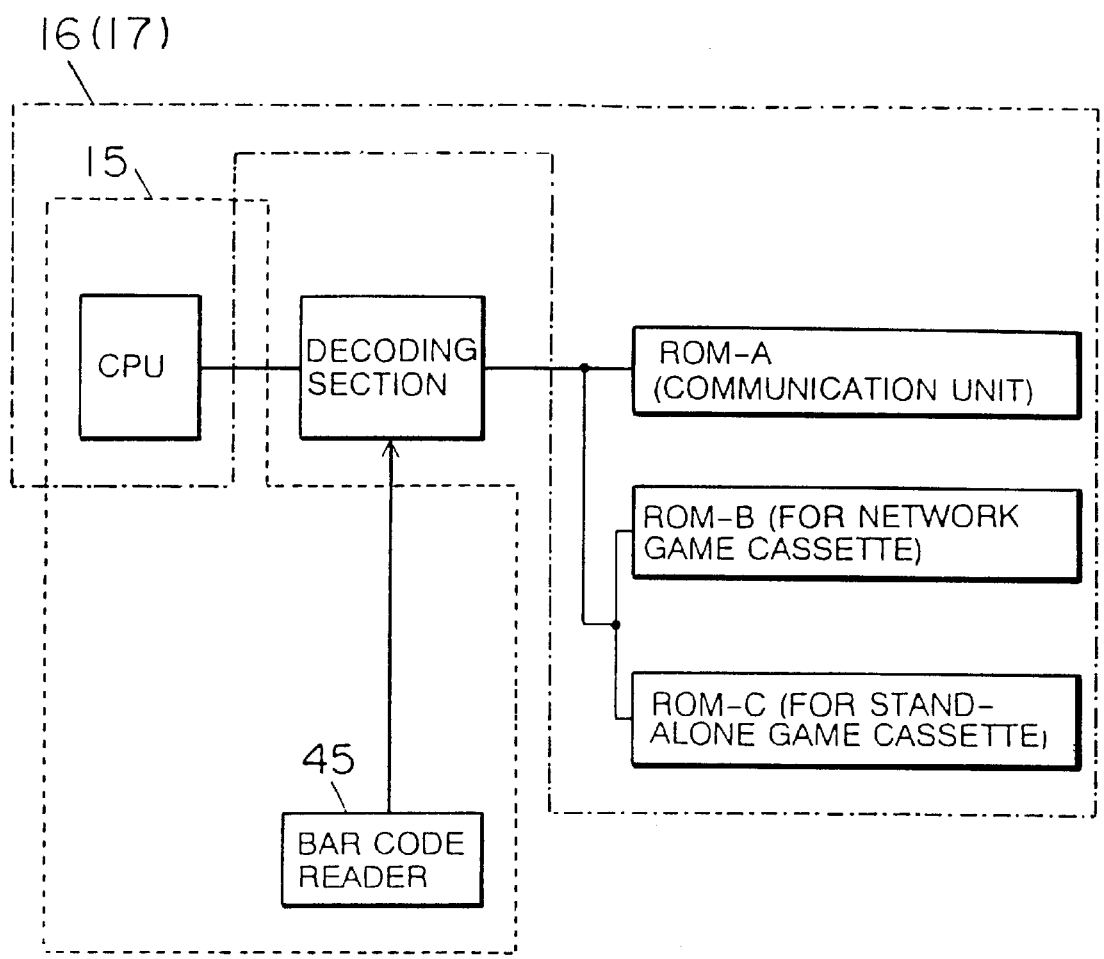
FIG. 50 is a functional block diagram of the eleventh embodiment.

The main body of game machine 20 comprises the attachment state discriminating section 15 comprising the CPU and bar code reader 45, the processing information executing section 16 comprising the CPU, ROM-A, ROM-B and ROM-C and the host accessing section 17 as shown in a functional block diagram in FIG. 50.

The CPU is connected to the decoding section and carries out processes from a) through d) below:

a) discriminates whether the game cassette 30 is discriminated or not based on the output of the game cassette attachment port 13 and determines that the network game cassette 30a is attached or the stand-alone game cassette 30b is attached depending on the value of the bar code read by the bar code reader 45 (process as the attachment state discriminating section 15);

b) executes the program stored in the storage section 37 of the game cassette 30 (process as the processing information executing section 16);

c) carries out the communication processing through the communication unit 10; and d) accesses to the host computer 80 recognizing that the network game cassette 30a is attached to the game cassette attachment port 13 (process as the host accessing section 17).

Twelfth Embodiment

Figure 51:
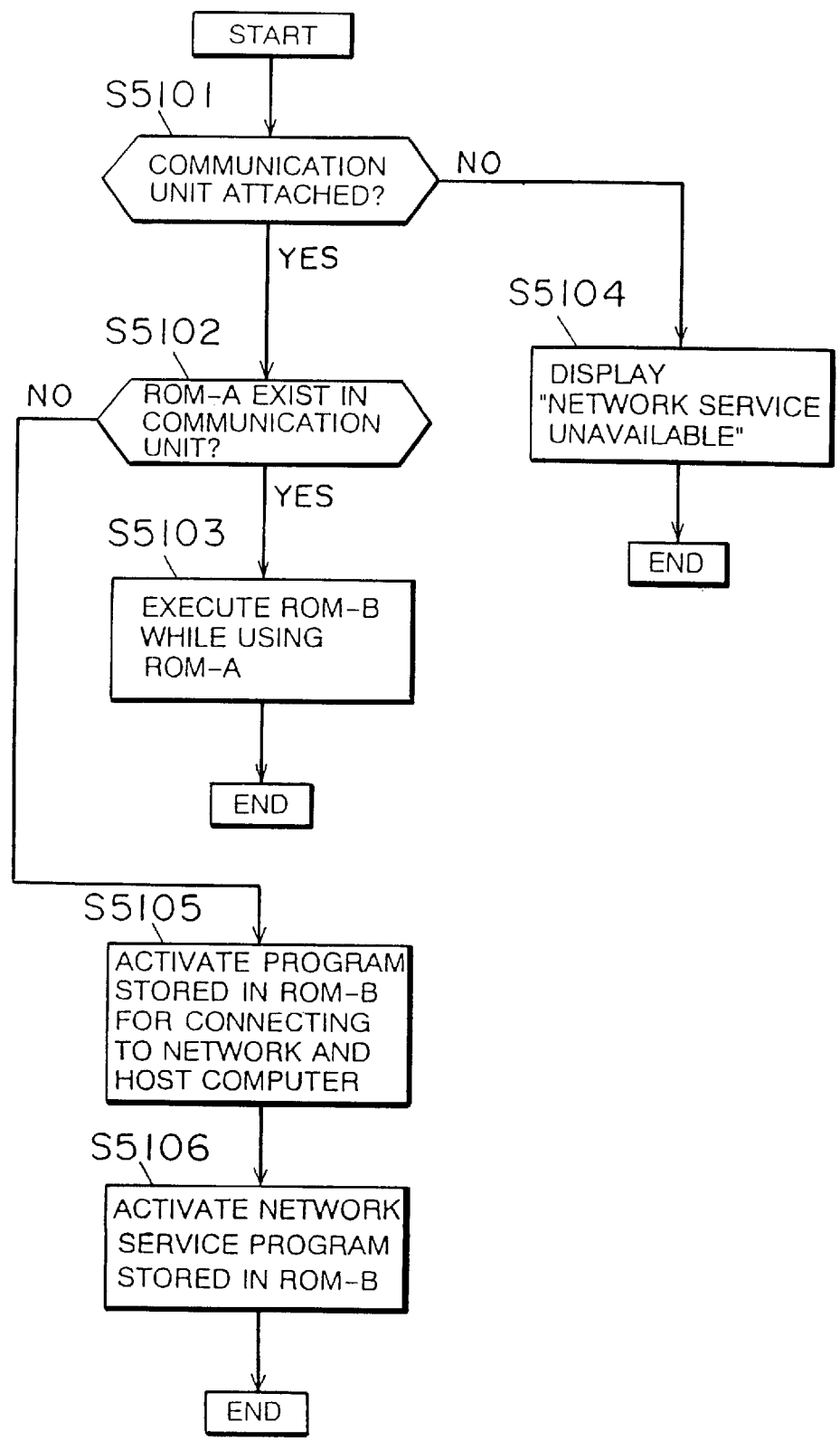
FIG. 51 is a flowchart for explaining an operation of a twelfth embodiment.

Because a twelfth embodiment is configured so that its operation differs from that of the fifth embodiment, though it is similarly configured, only the operation thereof will be explained with reference to FIG. 51.

[Operation of the Twelfth Embodiment]

At first, the CPU discriminates whether the game cassette is attached to the game cassette attachment port 13 or not (Step 5101). If it is determined to be "NO" in Step 5101, "NETWORK SERVICE UNAVAILABLE" is displayed (Step 5104).

If it is determined to be "YES" in Step 5101, it is discriminated whether the communication unit 10 has the ROM-A or not (Step 5102).

If it is determined to be "YES" in Step 5102, the ROM-B is executed while using the ROM-A (Step 5103).

When it is determined to be "NO" in Step 5102, a program for connecting the network and host computer 80 stored in the ROM-B is activated (Step 5105).

Then, a network service program stored in the ROM-B is activated (Step 5106).

Thirteenth Embodiment

Figure 52:
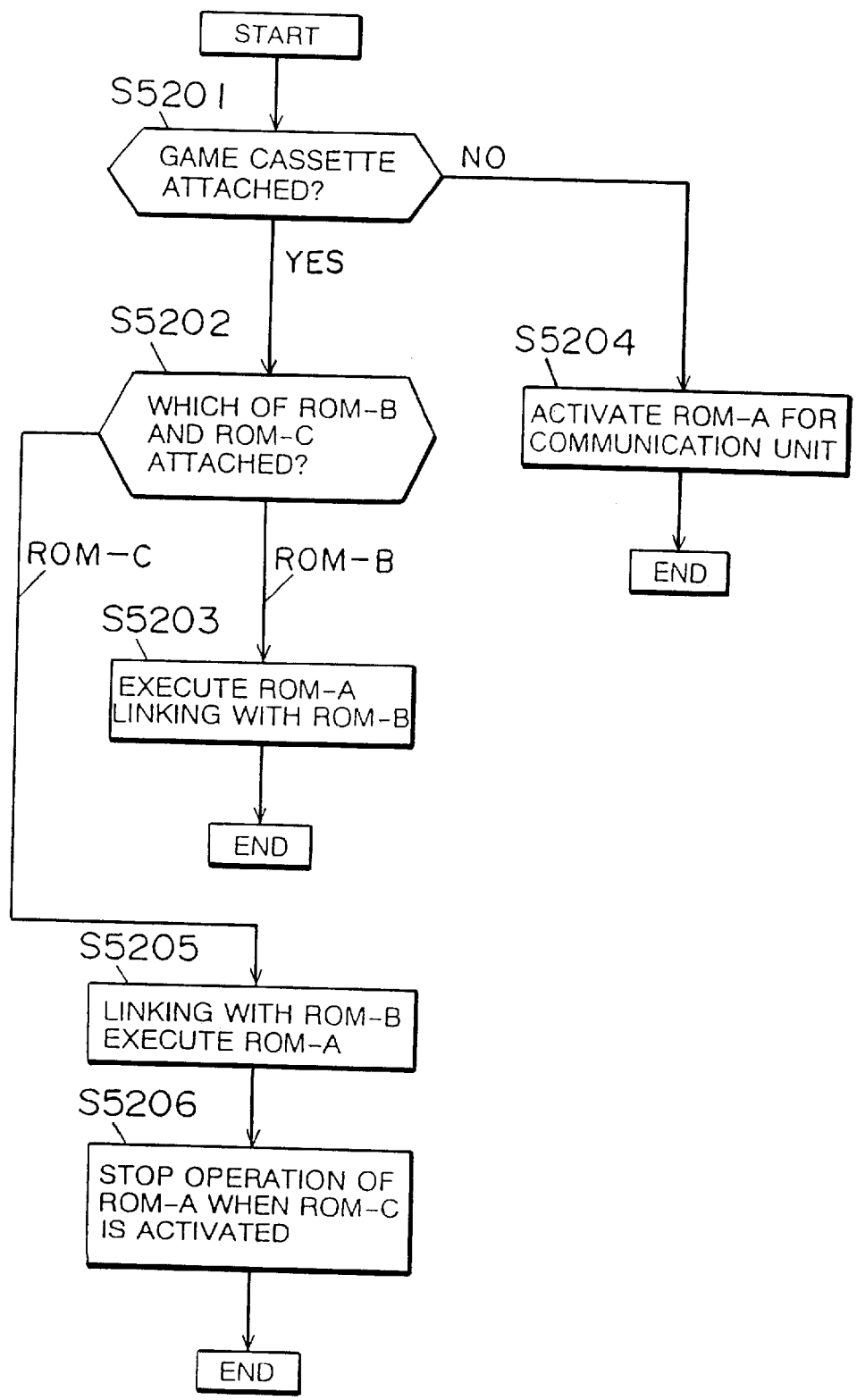
FIG. 52 is a flowchart for explaining an operation of a thirteenth embodiment.

Because a thirteenth embodiment is configured so that its operation differs from that of the fifth embodiment, though it is similarly configured, only the operation thereof will be explained with reference to FIG. 52.

[Operation of the Thirteenth Embodiment]

At first, the CPU discriminates whether the game cassette is attached to the game cassette attachment port 13 or not (Step 5201). If it is determined to be "NO in Step 5201, the ROM-A for communication unit is activated (Step 5204).

If it is determined to be "YES" in Step 5201, it is discriminated which of the ROM-B and ROM-C is attached (Step 5202).

If it is determined to be "ROM-B" in Step 5202, the ROM-A is executed linking with the ROM-B (Step 5203).

When it is determined to be "ROM-C" in Step 5203, the ROM-A is executed linking with the ROM-C (Step 5205).

Then, when the ROM-C is activated, the operation of the ROM-A is stopped (Step 5206).

While preferred embodiments have been described, variations thereto will occur to those skilled in the art within the scope of the present inventive concepts which are delineated by the following claims.

What is claimed is:

1. A game machine for playing games stored on network game modules and on stand-alone game modules comprising:

an external terminal for connecting a communication terminal unit;

an application section for attaching one of a network application medium in which an application software for network service is stored and executed when a network game module is inserted and a stand-alone application medium in which an application software for stand-along service is stored and executed when a stand-alone game module is inserted, said network application medium contains a process for discriminating whether the communication terminal unit is attached and contains a processing for connecting a line to a network and host computer by itself to carry out a processing of network services when said communication terminal unit does not have a communication application software for connecting to the host computer which provides the network service via the network; and a processor for executing a processing related to said one of network application medium and said stand-alone application medium connected to said application section and a processing related to said external terminal being executed in linkage.

2. A game machine for playing games stored on network game modules and on stand-alone game modules comprising:

an external terminal for connecting a communication terminal unit;

an application section for attaching one of a network application medium in which an application software for network service is stored and executed when a network game module is inserted and a stand-alone application medium in which an application software for stand-along service is stored and executed when a stand-alone game module is inserted, said network application medium contains a process for discriminating whether the communication terminal unit is attached and connecting a line to said network and host computer by utilizing said communication terminal unit when said communication terminal unit has a communication application software for connecting to the host computer which provides the network service via the network; and a processor for executing a processing related to said one of network application medium and said stand-alone application medium connected to said application section and a processing related to said external terminal being executed in linkage.

* * * * *

UNITED STATES PATENT AND TRADEMARK OFFICE
CERTIFICATE OF CORRECTION

PATENT NO.: 5,984,783
DATED : November 16, 1999
INVENTOR(S): Misao KIKUCHI, et al.

It is certified that error appears in the above-identified patent and that said Letters Patent is hereby corrected as shown below:

title page, item
[75] Inventors:

The following inventors should be deleted

Kunimasa IMASONO
Kenji NOMA
Tadayuki TAHARA
Yoshinori SAITO
Hisayoshi HAYASAKA
Kiyotaka YAGO
Kenji KAWASAKI Signed and Sealed this Third Day of April, 2001

*Attest:*

NICHOLAS P. GODICI

*Attesting Officer*    *Acting Director of the United States Patent and Trademark Office*